US011592903B2

(12) United States Patent
Rosenberg et al.

(10) Patent No.: US 11,592,903 B2
(45) Date of Patent: *Feb. 28, 2023

(54) SYSTEM AND METHOD FOR DETECTING AND RESPONDING TO TOUCH INPUTS WITH HAPTIC FEEDBACK

(71) Applicant: Sensel, Inc., Mountain View, CA (US)

(72) Inventors: Ilya Daniel Rosenberg, Sunnyvale, CA (US); Brogan Miller, Sunnyvale, CA (US); John Aaron Zarraga, Sunnyvale, CA (US); James Junus, Sunnyvale, CA (US)

(73) Assignee: Sensel, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,024

(22) Filed: Dec. 20, 2021

(65) Prior Publication Data
US 2022/0113803 A1 Apr. 14, 2022

Related U.S. Application Data

(63) Continuation of application No. 17/092,002, filed on Nov. 6, 2020, now Pat. No. 11,360,563, which is a
(Continued)

(51) Int. Cl.
 G06F 3/01 (2006.01)
 G06F 3/045 (2006.01)
 G06F 3/041 (2006.01)
(52) U.S. Cl.
 CPC ............ G06F 3/016 (2013.01); G06F 3/045 (2013.01); G06F 3/0416 (2013.01); *G06F 2203/04105* (2013.01)
(58) Field of Classification Search
 CPC ........ G06F 3/016; G06F 3/0416; G06F 3/045; G06F 2203/04105; G06F 2203/04107; G06F 3/047
See application file for complete search history.

(56) References Cited

U.S. PATENT DOCUMENTS 4,959,631 A * 9/1990 Hasegawa ........... H01F 17/0006
 336/200
8,981,242 B2 3/2015 Bayramoglu
 (Continued)

FOREIGN PATENT DOCUMENTS

CN 102341768 A 2/2012
CN 101828161 B 4/2013
 (Continued)

OTHER PUBLICATIONS

ESSR received in EP Application No. 17776861.1 dated Oct. 29, 2019.
 (Continued)

*Primary Examiner* — Rodney Amadiz
(74) *Attorney, Agent, or Firm* — Run8 Patent Group, LLC; Peter Miller; Alexander Rodriguez

(57) ABSTRACT

One variation of a system for detecting and responding to touch inputs with haptic feedback includes: a magnetic element rigidly coupled to a chassis; a substrate; a touch sensor interposed between the substrate and a touch sensor surface; an inductor coupled to the substrate below the touch sensor surface and configured to magnetically couple to the magnetic element; a coupler coupling the substrate to the chassis, compliant within a vibration plane approximately parallel to the touch sensor surface, and locating the inductor approximately over the magnetic element; and a controller configured to intermittently polarize the inductor responsive to detection of a touch input on the touch sensor surface to oscillate the substrate in the vibration plane relative to the chassis.

22 Claims, 21 Drawing Sheets

Related U.S. Application Data continuation of application No. 16/297,426, filed on Mar. 8, 2019, now Pat. No. 10,866,642, which is a continuation-in-part of application No. 15/845,751, filed on Dec. 18, 2017, now Pat. No. 10,564,839, which is a continuation-in-part of application No. 15/476,732, filed on Mar. 31, 2017, now Pat. No. 10,331,265.

(60) Provisional application No. 62/640,138, filed on Mar. 8, 2018, provisional application No. 62/343,453, filed on May 31, 2016, provisional application No. 62/316,417, filed on Mar. 31, 2016.

(56) References Cited

U.S. PATENT DOCUMENTS

| | | | |
|---|---|---|---|
| 9,019,207 | B1 | 4/2015 | Hamburgen et al. |
| 9,158,377 | B2 | 10/2015 | Shinozaki |
| 9,829,981 | B1 | 11/2017 | Ji |
| 10,101,859 | B2 | 10/2018 | Jin |
| 10,209,846 | B2 | 2/2019 | Wang et al. |
| 10,459,542 | B1 | 10/2019 | Costante et al. |
| 10,495,486 | B2 * | 12/2019 | Liu ............... G06F 3/0485 |
| 10,564,839 | B2 | 2/2020 | Rosenberg et al. |
| 10,585,481 | B2 * | 3/2020 | Czelnik ............ G06F 3/016 |
| 10,963,059 | B2 | 3/2021 | Rosenberg et al. |
| 11,360,563 | B2 * | 6/2022 | Rosenberg ......... G06F 3/047 |
| 2002/0149561 | A1 | 10/2002 | Fukumoto et al. |
| 2003/0095095 | A1 | 5/2003 | Pihlaja |
| 2005/0038944 | A1 | 2/2005 | Harada et al. |
| 2005/0180082 | A1 | 8/2005 | Nakamura et al. |
| 2007/0015966 | A1 | 1/2007 | Niwa et al. |
| 2009/0256817 | A1 | 10/2009 | Perlin et al. |
| 2010/0128002 | A1 | 5/2010 | Stacy et al. |
| 2010/0141606 | A1 | 6/2010 | Bae et al. |
| 2010/0156818 | A1 | 6/2010 | Burrough et al. |
| 2010/0253633 | A1 | 10/2010 | Nakayama et al. |
| 2011/0025631 | A1 | 2/2011 | Han |
| 2011/0025648 | A1 | 2/2011 | Laurent et al. |
| 2011/0090151 | A1 | 4/2011 | Huang et al. |
| 2011/0134061 | A1 | 6/2011 | Lim |
| 2011/0248957 | A1 | 10/2011 | Park |
| 2012/0068938 | A1 | 3/2012 | Kontio |
| 2012/0068971 | A1 | 3/2012 | Pemberton-Pigott |
| 2012/0154316 | A1 | 6/2012 | Kono |
| 2012/0188194 | A1 | 7/2012 | Sulem et al. |
| 2012/0235942 | A1 | 9/2012 | Shahoian et al. |
| 2014/0008203 | A1 | 1/2014 | Nathan et al. |
| 2014/0055407 | A1 | 2/2014 | Lee et al. |
| 2014/0362014 | A1 | 12/2014 | Ullrich et al. |
| 2015/0002416 | A1 | 1/2015 | Koike et al. |
| 2015/0054768 | A1 | 2/2015 | Grant et al. |
| 2015/0091858 | A1 | 4/2015 | Rosenberg et al. |
| 2015/0153829 | A1 | 6/2015 | Shiraishi |
| 2015/0185848 | A1 | 7/2015 | Levesque et al. |
| 2016/0062574 | A1 | 3/2016 | Anzures et al. |
| 2016/0165931 | A1 | 6/2016 | Lengerich et al. |
| 2016/0195931 | A1 * | 7/2016 | Czelnik ............ G06F 3/016 345/173 |
| 2016/0259411 | A1 | 9/2016 | Yoneoka et al. |
| 2016/0370899 | A1 | 12/2016 | Chang et al. |
| 2017/0285848 | A1 | 10/2017 | Rosenberg et al. |
| 2017/0336891 | A1 | 11/2017 | Rosenberg et al. |
| 2017/0336904 | A1 | 11/2017 | Hsieh et al. |
| 2017/0344115 | A1 | 11/2017 | Ji |
| 2018/0059791 | A1 | 3/2018 | Hajati |
| 2019/0196646 | A1 | 6/2019 | Rosenberg et al. |
| 2019/0212842 | A1 | 7/2019 | Hinson et al. |
| 2019/0212874 | A1 | 7/2019 | Nathan et al. |
| 2019/0265834 | A1 | 8/2019 | Rosenberg et al. |
| 2019/0339776 | A1 | 11/2019 | Rosenberg et al. |
| 2021/0333880 | A1 | 10/2021 | Junus et al. |

FOREIGN PATENT DOCUMENTS

| | | | |
|---|---|---|---|
| EP | 0469255 | A1 | 2/1992 |
| EP | 0469255 | B1 | 6/1995 |
| EP | 2375308 | A1 | 10/2011 |
| EP | 3043240 | A1 | 7/2016 |
| JP | H1185380 | A | 3/1999 |
| JP | H11212725 | A | 8/1999 |
| JP | 2002149312 | A | 5/2002 |
| JP | 2004310518 | A | 11/2004 |
| JP | 2007026344 | A | 2/2007 |
| JP | 2008192092 | A | 8/2008 |
| JP | 2011048409 | A | 3/2011 |
| JP | 2011048665 | A | 3/2011 |
| JP | 2011209785 | A | 10/2011 |
| JP | 2012027875 | A | 2/2012 |
| JP | 2012048407 | A | 3/2012 |
| JP | 2012181833 | A | 9/2012 |
| JP | 2012522317 | A | 9/2012 |
| JP | 2015002853 | A | 1/2015 |
| JP | 2015125666 | A | 7/2015 |
| WO | 2010104953 | A1 | 9/2010 |
| WO | 2011111906 | A1 | 9/2011 |
| WO | 2012081182 | A1 | 6/2012 |
| WO | 2013001779 | A1 | 1/2013 |
| WO | 2013104919 | A1 | 7/2013 |
| WO | 2013186844 | A1 | 12/2013 |
| WO | 2016035628 | A1 | 3/2016 |
| WO | 2018112466 | A1 | 6/2018 |

OTHER PUBLICATIONS

ESSR received in EP Application No. 17880897.8 dated Jul. 3, 2020.
ESSR received in EP. Application No. 19764741.5 dated Nov. 15, 2021.
International Search Report received in PCT/US17/55575 dated Jun. 20, 2017.
International Search Report received in PCT/US17/67064 dated Mar. 6, 2018.
International Search Report received in PCT/US19/21466 dated Jun. 21, 2019.
International Search Report received in PCT/US21/20753 dated Jul. 27, 2021.
ISR received in PCT/US2021/040404 dated Oct. 20, 2021.
Office Action received in CN Application No. 201780034147.4 dated Mar. 19, 2021.
Office Action received in EP Application No. EP17776861.1 dated Oct. 6, 2021.
Office Action received in Japanese Patent Application No. 2020-113821 dated Jul. 27, 2021.
Office Action received in Japanese Patent Application No. 2020-546911 dated Nov. 8, 2021.
Notice of Allowance received in U.S. Appl. No. 16/277,774 dated Feb. 24, 2021.
Notice of Allowance received in U.S. Appl. No. 17/092,002 dated Sep. 20, 2021.
Notice of Allowance received in U.S. Appl. No. 17/367,572 dated Feb. 3, 2022.
Notice of Allowance received in JP Application No. 2018-551260 dated May 27, 2020.
Office Action received in U.S. Appl. No. 16/297,426 dated Apr. 22, 2020.
Office Action Received in U.S. Appl. No. 17/181,486 dated Aug. 3, 2021.
Office Action Received in U.S. Appl. No. 15/476,732 dated Oct. 2, 2018.

* cited by examiner

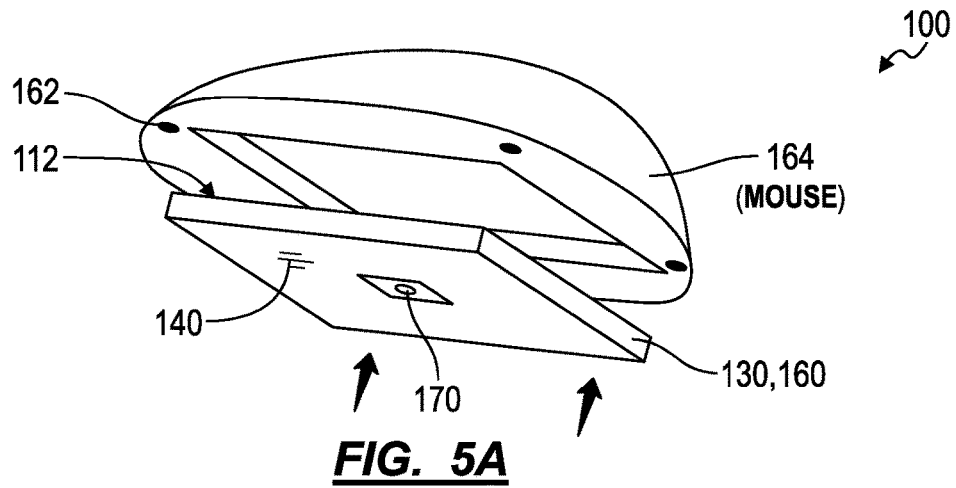
FIG. 5A
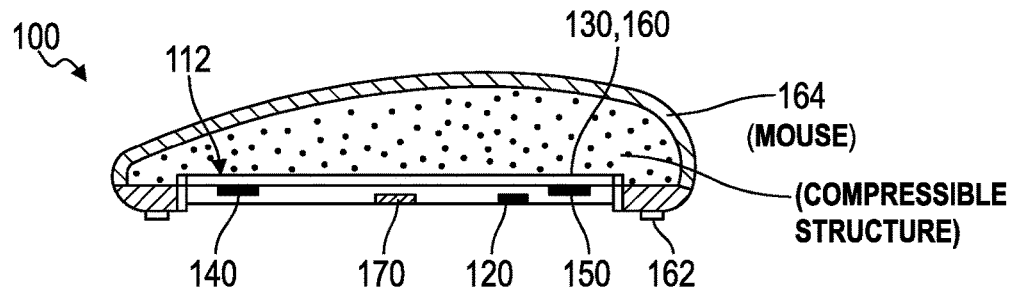
FIG. 5B
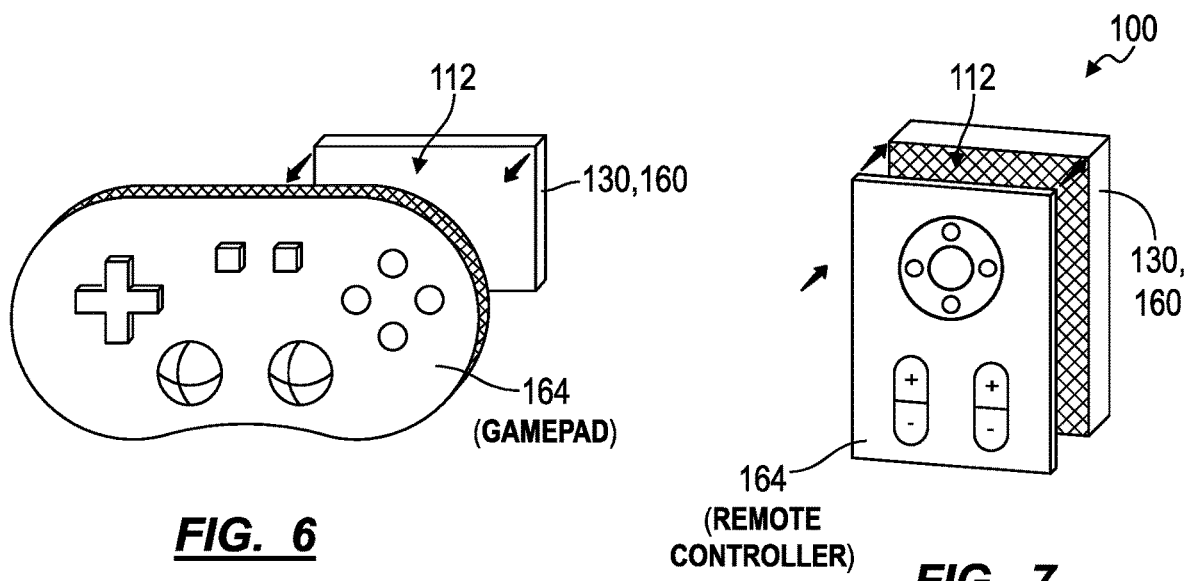
FIG. 6
FIG. 7

"MOUSE MODE"

"SWIPE TO SELECT"

"DEEP CLICK"

SYSTEM AND METHOD FOR DETECTING AND RESPONDING TO TOUCH INPUTS WITH HAPTIC FEEDBACK

CROSS-REFERENCE TO RELATED APPLICATIONS

This Applications is a continuation application of U.S. patent application Ser. No. 17/092,002, filed on 6 Nov. 2020, which is a continuation application of U.S. patent application Ser. No. 16/297,426, filed on 8 Mar. 2019, which claims the benefit of U.S. Provisional Application No. 62/640,138, filed on 8 Mar. 2018, each of which is incorporated in its entirety by this reference.

U.S. patent application Ser. No. 16/297,426 is also a continuation-in-part application of U.S. patent application Ser. No. 15/845,751, filed on 18 Dec. 2017, which is a continuation-in-part application of U.S. patent application Ser. No. 15/476,732, filed on 31 Mar. 2017, which claims the benefit of U.S. Provisional Application No. 62/316,417, filed on 31 Mar. 2016, and U.S. Provisional Application No. 62/343,453, filed on 31 May 2016, each of which is incorporated in its entirety by this reference.

This application is related to U.S. patent application Ser. No. 14/499,001, filed on 26 Sep. 2014, which is incorporated in its entirety by this reference.

TECHNICAL FIELD

This invention relates generally to the field of touch sensors and more specifically to a new and useful human-computer interface system in the field of touch sensors.

BRIEF DESCRIPTION OF THE FIGURES

FIGS. 5A and 5B are schematic representations of one variation of the system;

FIG. 6 is a schematic representation of one variation of the system;

FIG. 7 is a schematic representation of one variation of the system;

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System and Method

Figure 1:
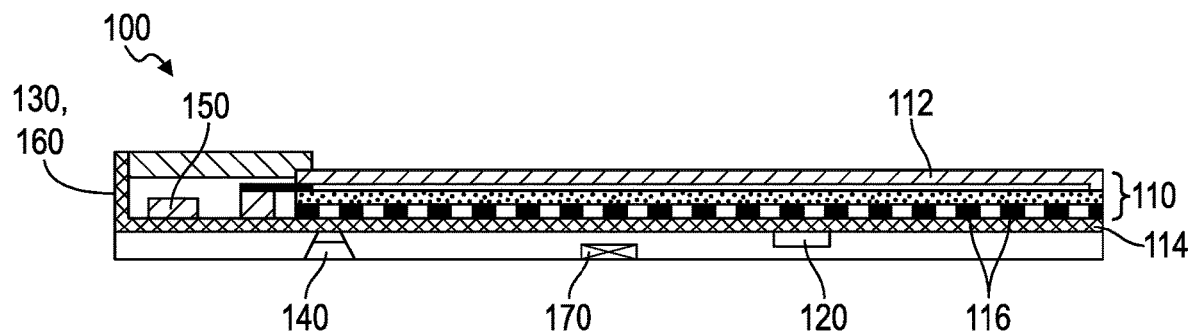
FIG. 1 is a schematic representation of a system.
Figure 2:
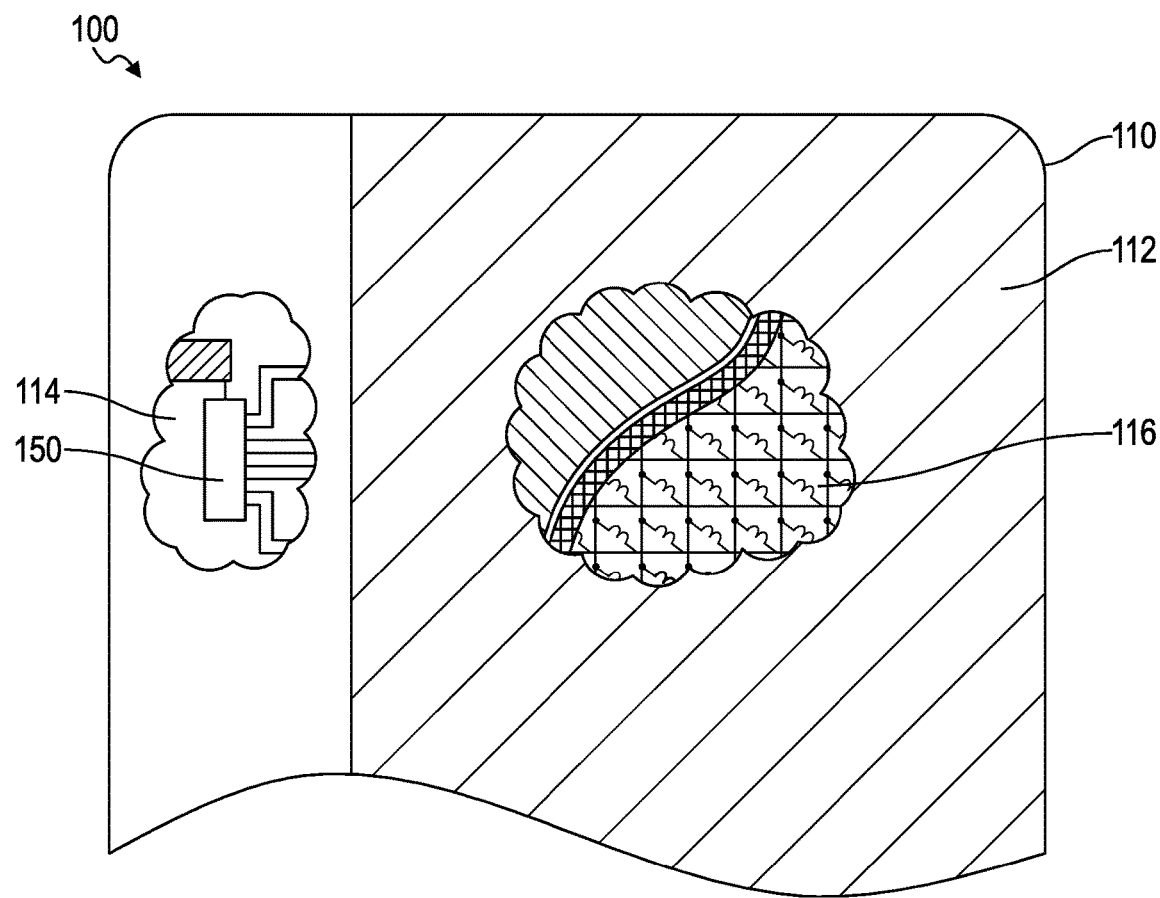
FIG. 2 is a schematic representation of one variation of the system.

As shown in FIGS. 1 and 2, a human-computer interface system (hereinafter the "system") includes a touch sensor 110, a housing 160, an audio driver 140 (herein after a "speaker"), a vibrator 120, and a controller 150. The touch sensor 110 includes: an array of sense electrode and drive electrode pairs 116 patterned across a substrate; and a resistive layer arranged over the substrate in contact with the sense electrode and drive electrode pairs, defining a touch sensor surface 112 opposite the substrate, and defining a material exhibiting changes in local bulk resistance responsive to variations in magnitude of force applied to the touch sensor surface 112. The housing 160 is coupled to the touch sensor 110 and contains the speaker and the vibrator 120. The controller 150: is configured to trigger the speaker to replay a click sound and to trigger the vibrator 120 to vibrate the housing 160 during a click cycle in response to application of a force exceeding a threshold force magnitude on the touch sensor surface 112; and is configured to output a command in response to application of the force exceeding the threshold force magnitude on the touch sensor surface 112.

One variation of the system includes: a touch sensor 110 comprising a touch sensor surface 114, comprising an array of sense electrode and drive electrode pairs 116 arranged over the touch sensor surface 114, and defining a touch sensor surface 112 extending over the array of sense electrode and drive electrode pairs 116; a vibrator 120 coupled to the touch sensor 110 and configured to oscillate a mass within a plane parallel to the touch sensor surface 112; an audio driver 140 coupled to the chassis 130; and a controller 150. In this variation, the controller 150 is configured to: detect application of a first input onto the touch sensor surface 112 and a first force magnitude of the first input at a first time based on a first change in resistance between a first sense electrode and drive electrode pair in the touch sensor 110; execute a first click cycle in response to the first force magnitude exceeding a first threshold magnitude by actuating the vibrator 120 and triggering the audio driver 140 to output the click sound; detect retraction of the first input from the touch sensor surface 112 and a second force magnitude of the first input at a second time succeeding the first time based on a second change in resistance between the first sense electrode and drive electrode pair; and execute a second click cycle in response to the second force magnitude falling below a second threshold magnitude less than the first threshold magnitude by actuating the vibrator 120 and triggering the audio driver 140 to output the click sound.

Figure 8A:
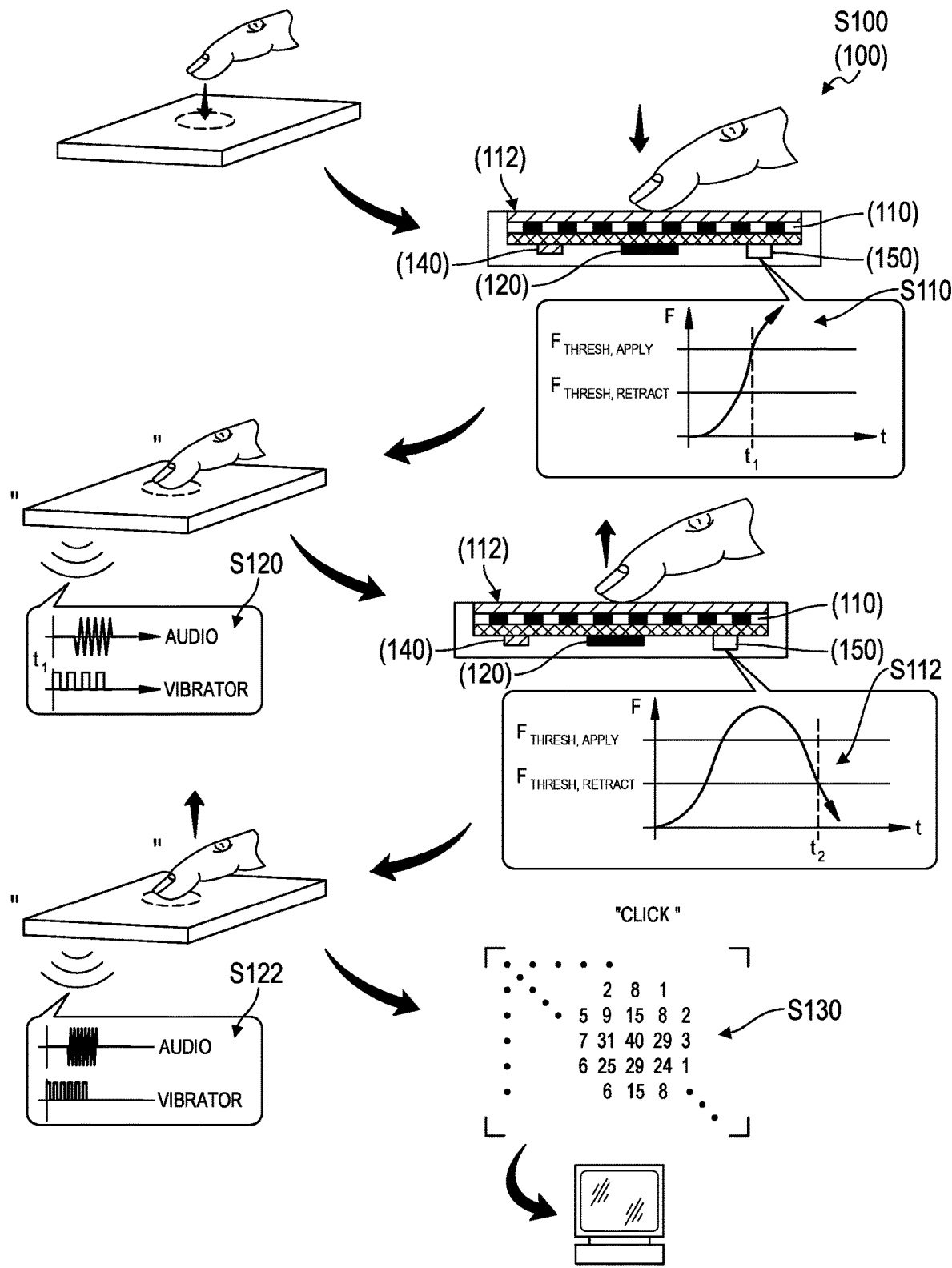
FIGS. 8A and 8B are flowchart representations of variation of the method.

As shown in FIG. 8A, in one variation, the system executes a method S100 for responding to inputs on the touch sensor surface 112, including: at a first time, detecting application of a first input onto a touch sensor surface 112 and a first force magnitude of the first input in Block S110; in response to the first force magnitude exceeding a first threshold magnitude, actuating a vibrator 120 coupled to the touch sensor surface 112 during a first click cycle and triggering an audio driver 140 proximal the touch sensor surface 112 to output a click sound during the first click cycle in Block S120; at a second time succeeding the first time, detecting retraction of the first input from the touch sensor surface 112 and a second force magnitude of the first input in Block S112; and, in response to the second force magnitude falling below a second threshold magnitude less than the first threshold magnitude, actuating the vibrator 120 during a second click cycle distinct from the first click cycle and triggering the audio driver 140 to output the click sound during the second click cycle in Block S122.

1.1 Applications

Generally, the system functions as a human-computer interface device that detects inputs by a (human) user, transforms these inputs into machine-readable commands, communicates these commands to a computing device, and supplies feedback indicating that an input was detected to the user. In particular, the system includes a touch sensor 110 though which inputs are detected, a haptic feedback module (e.g., a speaker and a vibrator 120) through which feedback is supplied to a user, and a controller 150 that outputs commands to a computing device based on inputs detected at the touch sensor 110 and that triggers haptic feedback through the haptic feedback module; and the system can execute Blocks of the method to detect and respond to inputs on the touch sensor surface 112.

In one example, the system can define a handheld computer pointing device (or "mouse") that, where connected to a computing device, communicates click events to the computing device in response to touch inputs on touch sensor surface 112 that exceed a threshold force (or pressure) magnitude. In this example, the system can issue audible and vibratory (hereinafter "haptic") feedback to a user in response to such a touch input in order to mimic the auditory and tactile response of a mechanical snap button when depressed and released. In particular, the system can: activate the vibrator 120 and trigger the audio driver 140 to output a click sound when an input applied to the touch sensor surface 112 exceeds a first threshold force (or pressure) magnitude in order to replicate a tactile feel and audible sound of a mechanical button being depressed; and then activate the vibrator 120 and trigger the audio driver 140 to output a (lower-frequency) click sound when the same input is lifted to less than a second threshold magnitude—less than the first threshold magnitude—on the touch sensor surface 112 in order to replicate a tactile feel and audible sound of a depressed mechanical button being released. The system can thus provide the user with a tactile impression that a button was depressed and released though the system itself defines a substantially rigid exo-structure with no external moving parts or surfaces (e.g., a button). Furthermore, in this example, the system can include a movement sensor 170 (e.g., an optical or mechanical movement sensor 170), and the controller 150 can output cursor motion vectors or other commands based on movement of the system relative to an adjacent surface detected by the movement sensor 170.

In the foregoing example, the system can also be reconfigurable, such as to function as a remote controller 150 or as a gamepad based on an orientation in which the system is placed on a surface or held in a user's hand. In particular, the system can define a touch sensor surface 112 spanning all or a portion of its length and width, and the controller 150 can map different commands, gestures, and other output types to discrete subregions of the touch sensor surface 112 based on a current function of the system. Furthermore, the system can selectively output haptic (e.g., audible and tactile) feedback in response to inputs on various subregions of the touch sensor surface 112 in various configurations, thereby enabling imitation of multiple combinations and arrangements of mechanical snap buttons in a single device without mechanical modification to the device.

The system is described herein as a standalone human-computer interface component that detects user inputs, provides haptic feedback to the user in response to user inputs, and outputs commands to a connected computing device based on these user inputs. However, the system can alternatively be integrated into a computing device, as described below, or interface with one or more computing devices in any other way.

1.2 Touch Sensor

As shown in FIGS. 1 and 2, the touch sensor 110 includes: an array of sense electrode and drive electrode pairs 116 patterned across a substrate (e.g., a fiberglass PCB); and a force-sensing layer arranged over the substrate in contact with the drive and sense electrode pairs (or "sensels"), defining a force-sensitive material exhibiting variations in local bulk resistance and/or local contact resistance responsive to variations in force applied to a cover layer above. As described in U.S. patent application Ser. No. 14/499,001, the resistive touch sensor 110 can include a grid of interdigitated drive electrodes and sense electrodes patterned across the substrate. The force-sensing layer can span gaps between each drive and sense electrode pair across the substrate such that, when a localized force is applied to the cover layer, the resistance across an adjacent drive and sense electrode pair varies proportionally (e.g., linearly, inversely, quadratically, or otherwise) with the magnitude of the applied force. As described below, the controller 150 can read resistance values across each drive and sense electrode pair within the touch sensor 110 and can transform these resistance values into a position and magnitude of one or more discrete force inputs applied to the cover layer.

In one implementation, the system includes a rigid substrate, such as in the form of a rigid PCB (e.g., a fiberglass PCB) or a PCB on a touch sensor surface 114 (e.g., an aluminum backing plate); and rows and columns of drive and sense electrodes are patterned across the top of the substrate to form an array of sensels. The force-sensing layer is installed over the array of sensels and connected to the substrate about its perimeter.

1.3 Controller

Figure 10A:
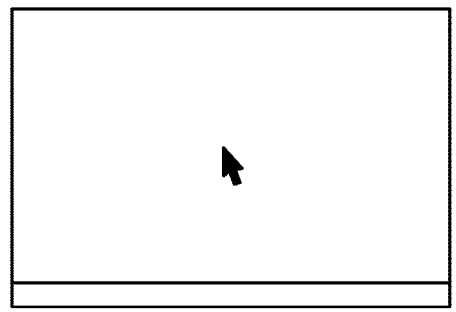
FIGS. 10A-10C are schematic representations of variations of the method.
Figure 10A:
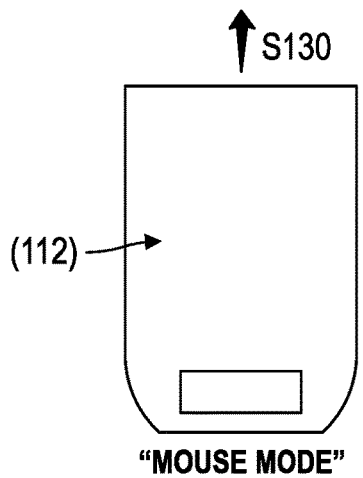
Figure 10B:
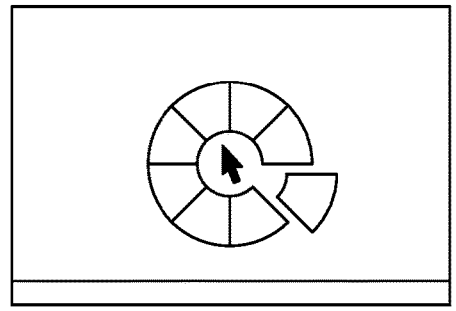
Figure 10B:
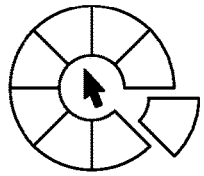

Generally, the controller 150 functions to drive the touch sensor 110, to read resistance values between drive and sense electrodes during a scan cycle, and to transform resistance data from the touch sensor 110 into locations and magnitudes of force inputs over the touch sensor 110 in Blocks S110 and S112. The controller 150 can also function to transform locations and/or magnitudes of forces recorded over two or more scan cycles into a gesture (as shown in FIG. 10B), a cursor motion vector (as shown in FIG. 10A), or other command and to output such command to a connected computing device, such as over a wired or wireless connection. For example, the controller 150 can access preprogrammed command functions stored in memory in the system, such as command functions including a combination of mouse and keyboard values readable by a connected computing device to move a virtual cursor, scroll through a text document, expand a window, or translate and rotate a 2D or 3D virtual graphical resource within a window, etc., as described below.

In one implementation, the controller 150 includes: an array column driver (ACD); a column switching register (CSR); a column driving source (CDS); an array row sensor (ARS); a row switching register (RSR); and an analog to digital converter (ADC); as described in U.S. patent application Ser. No. 14/499,001. In this implementation, the touch sensor 110 can include a variable impedance array (VIA) that defines: interlinked impedance columns (IIC) coupled to the ACD; and interlinked impedance rows (IIR) coupled to the ARS. During a resistance scan period: the ACD can select the IIC through the CSR and electrically drive the IIC with the CDS; the VIA can convey current from the driven IIC to the IIC sensed by the ARS; the ARS can select the IIR within the touch sensor 110 and electrically sense the IIR state through the RSR; and the controller 150 can interpolate sensed current/voltage signals from the ARS to achieve substantially accurate detection of proximity, contact, pressure, and/or spatial location of a discrete force input over the touch sensor 110 for the resistance scan period within a single sampling period.

For example, a row of drive electrodes in the touch sensor 110 can be connected in series, and a column of sense electrodes in the resistive touch sensor 110 can be similarly connected in series. During a sampling period, the controller 150 can: drive a first row of drive electrodes to a reference voltage while floating all other rows of drive electrodes; record a voltage of a first column of sense electrodes while floating all other columns of sense electrodes; record a voltage of a second column of sense electrodes while floating all other columns of sense electrodes; . . . record a voltage of a last column of sense electrodes while floating all other columns of sense electrodes; drive a second row of drive electrodes to the reference voltage while floating all other rows of drive electrodes; record a voltage of the first column of sense electrodes while floating all other columns of sense electrodes; record a voltage of the second column of sense electrodes while floating all other columns of sense electrodes; . . . record a voltage of the last column of sense electrodes while floating all other columns of sense electrodes; . . . and finally drive a last row of drive electrodes to the reference voltage while floating all other rows of drive electrodes; record a voltage of the first column of sense electrodes while floating all other columns of sense electrodes; record a voltage of the second column of sense electrodes while floating all other columns of sense electrodes; . . . record a voltage of the last column of sense electrodes while floating all other columns of sense electrodes in Block S110. The controller 150 can thus sequentially drive rows of drive electrodes in the resistive touch sensor 110; and sequentially read resistance values (e.g., voltages) from columns of sense electrodes in the resistive touch sensor 110 in Block S110.

The controller 150 can therefore scan drive and sense electrode pairs (or "sensels") during a sampling period in Block S110. The controller 150 can then merge resistance values read from the touch sensor 110 during one sampling period into a single touch image representing locations and magnitudes of forces (or pressures) applied across the touch sensor surface 112 in Block S130. The controller 150 can also: identify discrete input areas on the touch sensor surface 112 (e.g., by implementing blob detection to process the touch image); calculate a pressure magnitude on an input area based on total force applied across the input area; identify input types (e.g., finger, stylus, palm, etc.) corresponding to discrete input areas; associate discrete input areas with various commons; and/or label discrete input areas in the touch image with pressure magnitudes, input types, commands, etc. in Block S130. The controller 150 can repeat this process to generate a (labeled) touch image during each sampling period during operation of the system.

1.4 Haptic Feedback Module

Figure 3:
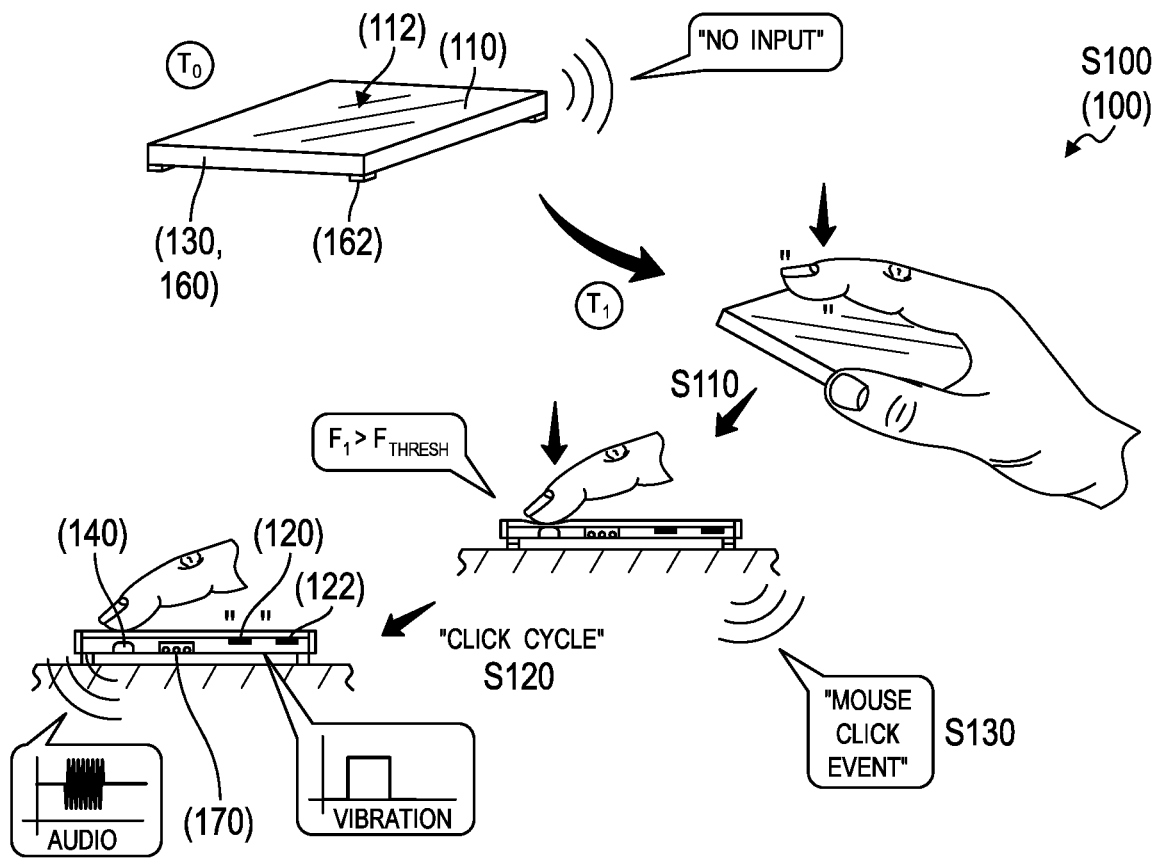
FIG. 3 is a flowchart representation of a method.
Figure 14:
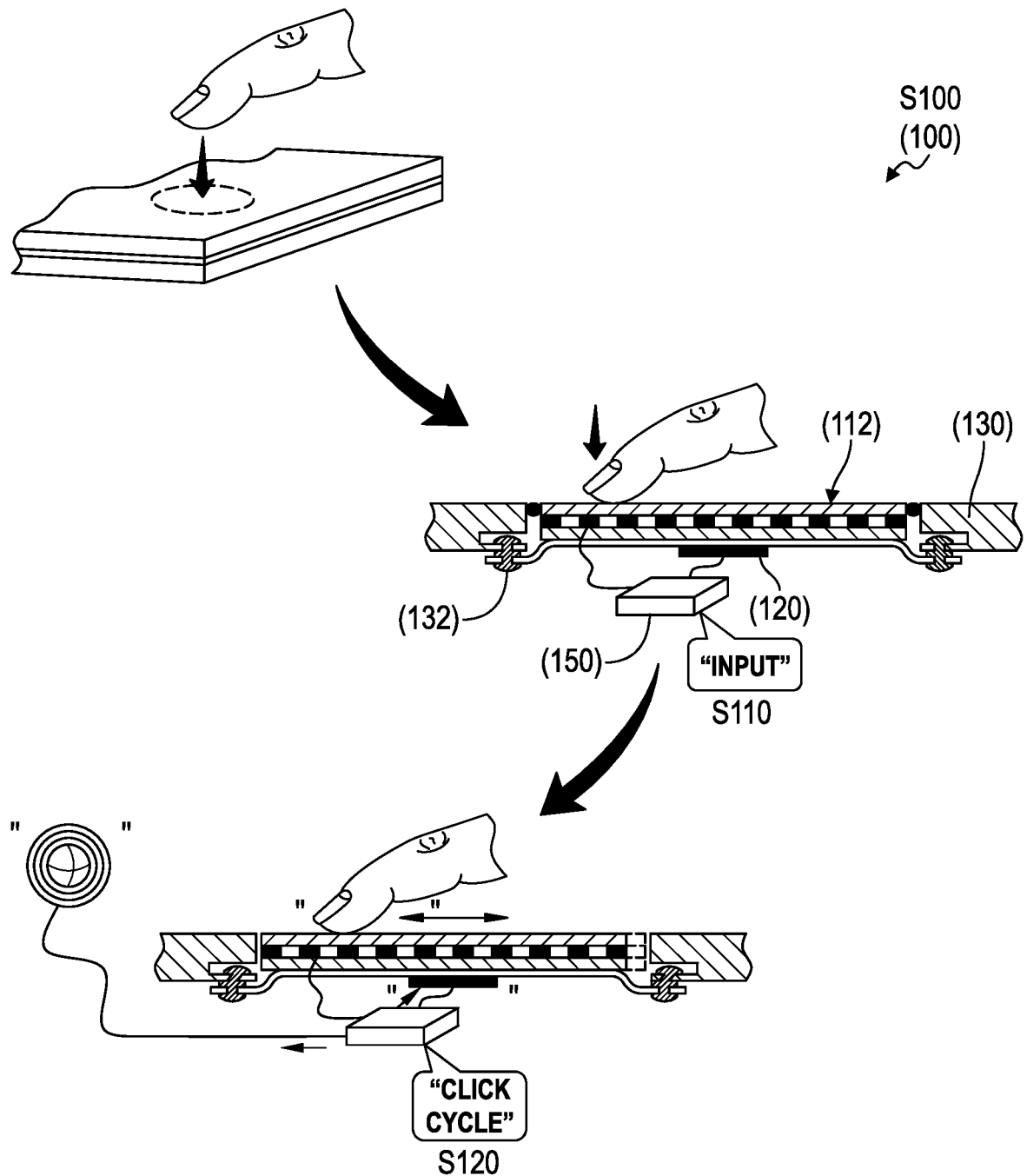
FIG. 14 is a schematic representation of one variation of the method.
Figure 15A:
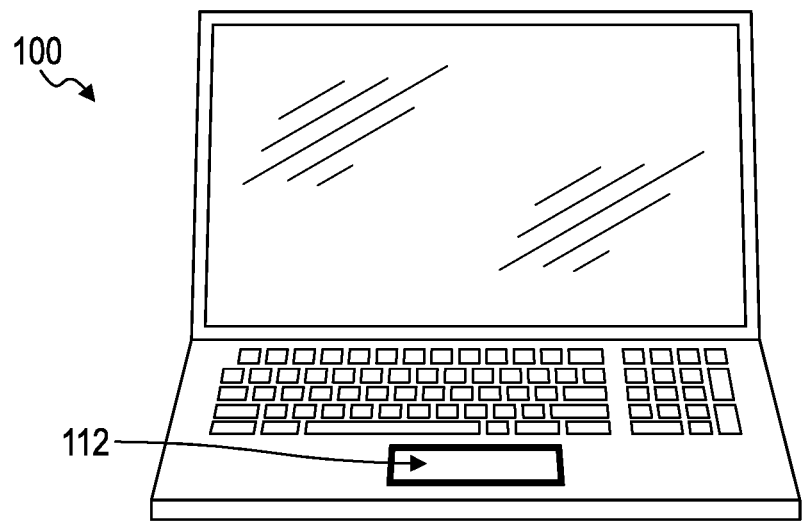
FIGS. 15A-15F are schematic representations of variations of the system.
Figure 15B:
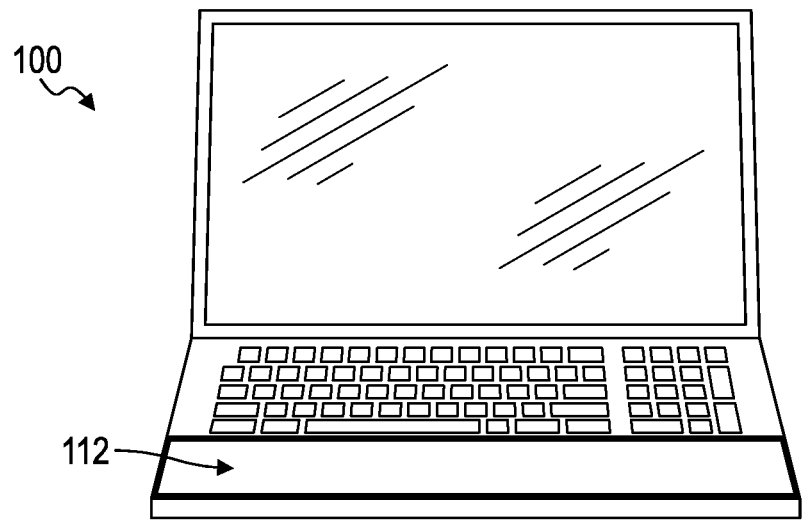
Figure 15C:
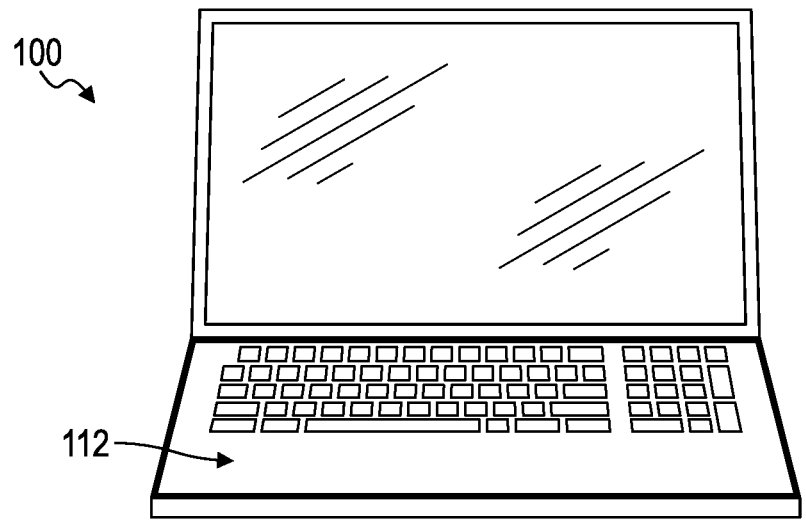
Figure 15D:
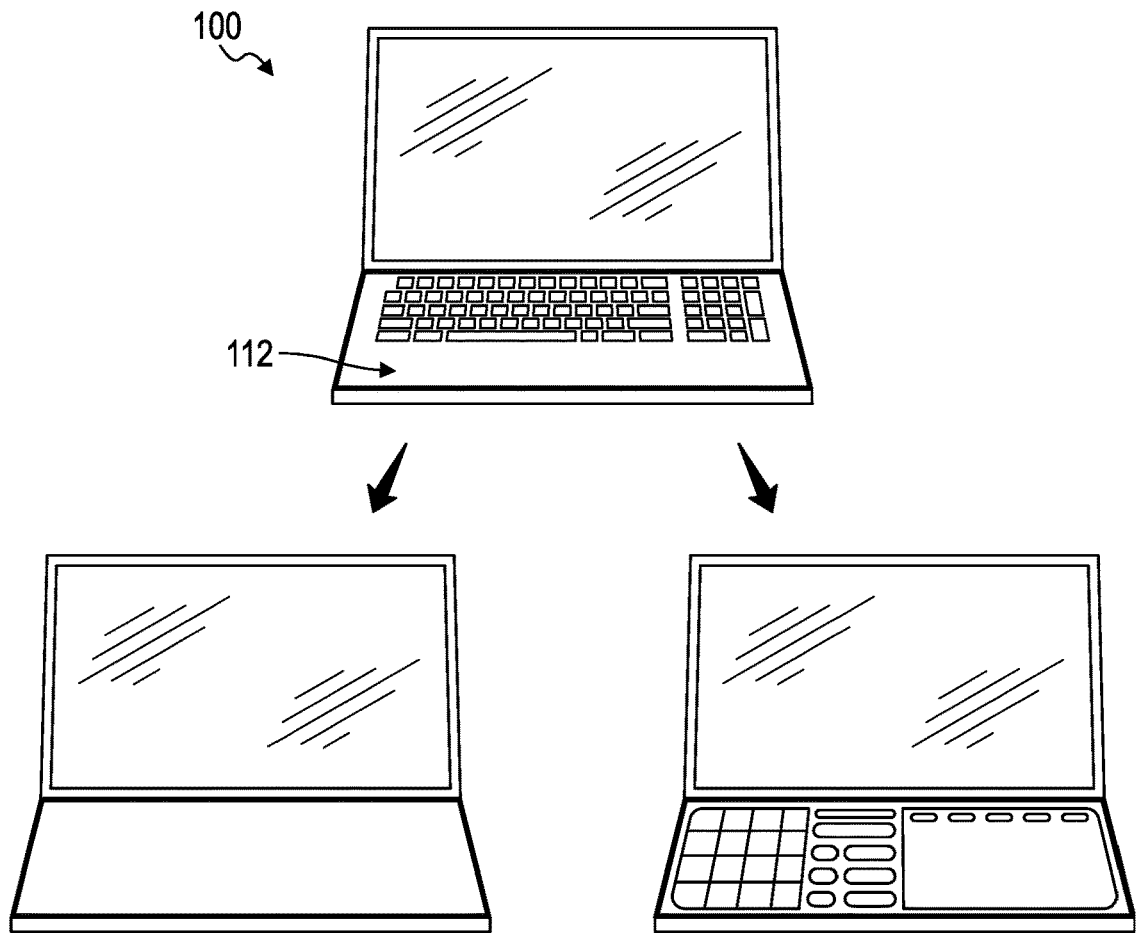
Figure 15E:
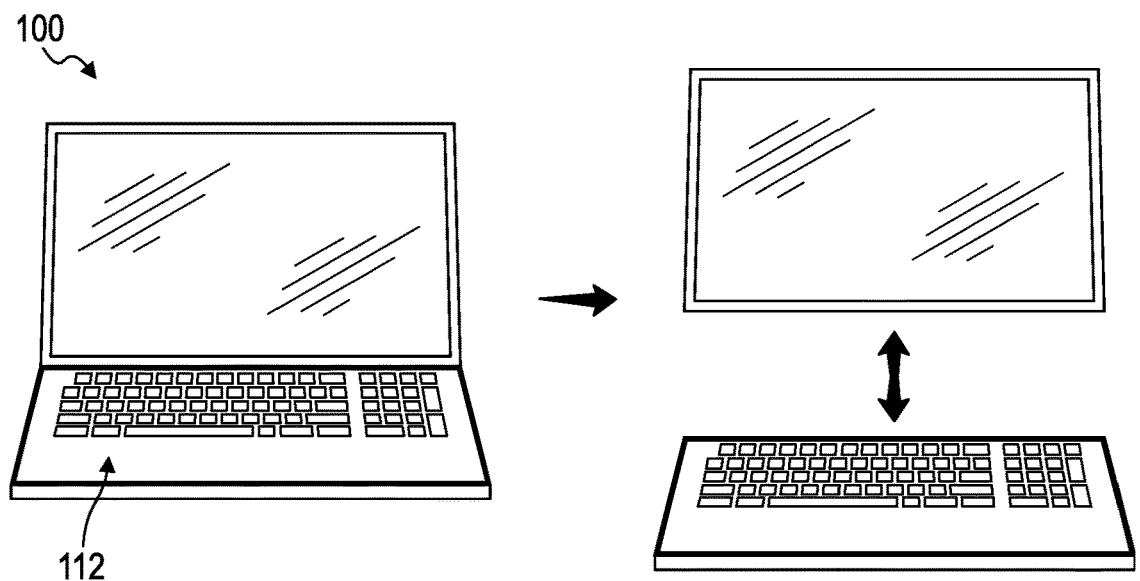
Figure 15F:
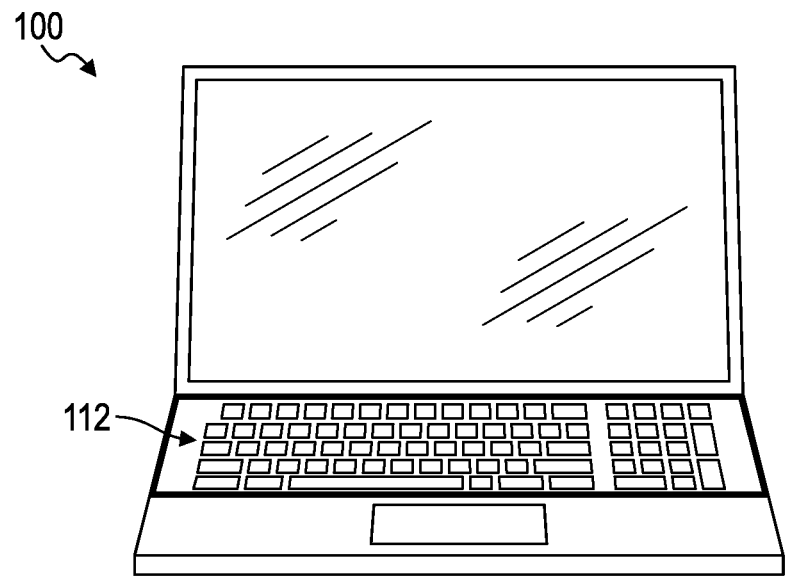

The system includes a haptic feedback module, including a vibrator 120 and a speaker arranged within the housing 160, as shown in FIGS. 1 and 3. Generally, in response to a touch input—on the touch sensor surface 112—that exceeds a threshold force (or a threshold pressure), the controller 150 can simultaneously trigger the vibrator 120 to output a vibratory signal and trigger the speaker to output an audible signal that mimic the feel and sound, respectively, of actuation of a mechanical snap button (hereinafter a "click cycle") in Block S120, as shown in FIG. 14.

The vibrator 120 can include a mass on an oscillating linear actuator, an eccentric mass on a rotary actuator, a mass on an oscillating diaphragm, or any other suitable type of vibratory actuator. The vibrator 120 can exhibit a resonant (e.g., natural) frequency, and the controller 150 can trigger the actuator to oscillate at this resonant frequency during a click cycle. For example, when the system is first powered on, the controller 150 can execute a test routine, including ramping the vibrator 120 from a low frequency to a high frequency, detecting a resonant frequency between the low frequency and the high frequency, and storing this resonant frequency as an operating frequency of the vibrator 120 during the current use session. The vibrator 120 can be arranged within the housing 160 between a bottom of the housing 160 and the touch sensor 110. For example, the touch sensor 110 can include an array of sense electrode and drive electrode pairs 116 patterned across a first side of a PCB, and the vibrator 120 can be installed proximal the center of the opposite side of the PCB.

The haptic feedback module can also include multiple vibrators, such as one vibrator arranged under each half or under each quadrant of the touch sensor surface 112. In this implementation, the controller 150 can actuate all vibrators in the set during a click cycle. Alternatively, the controller 150 can selectively actuate one or a subset of the vibrators during a click cycle, such as a single vibrator 120 nearest the centroid of a newest touch input detected on the touch surface between a current and a last scan cycle. However, the haptic feedback module can include any other number of vibrators in any other configuration and can actuate any other one or more vibrators during a click cycle.

The haptic feedback module also includes a speaker (or buzzer or other audio driver) configured to replace a "click"

sound during a click cycle. In one implementation, the housing 160 also includes: a speaker grill, such as in the form of an open area or perforations across a region of the bottom of the housing 160 opposite the touch sensor surface 112, for which sound output by the speaker is communicated outside of the housing 160; and a set of pads 162 (or "feet") across its bottom surface that function to maintain an offset (e.g., 0.085") gap between the speaker grill and a flat surface on which the system is placed in order to limit muffling of sound output from the speaker by this adjacent surface, as shown in FIGS. 5A and 5B. In particular, the system can include: a housing 160 containing the touch sensor 110, the vibrator 120, the audio driver 140, and the controller 150 and defining a speaker grill adjacent the audio driver 140 and facing opposite the touch sensor surface 112; and one or more pads, each pad extending from the housing 160 opposite the touch sensor surface 112, defining a bearing surface configured to slide across a table surface, and configured to offset the speaker grill above the table surface by a target gap distance. Thus, with the system placed on a substantially flat surface, the speaker and speaker grill can cooperate to output sound that is reflected between the bottom surface of the housing 160 and the adjacent surface; and this sound may disperse laterally and longitudinally outward from the housing 160 such that a user may audibly perceive this sound substantially regardless of his orientation relative to the system. Alternatively, the housing 160 can define one or more speaker grills on it side(s), across its top adjacent the touch sensor surface 112, or in any other position or orientation. Yet alternatively, the haptic feedback module can include a speaker cavity that vibrates with the speaker when the speaker is driven in order to output a "click" sound from the system.

1.5 Haptics

In response to a touch input—on the touch sensor surface 112—that exceeds a threshold force (or pressure) magnitude, the controller 150 drives both the vibrator 120 and the audio driver 140 substantially simultaneously in a "click cycle" in order to both tactilely and audibly mimic actuation of a mechanical snap button, as shown in FIG. 3. For example, in response to such a touch input, the controller 150 can trigger a motor driver to drive the vibrator 120 according to a square wave for a target click duration (e.g., 250 milliseconds) while simultaneously replaying a "click" sound byte through the speaker. During a click cycle, the controller 150 can also lag or lead replay of the click sound byte relative to the vibration routine, such as by +/−50 milliseconds, to achieve a particular haptic response during a click cycle.

Furthermore, during a click cycle, the controller 150 can delay audio output by the speaker by an "onset time" corresponding to a time for the vibrator 120 to reach a peak output power or peak oscillation amplitude and within a maximum time for a human to perceive the audio and vibration components of the click cycle as corresponding to the same event (e.g., several milliseconds) in Block S112. For example, for a vibrator 120 characterized by an onset time of 10 milliseconds, the controller 150 can delay audio output by the speaker by 5-10 milliseconds after the vibrator 120 is triggered during a click cycle. Therefore, when the controller 150 detects application of a force—that exceeds a first threshold force (or pressure) magnitude—on the touch sensor surface 112 at a first time in Block S110, the controller 150 can: initiate activation of the vibrator 120 at a second time immediately succeeding the first time (e.g., within 50 milliseconds of the first time and during application of the first input on the touch sensor surface 112); and initiate activation of the audio driver 140 at a third time succeeding the second time by a delay duration corresponding to an onset time of the vibrator 120 (e.g., 10 milliseconds) in which the vibrator 120 reaches a minimum oscillation magnitude in Block S120.

As described above, the controller 150 can execute a click cycle in response to a touch input on the touch sensor surface 112 that meets or exceeds one or more preset parameters in Block S120. For example, the controller 150 can initiate a click cycle in response to detection of a touch input on the touch sensor surface 112 that exceeds a threshold force or pressure corresponding to a common force or pressure needed to depress a mechanical mouse button (or a mechanical trackpad button or snapdome, as described below). Therefore, the controller 150 can compare pressures of detected touch inputs on the touch sensor surface 112 to a preset static force or pressure threshold to identify or characterize an input.

Alternatively, the controller 150 can implement a user-customized pressure threshold, such as based on a user preference for greater input sensitivity (corresponding to a lower pressure threshold) or based on a user preference for lower input sensitivity (corresponding to a greater pressure threshold) set through a graphical user interface executing on a computing device connected to the system. In another example, the controller 150 can segment the touch sensor surface 112 into two or more active and/or inactive regions, such as based on a current mode or orientation of the system, as described below, and the controller 150 can discard an input on an inactive region of the touch sensor surface 112 but initiate a click cycle when a touch input of sufficient magnitude is detected within an active region of the touch sensor surface 112.

In this implementation, the controller 150 can additionally or alternatively assign unique threshold force (or pressure) magnitudes to discrete regions of the touch sensor surface 112 and selectively execute click cycles through a common haptic feedback module response to application of forces (or pressures)—on various regions of the touch sensor surface 112—that exceed assigned threshold magnitudes. For example, the controller 150 can: assign a first threshold magnitude to a left-click region of the touch sensor surface 112; and assign a second threshold magnitude—greater than the first threshold magnitude in order to reject aberrant right-clicks on the touch sensor surface 112—to a right-click region of the touch sensor surface 112. In this example, the controller 150 can also: assign a third threshold magnitude to a center scroll region of the touch sensor surface 112, wherein the third threshold magnitude is greater than the first threshold magnitude in order to reject aberrant scroll inputs on the touch sensor surface 112; but also link the center scroll region to a fourth threshold magnitude for persisting a scroll event, wherein the fourth threshold magnitude is less than the first threshold magnitude.

1.6 Standard Click and Deep Click

Figure 8B:
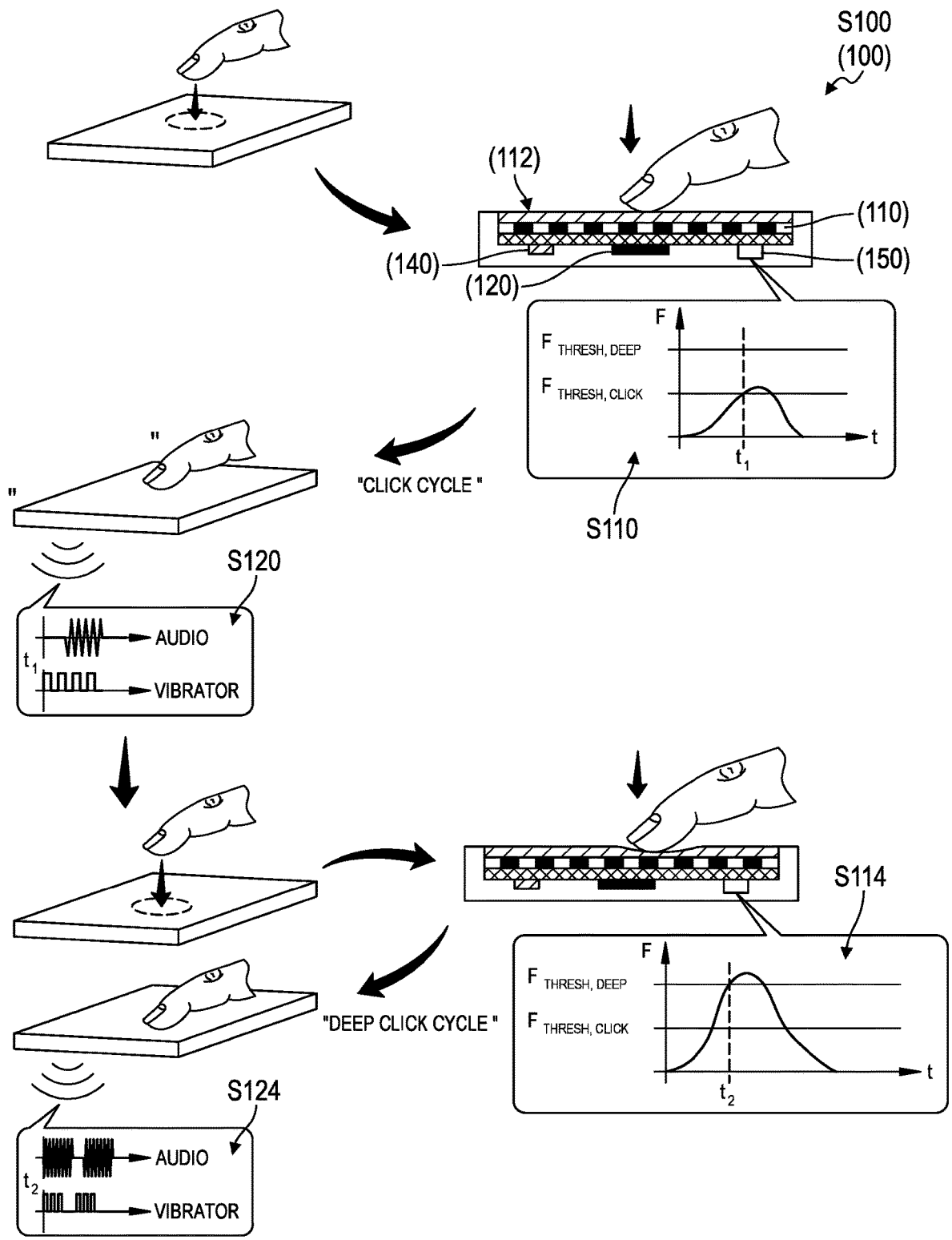
Figure 10C:
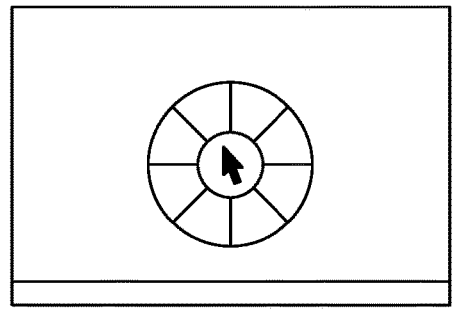
Figure 10C:
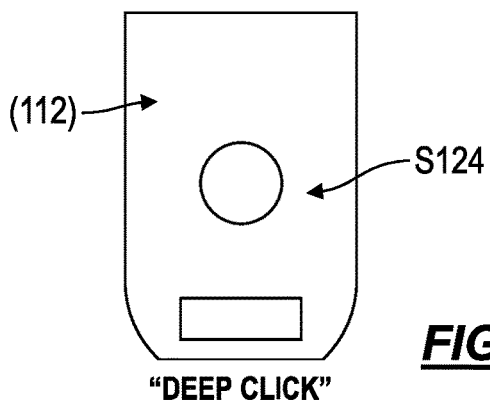

In one variation, the controller 150: executes a "standard click cycle" in Blocks S110 and S120 in response to application of a force that exceeds a first force magnitude and that remains less than a second force threshold (hereinafter a "standard click input"); and executes a "deep click cycle" in Blocks S114 and S124 in response to application of a force that exceeds the second force threshold (hereinafter a "deep click input"), such as shown in FIGS. 8B and 10C. In this variation, during a deep click cycle, the controller 150 can drive the vibrator 120 for an extended duration (e.g., 750 milliseconds) in order to tactilely indicate to a user that a deep click input was detected and handled. The controller 150 can also deactivate the speaker or drive the speaker over an extended duration of time during a deep click cycle. In one example, the controller 150 can output a left-click mouse control function (or left-click trackpad control function, as described below) in response to a standard click input and can output a right-click mouse control function in response to a deep click input. The system can therefore detect inputs of different force magnitudes on the touch sensor surface 112, assign an input type to an input based on its magnitude, serve different haptic feedback through the vibrator 120 and speaker based on an input's assigned type, and output different control functions based on an input's assigned type.

In one example, the controller 150: detects application of a first input on the touch sensor surface 112 and a first force magnitude of the first input at a first time based on a first change in resistance between a first sense electrode and drive electrode pair below the touch sensor surface 112 in Block S110; executes a first click cycle over a first duration (e.g., a standard click cycle) and labels the first input as of a first input type in response to the first force magnitude falling between the first threshold magnitude and the second threshold magnitude in Block S120. In this example, the controller 150 can also: detect application of a second input onto the touch sensor surface 112 and a second force magnitude of the second input at a second time based on a second change in resistance between a second sense electrode and drive electrode pair below the touch sensor surface 112 in Block S114; and execute a second click cycle over a second duration exceeding the first duration (e.g., a deep click cycle) and label the second input as of a second input type distinct from the first input type in response to the second force magnitude exceeding the second threshold magnitude in Block S124.

In another example, the controller 150 can transition or toggle between input modes in response to a deep click input on the touch sensor surface 112, such as between a first mode in which the controller 150 outputs relative position change commands to move a cursor and a second mode in which the controller 150 outputs absolute position commands defining the location of the cursor within a view window (e.g., over a desktop).

The controller 150 can similarly implement multi-level click cycles, such as to execute three, four, or more click cycles as the detected force magnitude of an input on the touch sensor surface 112 increases. The controller 150 can also output various commands responsive to application of a force on the touch sensor surface 112 that falls within one of multiple preset force magnitude ranges. For example, for an input on a region of the touch sensor surface 112 corresponding to a delete key, as in the variation described below in which the system is integrated into a mobile computing device, the controller 150 can output a command to delete a single symbol, to delete a whole word, to delete a whole sentence, and to delete a whole paragraph as the magnitude of an applied force on the touch sensor surface 112 enters higher, discrete force ranges.

The controller 150 can implement these haptic effects responsive to multiple discrete inputs applied to the touch sensor surface 112 simultaneously or in rapid sequence. For example, when a user places multiple fingers in contact with the touch sensor surface 112, the controller 150 can trigger a click cycle in response to detection of each finger on the touch sensor surface 112, such as within multiple click cycles overlapping based on times that magnitudes of forces applied by each of these fingers exceed a common threshold magnitude (or exceed threshold magnitudes assigned to corresponding regions of the touch sensor surface 112). The controller 150 can implement the foregoing methods and techniques responsive to various force (or pressure) magnitude transitions by each of the user's fingers, such as including "down" click cycles, "up" click cycles, "deep" click cycles, multiple-level click cycles, etc. for each finger in contact with the touch sensor surface 112.

1.7 Hysteresis

In one variation shown in FIG. 8A, the controller 150 implements hysteresis to trigger multiple click cycles during application and retraction of a single force input on the touch sensor surface 112 in Blocks S110, S120, S112, and S122. In particular, in this variation, the controller 150 selectively activates the vibrator 120 and the speaker when a force is both applied to the touch sensor surface 112 and when the force is released from the touch sensor surface 112 in order to tactilely and audibly replicate the feel and sound of a mechanical button being depressed and, later, released. To prevent "bouncing" when application of a force on the touch sensor surface 112 reaches a first threshold magnitude, the controller 150 can execute a single "down" click cycle—suggestive of depression of a mechanical button—for this input until the input is released from the touch sensor surface 112. However, the controller 150 can also execute an "up" click cycle—suggestive of release of a depressed mechanical button—as a force applied by the same input decreases to a second, lower threshold magnitude. Therefore, the controller 150 can implement hysteresis techniques to prevent "bouncing" in haptic responses to the inputs on the touch sensor surface 112, to indicate to a user that a force applied to the touch sensor surface 112 has been registered (i.e., has reached a first threshold magnitude) through haptic feedback, and to indicate to the user that the user's selection has been cleared and force applied to the touch sensor surface 112 has been registered (i.e., the applied force has dropped below a second threshold magnitude) through additional haptic feedback.

For example, the controller 150 can: trigger a "down" click cycle in response to detecting application of an input—on the touch sensor surface 112—of force magnitude that exceeds grams in Blocks S110 and S120; and can trigger an "up" click cycle (e.g., a shorter and higher-frequency variant of the down click cycle) as the input is released from the touch sensor surface 112 and the applied force on the touch sensor surface 112 from this input drops below 60 grams in Blocks S112 and S122. In this example, the controller 150 can execute a "down" click cycle in which the vibrator 120 is driven at greater amplitude and/or greater frequency and in which the speaker outputs a lower-frequency sound than for an "up" click cycle. Therefore, the controller 150 can execute a "down" click cycle that tactilely and audibly replicates depression of a mechanical button, which may require application of a force exceeding a transition force; and the controller 150 can execute an "up" click cycle that tactilely and audibly replicates release of the mechanical button, which may return to its original position only once the applied force on the mechanical button drops significantly below the transition force. Furthermore, contact between a mechanical button and a finger depressing the mechanical button may dampen both the sound and the rate of return of a depressed mechanical button, thereby yielding a faster and lower-pitch "snap down" feel and sound than when the physical button is released. The controller 150 can thus mimic the feel and sound of a mechanical button when depressed by executing a "down" click cycle; the controller 150 can mimic the feel and sound of a depressed mechanical button when released by executing an "up" click cycle responsive to changes in force applied by an object in contact with the touch sensor surface 112 over a period of time.

1.8 Housing

The housing 160 functions to contain and support elements of the system, such as the controller 150, the vibrator 120, the speaker, and the sense and drive electrodes of the touch sensor 110, as shown in FIGS. 1 and 2. As described above, the housing 160 can also define a set of feet 160 (or "pads") that function to support the bottom of the housing 160 over a planar surface on which the system is set upright. In this implementation, each foot can include a compressible or other vibration-damping material that functions to mechanically isolate the system from the adjacent surface, thereby reducing rattle and substantially preserving vibration of the system during a click cycle.

Furthermore, for the system that defines a peripheral human interface device (or "mouse"), each foot can be tipped with a smooth, rigid, and/or relatively low-friction material (e.g., a Teflon film, a nylon bushing) to enable the system—when placed upright on a flat surface—to glide across the surface with relatively minimal resistance. For example, in the foregoing implementation, the housing 160 can define a rectilinear injection-molded opaque polymer structure and can include one closed-cell-foam insert at each corner of the rectangular bottom of the structure. However, the housing 160 can define any other form and can be of any other material.

For the system that defines a peripheral human interface device, the housing 160 can also support one or more movement sensors—such as an LED- or laser-based optical movement sensor 170 or a mechanical movement sensor 170—on its bottom surface opposite the touch sensor surface 112. The controller 150 can sample the movement sensor 170(s) throughout operation (or when in a "mouse mode," as described below) to track relative movement of the system across an adjacent surface. The system can also transform such relative movement in a cursor vector or other command substantially in real-time and transmit this cursor vector or other command to a connected computing device.

1.9 Mouse Gestures

The system can transform an input detected on the touch surface onto one of various commands, such as based on the initial location, final location, speed, force (or pressure) magnitude, etc. of the input on the touch surface in Block S130. For example, the controller 150 can interpret an input on the touch surface as one of various mouse commands, such as right click, left click, center click, scroll, and zoom.

In one implementation in which the system operates in a mouse mode, the controller 150 selectively associates regions of the touch surface with right click, left click, and center click commands. For example, when a user places her palm over the system and rests one finger (e.g., an index finger) in contact with the touch sensor surface 112 proximal the anterior end of the system, as shown in FIG. 3, the controller 150 can interface with the touch sensor 110 to detect this single touch input on the anterior half of the touch sensor surface 112, can assign this input a left click command, and can initiate a click cycle and output a left click command in response to the force magnitude of this input exceeding a threshold force magnitude assigned to this region of the touch sensor surface 112. However, when the user rests two fingers on the anterior half of the touch sensor surface 112 (e.g., an index finger and a middle finger), the controller 150 can interface with the touch sensor 110 to detect both touch inputs, associate a leftmost touch input on the anterior half of the touch sensor surface 112 with a left click command, associate a rightmost touch input on the anterior half of the touch sensor surface 112 with a right click command, and selectively output left click and right click commands in response to force magnitudes of these touch inputs exceeding a common force magnitude threshold or unique force magnitude thresholds assigned to these regions of the touch sensor surface 112. Furthermore, when the user rests three fingers on the touch sensor surface 112 (e.g., an index finger, a middle finger, and a ring finger), the controller 150 can interface with the touch sensor 110 to detect all three touch inputs, associate a leftmost touch input on the anterior half of the touch sensor surface 112 with a left click command, associate a touch input on the anterior half of the touch sensor surface 112 laterally between the leftmost and rightmost touch inputs with a center click or scroll command, associate a rightmost touch input on the anterior half of the touch sensor surface 112 with a right click command, and selectively output left click, center click or scroll, and right click commands in response to force magnitudes of these touch inputs exceeding force magnitude thresholds assigned to these regions of the touch sensor surface 112. The controller 150 can therefore dynamically associate a touch input on the touch sensor surface 112 with different command types, such as based on the number and position of other touch inputs on the touch sensor surface 112. Alternatively, the controller 150 can assign static commands to subregions of the touch sensor surface 112, such as by assigning a left click command to a second (II) quadrant of the touch sensor surface 112 and by assigning a right click command to a first (I) quadrant of the touch sensor surface 112.

Figure 4:
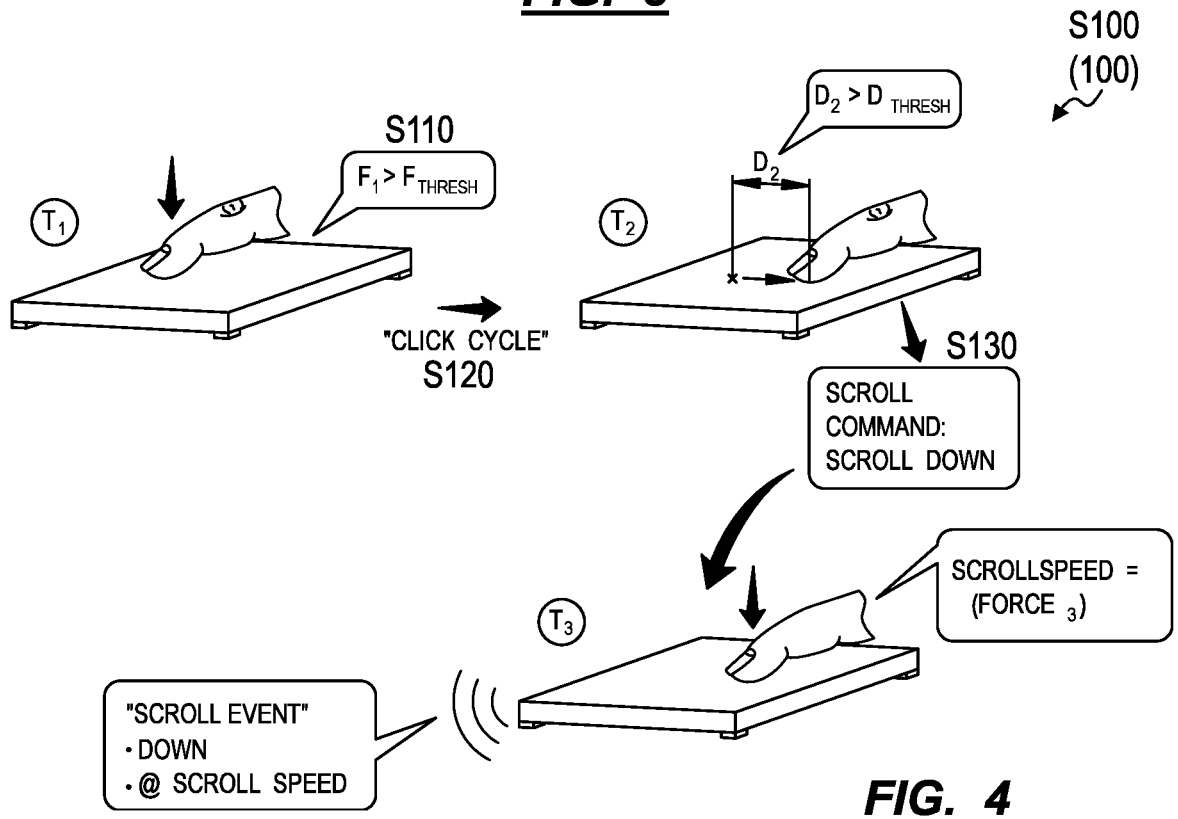
FIG. 4 is a flowchart representation of one variation of the method.
Figure 9A:
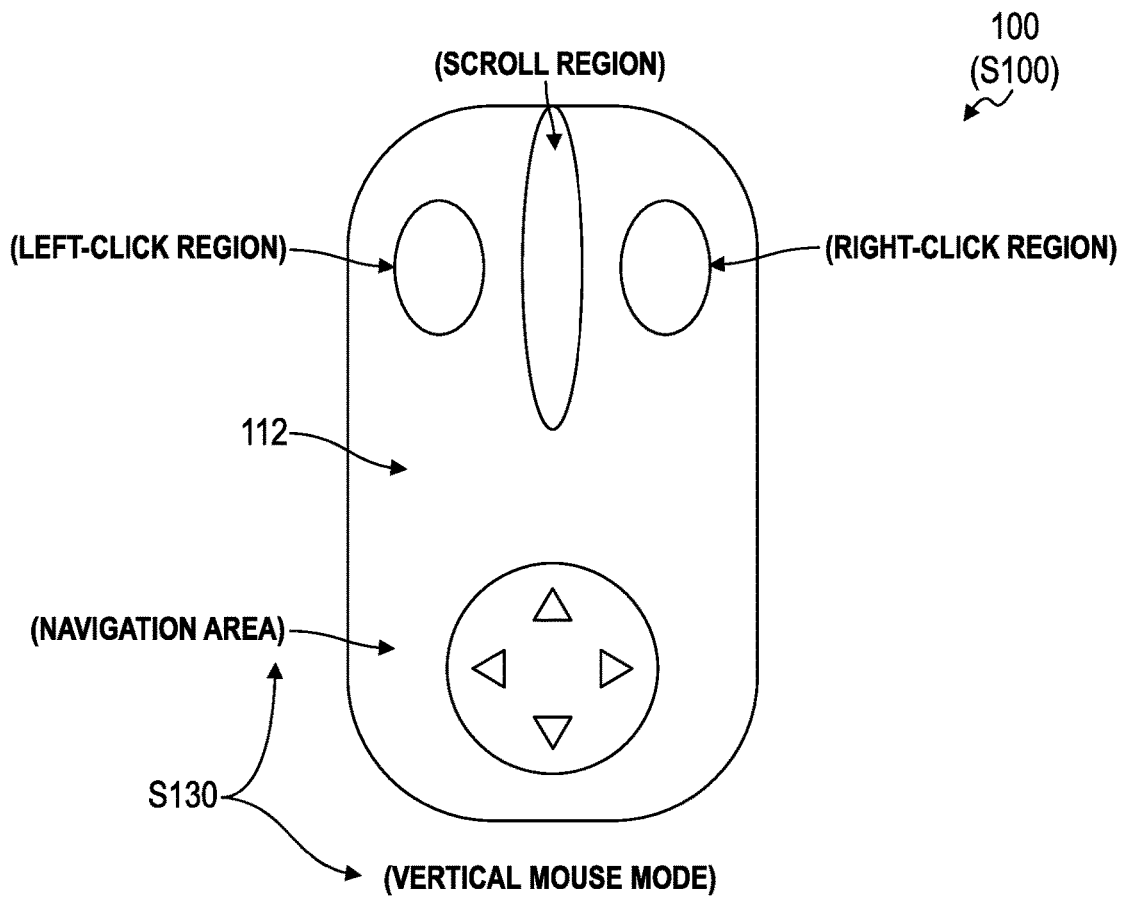
FIGS. 9A and 9B are schematic representations of variations of the system.

In another implementation, the controller 150 interprets touch inputs detected on the touch sensor surface 112 with a scroll command, as shown in FIGS. 4 and 9A. In this implementation, the controller 150: interfaces with the touch sensor 110 to detect a touch input—such as from a user's finger or from a stylus tip—at a first position on the touch sensor surface 112 at a first time; interfaces with the touch sensor 110 to detect transition of the touch input to a second position on the touch sensor surface 112 at a second time; identifies the touch input as a scroll input based on a distance between the first position and the second position exceeding a threshold distance; determines a direction of the scroll input (e.g., left, right, up, down) based on direction of a vector from the first position to the second position; and initiates a scroll command accordingly. (In this implementation, the controller 150 can also confirm the touch input at the first position as an intentional input in response to the touch input exceeding a threshold force or pressure magnitude on the touch sensor surface 112 at the first position.) Subsequently, as the user moves her finger or stylus across the touch sensor surface 112 without breaking contact with the touch sensor surface 112, the controller 150 can output scroll commands including a scroll distance or scroll speed corresponding to a distance traversed from the first (or second) position. However, once a scroll command is thus initiated, the controller 150 can additionally or alternatively output scroll commands including a scroll distance or scroll speed corresponding to a force magnitude of the touch input. For example, once a scroll command—including a scroll direction—is initiated, the controller 150 can output a scroll speed command proportional to the force magnitude of the touch input (up to a maximum scroll speed). The controller 150 can therefore initiate a scroll command based on traversal of a touch input over a region of the touch sensor surface 112 and can then modify the scroll command based on the magnitude of a force with which the user depresses the touch sensor surface 112, thereby enabling the user to modulate a scroll speed when manipulating a document or other resource viewed on a connected computing device by modifying how firmly she depresses the touch sensor surface 112 once a scroll command is initiated, as shown in FIG. 4. The controller 150 can continue to sample the touch sensor 110 and can terminate the scroll command once the touch input is removed from the touch sensor surface 112 (e.g., once a force or pressure magnitude of the touch input falls below a low threshold value).

In another implementation, as a user depresses and rocks (e.g., pitches) a forefinger over the touch sensor surface 112, the controller 150 can: interface with the touch sensor 110 to detect a corresponding touch input characterized by an approximately ovular touch area at a first time; identify a maximum force within the ovular touch area at the first time; and track the location of the ovular touch area and the position of the maximum force within the ovular touch area from the first time to a second time. In this implementation, if the centroid position, orientation, or perimeter geometry, etc. of the ovular touch area changes by less than a threshold value and the position of the maximum force within the ovular touch area changes by more than a threshold distance from the first time to the second time, the controller 150 can interpret this touch input as a scroll command and can initiate a scroll command including a direction corresponding to a direction of a vector from the position of the maximum force at the first time to the position of the maximum force at the second time. With the scroll command thus initiated, the controller 150 can modulate a scroll speed or scroll distance of the scroll command based on a magnitude of an aggregate force across the ovular touch area or based on a magnitude of the maximum force within the ovular touch area.

In another implementation, the controller 150 interprets touch inputs detected on the touch sensor surface 112 with a zoom command. In this implementation, the controller 150: interfaces with the touch sensor 110 to detect a first touch input and a second touch input—such as from a user's thumb and index finger—at a first position and at a second position, respectively, on the touch sensor surface 112 at a first time; interfaces with the touch sensor 110 to detect transition of the first touch input to a third position and transition of the second touch input to a fourth position on the touch sensor surface 112 at a second time; identifies the touch inputs as a zoom input based on difference between a first length between the first and second positions and a second length between the third and fourth positions differing by more than a threshold distance or proportion; determines a direction of the zoom input (e.g., zoom in, zoom out) based on whether the first distance exceeds the second distance (e.g., zoom in if the first distance exceeds the second distance and zoom out if the second distance exceeds the first distance); and initiates a zoom command accordingly. (In this implementation, the controller 150 can also confirm the touch inputs at the first and second positions as an intentional input in response to the one or both of the touch inputs at the first and second positions exceeding a threshold force or pressure magnitude on the touch sensor surface 112.) Subsequently, as the user continues to draw her fingers together or to spread her fingers apart without breaking contact with the touch sensor surface 112, the controller 150 can output zoom commands including a zoom direction, zoom distance, and/or zoom speed corresponding to a change in distance between the user's fingers from the first (or second) length. However, once a zoom command is thus initiated, the controller 150 can additionally or alternatively output zoom commands including a zoom distance or zoom speed corresponding to a force magnitude of the touch inputs. For example, once a zoom command—including a zoom direction—is initiated, the controller 150 can output a zoom speed command proportional to the force magnitude of one or both touch inputs (up to a maximum zoom speed) on the touch sensor surface 112. The controller 150 can therefore initiate a zoom command based on traversal of two touch inputs over a region of the touch sensor surface 112 and can then modify this zoom command based on the magnitude of a force with which the user depresses the touch sensor surface 112, thereby enabling the user to modulate a zoom speed when manipulating a document or other resource viewed on a connected computing device by modifying how firmly she depresses the touch sensor surface 112 once a zoom command is initiated, as shown in FIG. 8B. The controller 150 can continue to sample the touch sensor 110 and can terminate the zoom command once the touch inputs are removed from the touch sensor surface 112.

The controller 150 can also define cursor vectors—and output these cursor vectors to a connected computing device—based on inputs on the touch sensor surface 112. For example, in response to depression of the touch sensor surface 112 along the anterior edge of the touch sensor surface 112, the controller 150 can lock an output cursor vector to a vertical axis. Similarly, in response to depression of the touch sensor surface 112 along the left or right edge of the touch sensor surface 112, the controller 150 can lock an output cursor vector to a horizontal axis. The controller 150 can also lock an output cursor vector along a 45° vector and along a 135° vector in response to depression of the touch sensor surface 112 at the anterior-right and anterior-left corners, respectively.

Furthermore, the controller 150 can selectively activate and deactivate cursor control in select regions of the touch sensor surface 112. For example, the controller 150 can interpret touch inputs on the anterior half of the touch sensor surface 112 as selection (e.g., "click"), scroll, and zoom commands but can deactivate cursor vector control in this region, thereby enabling a user to select a virtual object, access virtual menus, scroll through a virtual resource, or zoom into and out of a virtual resource on a connected computing device by touching the anterior half of the touch sensor surface 112. However, in this example, the controller 150 can activate cursor vector control in the posterior half of the touch sensor surface 112, thereby enabling a user to control the position of a cursor within a graphical user interface on a connected computing device by both moving the system relative to an adjacent surface and by drawing a finger, stylus, or other implement across the posterior half of the touch sensor surface 112. In this example, the controller 150 can apply a first scale (e.g., 1:1, or a relatively high positional sensitivity) to movements of the system relative to an adjacent surface and can apply a second scale (e.g., 1:5, or a relatively low positional sensitivity) to changes in touch input positions on the posterior half of the touch sensor surface 112 in order to generate a composite cursor vector. The controller 150 can therefore enable a user to quickly move a cursor over relatively large virtual distances within a graphical user interface by moving the system relative to an adjacent surface, and the controller 150 can also enable the user to achieve a relatively high degree of cursor position control by drawing a finger, stylus, or other implement over the posterior end of the touch sensor surface 112.

However, the controller 150 can segment regions of the touch sensor surface 112 according to any other static or dynamic schedule and can associate these regions with any other command or function in Block S130

1.10 Context-Aware Gestures

Figure 9B:
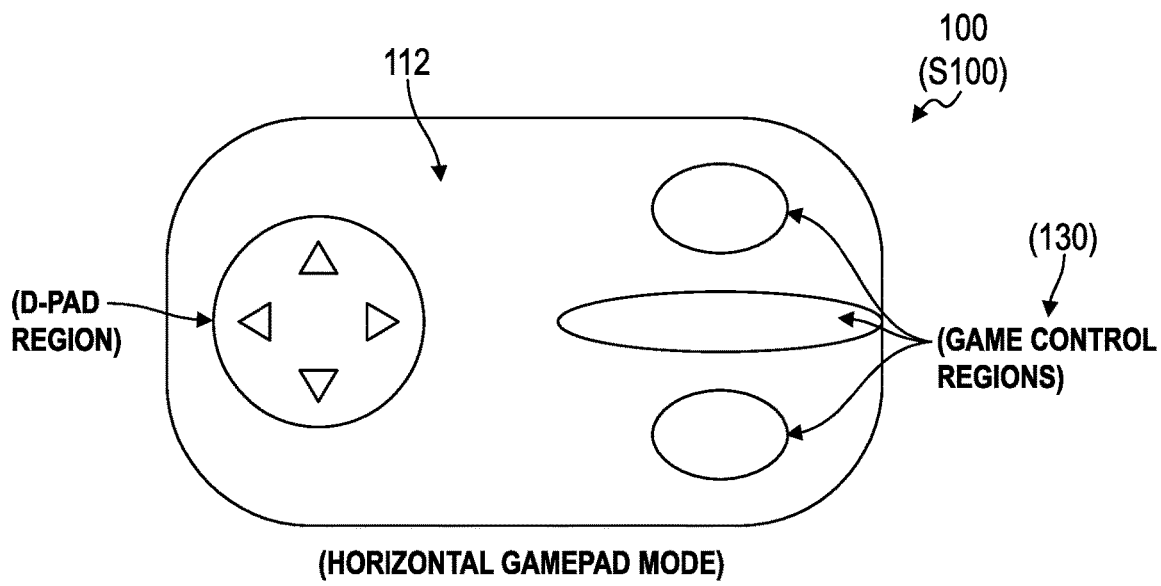

In one variation, the system selectively operates two or mode modes, such as a mouse mode, a remote controller 150 mode, and a gamepad mode, as shown in FIGS. 9A and 9B. In one implementation, the system operates in a mouse mode—and implements methods and techniques as described above—when the movement sensor 170 detects an adjacent surface, such as a surface that does not change in depth from the bottom of the housing 160 by more than a threshold distance per unit time. In this implementation, the system can also exit the mouse mode and can prepare to enter either of a remote controller 150 mode or a gaming controller 150 mode when the movement sensor 170 detects that an adjacent surface is not present or detects variations in proximity of an adjacent surface by more than the threshold distance per unit time.

The system can also include an accelerometer, gyroscope, magnetometer, or other motion sensor and can enter select modes based on outputs of the motion sensor. For example, the system can enter and remain in the mouse mode if outputs of the motion sensor indicate that the system is in an upright orientation (or within an upright orientation range, such as +/−10° in pitch and roll from a (0°, 0°) pitch and roll orientation). However, if the system is held in a portrait orientation (and if the movement sensor 170 does not detect an adjacent or reliable surface), the system can enter the remote controller 150 mode. Similarly, if the system is held in a landscape orientation (and if the movement sensor 170 does not detect an adjacent or reliable surface), the system can enter the gamepad mode.

Furthermore, if the movement sensor 170 detects an adjacent or reliable surface, the system can selectively enter the remote controller 150 mode and gamepad mode based on positions of touch inputs on the touch sensor surface 112. For example, once the system has transitioned out of the mouse mode, the system can enter the remote controller 150 mode if a single touch input (e.g., a thumb) is detected on the touch sensor surface 112, and the system can enter the gamepad mode if two touch inputs (e.g., two thumbs) are detected on the touch sensor surface 112. However, the system can selectively enter and exit two or more modes based on outputs of any other mechanical, optical, acoustic, or other sensor within the system. The controller 150 can then implement methods and techniques as described above to transform inputs on the touch sensor surface 112 into commands or other functions (e.g., commands predefined and preloaded onto the system) based on the current operational mode of the system.

Alternatively, the system can transition between modes based on one or more touch inputs detected on the touch sensor surface 112. For example, the system: can enter the mouse mode in response to detection of two deep click inputs (described above) on the anterior region of the touch sensor surface 112; can enter the remote controller 150 mode in response to detection of one deep click input proximal the lateral and longitudinal center of the touch sensor surface 112; and can enter the gamepad mode in response to substantially simultaneous detection of one deep click input on the anterior region of the touch sensor surface 112 and one deep click input on the posterior region of the touch sensor surface 112

In one implementation of the game controller 150 mode, the controller 150 can fuse the location and force magnitude of an input on the touch sensor surface 112 into a joystick vector. For example, in the gamepad mode, the controller 150 can designate a subregion (e.g., a circular subregions) of the touch sensor surface 112 as a joystick region. In response to detection of an input within this joystick region, the controller 150 can: calculate a centroid of the touch input area (or identify a point of maximum force input within the touch input area); calculate an angular offset of the touch input area centroid (or point of maximum force input) within a coordinate system centered at the center of the joystick region; and generate a joystick vector including a direction defined by this angular offset and a magnitude corresponding to the maximum, average, or aggregate force magnitude of the touch input. In this example, the controller 150 can also scale the magnitude of the joystick vector based on a distance from the center of the joystick region (e.g., the origin of the coordinate system) to the centroid (or the point of maximum force) of the touch input. The control can thus merge both the position of an touch input and the force (or pressure) magnitude of the touch input into a joystick vector in the gamepad mode and then output this joystick vector to a connected computing device, such as to control a cursor position within a window or to control a first-person viewing position within a gaming interface on the computing device.

1.11 Movable Stylus Surface

In one variation, the system outputs cursor vectors (or cursor position commands, etc.) based on both changes in the position of the system relative to an adjacent surface and changes in the position of a touch input on the touch sensor surface 112. In this variation, the system can include two (or more) movement sensors laterally and/or longitudinally offset across the bottom surface of the housing 160; and the controller 150 can sample each movement sensor 170 throughout operation and track changes in the lateral (e.g., X-axis) position, longitudinal (e.g., Y-axis) position, and yaw (e.g., arcuate position about a Z-axis) of the system during operation based on outputs of these movement sensors. Furthermore, throughout operation, the controller 150 can sample the touch sensor 110 and track a continuous touch input—such as by a finger or stylus—across the touch sensor surface 112. The controller 150 can then: project a change in the position of a touch input between two consecutive sampling periods onto a change in the position of the housing 160—as determined by comparing outputs of the movement sensors—between the same sampling periods in order to determine a global change in the position of the touch input relative to an adjacent surface between the two sampling periods; and output this global position change as a cursor vector (or cursor position command, etc.) to a connected computing device.

In one example of this variation, with the system placed face-up on a flat surface, such as a desk, a user holding a stylus in her right hand may place her right palm on the posterior half of the touch sensor surface 112 and may then draw the tip of the stylus over the anterior half of the touch sensor surface 112. The controller 150 can systematically sample the touch sensor 110, such as at a rate of Hz, and can implement pattern matching, edge detection, object recognition, or other techniques to identify the user's palm and the tip of the stylus in each "frame" read from the touch sensor 110. The controller 150 can then reject the user's palm as an input and instead output cursor vectors based on changes in the position of the stylus on the anterior half of the touch sensor surface 112. However, as the user continues to draw the stylus across the touch sensor surface 112, the user may also move the system relative to the desk below. The controller 150 can thus: track such motion of the system relative to the desk based on outputs of the movement sensors; merge such detected positional changes of the system with changes in the position of the stylus tip on the touch sensor surface 112 occurring over substantially identical periods of time (e.g., eight-millisecond durations between sampling periods) in order to calculate global positional changes of the stylus tip relative to the desk; and output a cursor vector (or other cursor motion command) accordingly. The system may therefore enable a user to draw on a relatively small (e.g., a 1.8" wide by 3.6" long) touch sensor surface 112 while also moving the touch sensor 110 over a larger (e.g., a 24"-square desk) area with a single hand. In particular, the system can merge micro positional changes of the stylus tip relative to the system and macro positional changes of the system relative to the desk in order to calculate a global positional change of the stylus, thereby enabling the user to draw within a relatively large virtual area within an application executing on the connected computing device through a relatively small touch sensor surface 112. For example, the system can enable the user to enter a handwritten line of text 8" wide on a 1.8"-wide touch sensor surface 112 in to a connected computing device or enter lines of a 12"-square sketch in a virtual sketch window via a 1.8" wide by 3.6" long touch sensor surface 112.

1.12 Cover Layer

In one variation, the system includes a cover layer arranged over the touch sensor surface 112. In this variation, the cover layer can define a curvilinear and/or deformable ("e.g., "soft," low durometer) control surface over the (planar) touch sensor 110 and can mechanically communicate inputs on the control surface onto the touch sensor surface 112.

In one implementation, the cover layer includes a foam pad of uniform thickness (e.g., 0.025") and uniform durometer (e.g., Shore 25) faced on a first side in a textile (e.g., fabric, leather) and mounted over the touch sensor 110 on an opposing side. In this implementation, the touch sensor 110 can define a relatively rigid structure (e.g., Shore 80 or greater), and the cover layer can define a relatively supple (e.g., deformable, flexible, elastic, compressible) layer over the touch sensor 110. The textile can thus define a control surface offset above the touch sensor surface 112 by the foam pad, and the foam pad (and the textile) can compress between a finger and the touch sensor surface 112 as a user depresses the control surface with her finger. Because the touch sensor 110 is configured to detect a range of magnitudes of forces applied to the touch sensor surface 112, the touch sensor 110 can detect such input. Also, though the foam pad may disperse the applied force of the user's finger over a greater contact area from the control surface to the touch sensor surface 112, the controller 150 can sum input forces calculated at discrete sensor pixels across the touch sensor 110 to calculate a total force applied to the control surface. The controller 150 can also calculate the centroid of a contiguous cluster of discrete sensor pixels that registered a change in applied force to determine the force center of the input.

In the foregoing implementation, the control layer of the cover layer can also include embossed regions, debossed regions, decals, etc. that define tactile indicators of active regions of the touch sensor 110, inactive regions of the touch sensor 110, functions output by the system in response to inputs on such regions of the control surface, etc.

In another implementation, the cover layer includes a pad of varying thickness faced on a first side in a textile and mounted over the touch sensor 110 on an opposing side. In one example, the pad includes a foam structure of uniform durometer and defining a wedge profile that tapers from a thick section proximal the posterior end of the touch sensor 110 to a thin section proximal the anterior end of the touch sensor 110. In this example, due to the varying thickness of the pad, the pad can communicate a force applied near the posterior end of the control surface into the touch sensor 110 onto a broader area than a force applied near the anterior end of the control surface; the system can thus exhibit greater sensitivity to touch inputs applied to the control surface nearer the anterior end than the posterior end of the control surface. In another example, the pad similarly includes a foam structure or other compressible structure defining a wedge profile that tapers from a thick section proximal the posterior end of the touch sensor 110 to a thin section proximal the anterior end of the touch sensor 110 (e.g., as shown in FIG. 5B). However, in this example, the foam structure can exhibit increasing durometer from its posterior end to its anterior end to compensate for the varying thickness of the pad such that the system exhibits substantially uniform sensitivity to touch inputs across the control surface.

However, the cover layer can define any other uniform thickness or varying thickness over the touch sensor surface 112. For example, the cover layer can define a domed or hemispherical profile over the (planar) touch sensor surface 112. The cover layer can also be faced with any other textile or other material. The system can then implement methods and techniques described above to detect inputs on the control surface—translated onto the touch sensor surface 112 by the cover layer—and to output control functions according to these inputs.

1.13 Mouse Overlays

In one variation, the system defines a standalone touch sensor 110 and physically interfaces with two or more distinct overlays corresponding to different operating modes of the system, as shown in FIGS. 5A, 5B, 6, and 7. In this variation, the system and the overlays can define a human-computer interface "kit."

In one implementation, the kit includes a mouse overlay 164 configured to transiently receive the system and defining a control surface over the touch sensor surface 112, such as a planar, domed, hemispherical, or waveform-profile control surface, as described above. For example, the mouse overlay 164 can define a curvilinear profile tapering from a first thickness proximal its posterior end and tapering to a second, lesser thickness toward its anterior end and sized for cupping inside a user's palm with the user's index and middle fingers extending toward the anterior end of the mouse overlay 164, as shown in FIGS. 5A and 5B. In this example, the mouse overlay 164 can define a control surface that is embossed, debossed, or of varying texture or surface profile (e.g., debossed perimeters around a left-click region, a right-click region, and a scroll wheel region) in order to tactilely indicate various input regions corresponding to different commands associated with the mouse overlay 164.

The mouse overlay 164 can further define a cavity configured to transiently (i.e., removably) engage the system, as shown in FIG. 5B. For example, the mouse overlay 164 can define: a cavity opposite the control surface; and a retention ring or undercut around the perimeter of the cavity configured to retain the system in the cavity when the system is "snapped" into the cavity. Alternatively, the mouse overlay 164 can include one or more magnets adjacent the cavity and configured to magnetically couple to ferrous elements arranged within the housing 160 (or vice versa) to retain the system within the cavity. However, the mouse overlay 164 can include any mechanism or feature configured to transiently retain the system on or within the mouse overlay 164.

Furthermore, the mouse overlay 164 can include integrated slip feet vertically offset below the cavity. With the mouse overlay 164 and system assembled, the integrated slip feet can set and maintain a gap between the movement sensor 170 on the bottom of the system and a surface on which the assembly is placed and manipulated. As described above, each integrated slip foot can be tipped with a smooth, rigid, and/or relatively low-friction material to enable the assembly to glide across an adjacent planar surface with relatively minimal resistance. Each integrated slip foot can also include a compressible (e.g., foam) structure configured to mechanically isolate the assembly from the adjacent planar surface, as described above.

Therefore, in this implementation, the overlay 164: can define a three-dimensional ergonomic mouse form; can be configured to transiently install over the touch sensor surface 112; and can include an elastic material configured to communicate a force applied to the overlay 164 surface downward onto the touch sensor surface 112.

In another implementation, the kit includes a remote controller 150 overlay 164, as shown in FIG. 7. The remote controller overlay can define a rectilinear or curvilinear profile sized for grasping—in a user's palm—in a portrait orientation with the user's thumb extending over the control surface toward the anterior end of the remote controller overlay. The remote controller overlay can also define a control surface embossed, debossed, or otherwise tactilely or visually labeled with indicators for regions corresponding to different input types, such as: volume UP and volume DOWN regions; left, right, up, and down scroll regions; a pause/play region; and/or a select region. Like the mouse overlay 164, the remote controller overlay can further define a cavity configured to transiently receive the system. Alternatively, the remote controller overlay can include a film configured for application over the touch sensor surface 112. For example, the remote controller overlay can include: a silicone film with embossed, debossed, and/or ink-labeled areas delineating corresponding command types; and an adhesive backing configured to transiently adhere the silicone film to the touch sensor surface 112 of the system.

The kit can further include a gamepad overlay that similarly defines a planar or curvilinear profile sized for grasping between a user's two hands in a landscape orientation with the user's thumbs extending over the control surface toward the left or right side of the gamepad overlay, as shown in FIG. 6. The gamepad overlay can define a control surface embossed, debossed, or otherwise including tactile or visual indicators for regions corresponding to different commands, such as: a right and left analog joystick; a D-pad; a set of face buttons; a set of left and right shoulder buttons; a select/back button; a select/forward button; a menu button, and/or a home button. Like the mouse overlay and the remote controller overlay, the gamepad overlay can define a cavity configured to transiently receive and retain the system. Alternatively, the gamepad overlay can define a film configured to be transiently applied over the touch sensor surface 112, as described above.

The controller 150 can also identify an overlay into which it has been transiently installed and reconfigure its outputs—in response to inputs communicated from the control surface onto the touch sensor surface 112—based on the type of overlay identified. For example: the system can include a set of magnetic field (e.g., Hall-effect) sensors; each overlay in the set can include a unique arrangement of magnets that face the magnetic field sensors when the system is installed in the overlay; and the system can identify an overlay in which it is installed based on outputs of the magnetic field sensors, retrieve a corresponding output configuration stored in local memory in the system, and then output signals—in response to inputs on the control surface—according to this output configuration. In other examples, each overlay can include an integrated circuit encoded with an overlay type; and the system can download the overlay types from a connected overlay over a wired connection or via wireless communication protocol, select an output configuration corresponding to the overlay type, and output signals accordingly until the system is removed from the overlay. Similarly, each overlay can include an integrated circuit encoded with a complete touch sensor output configuration; and the system can download this complete output configuration from a connected overlay via wired or wireless communication protocol and can implement this output configuration accordingly until the system is removed from the overlay.

The system and an overlay in the kit can also define directional features that permit assembly of the system and the overlay in a single orientation. For example, the system can define an extruded rectangular geometry with a notch in the left corner of its posterior end; and the overlay can define an extruded rectangular cavity with a corresponding notch in the left corner of its posterior end that permits the system to be installed in the cavity in only one way. The controller can thus interpret inputs on the control surface of this overlay based on this known orientation of the overlay relative to the system. Alternatively, the system can include one or more sensors (e.g., a Hall effect sensor) that detect the orientation of the system relative to the overlay (e.g., based on detection of a magnetic field from a magnet integrated into the overlay); the control can then populate a command region layout for the touch sensor surface 112 based on this detected orientation of the overlay relative to the system.

2. Integrated Trackpad

Figure 11:
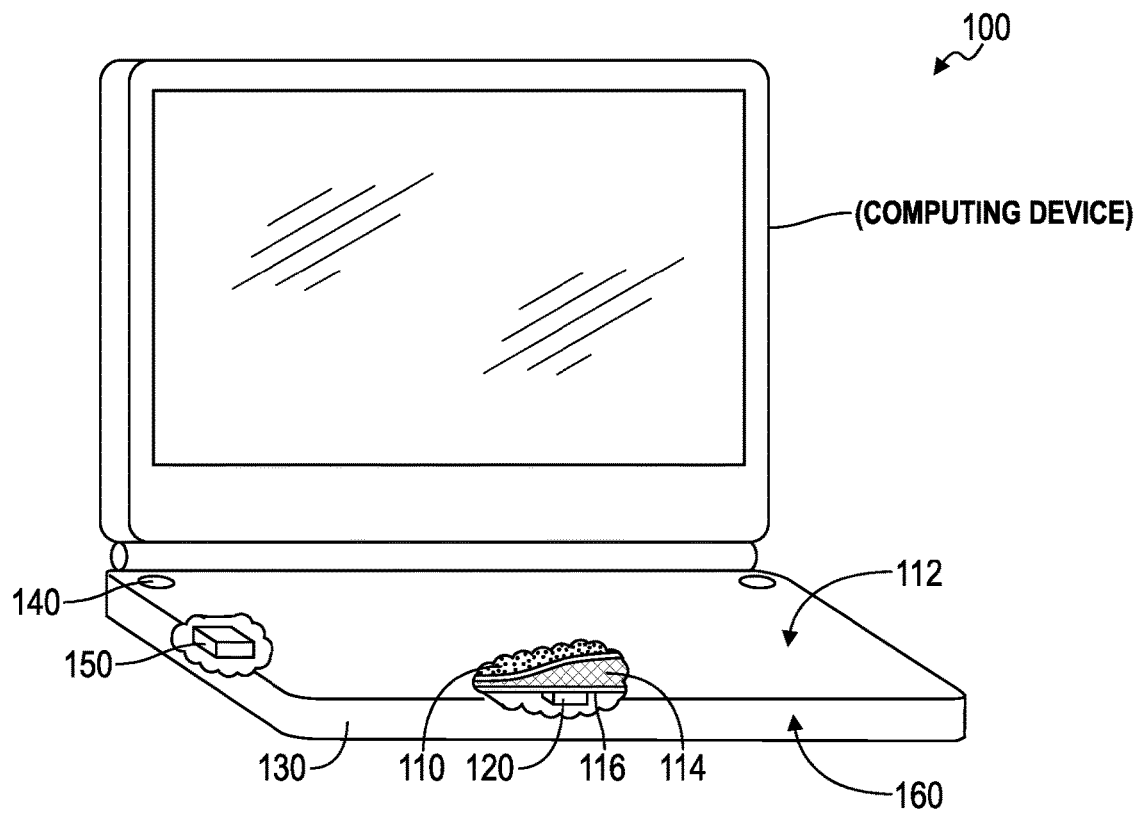
FIG. 11 is a schematic representation of one variation of the system.
Figure 12:
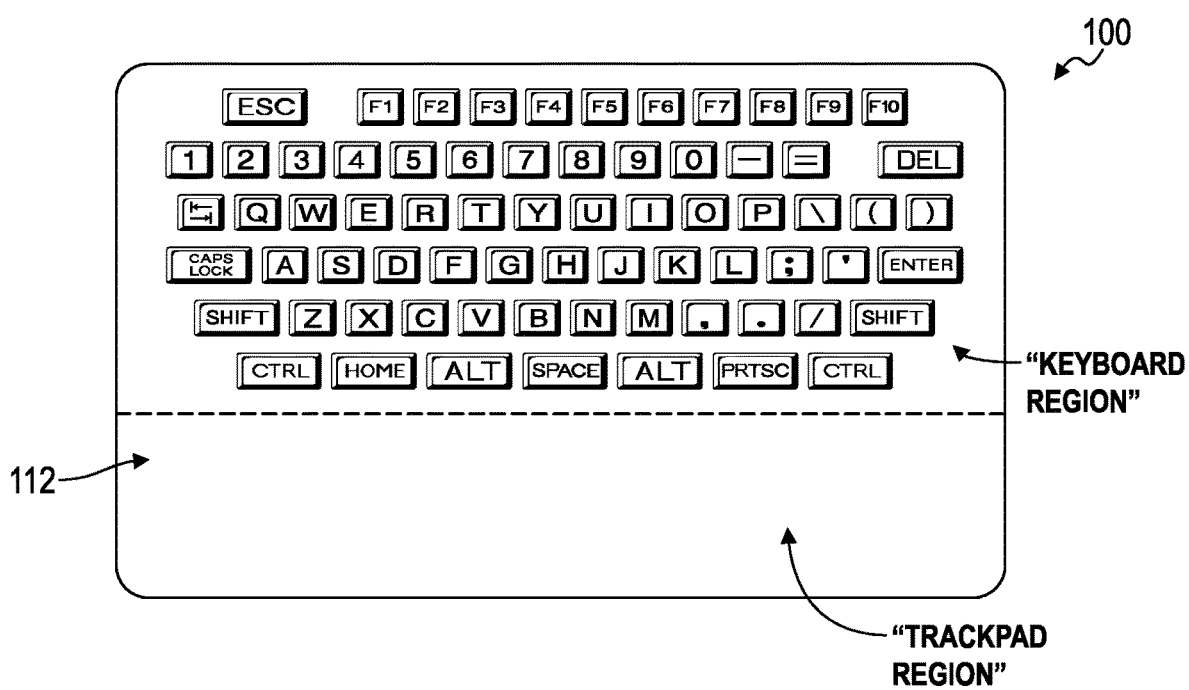
FIG. 12 is a schematic representation of one variation of the system.

As shown in FIG. 11, one variation of the system for human-computer interfacing includes: a touch sensor 110; a coupler 132; a vibrator 120; a speaker (i.e., the audio driver 140); and a controller 150. The touch sensor 110 includes: a substrate; an array of sense electrode and drive electrode pairs 116 patterned across the substrate; and a resistive layer arranged over the substrate, defining a touch sensor surface 112 opposite the substrate, and including a material exhibiting changes in local bulk resistance responsive to variations in magnitude of force applied to the touch sensor surface 112. The coupler 132 is configured to mount the substrate to a chassis 130 of a computing device and to permit movement of the substrate within a vibration plane parallel to a broad planar face of the substrate. The vibrator 120 is configured to vibrate the substrate within the vibration plane during a click cycle. The speaker is configured to replay a click sound during the click cycle. The controller 150 is configured to: trigger the speaker to replay a click and to trigger the vibrator 120 to vibrate the housing 160 during a click cycle in response to application of a force exceeding a threshold force magnitude on the touch surface; and to output a command in response to application of the force exceeding the threshold force magnitude on the touch surface A similar variation of the system for interfacing a computer system and a user includes: a touch sensor 110 comprising a touch sensor surface 114, comprising an array of sense electrode and drive electrode pairs 116 arranged over the touch sensor surface 114, and defining a touch sensor surface 112 extending over the array of sense electrode and drive electrode pairs 116; a vibrator 120 coupled to the touch sensor 110 and configured to oscillate a mass within a plane parallel to the touch sensor surface 112; a chassis 130; a coupler 132 interposed between the touch sensor 110 and the chassis 130 and configured to absorb displacement of the touch sensor 110 relative to the chassis 130 parallel to the touch sensor surface 112 during activation of the vibrator 120; an audio driver 140 coupled to the chassis 130; and a controller 150. In this variation, the controller 150 is configured to: detect application of a first input onto the touch sensor surface 112 and a first force magnitude of the first input at a first time based on a first change in resistance between a first sense electrode and drive electrode pair in the touch sensor 110; execute a first click cycle in response to the first force magnitude exceeding a first threshold magnitude by driving the vibrator 120, the touch sensor 110 within the chassis 130, and triggering the audio driver 140 to output the click sound; and output a first touch image representing a first location and the first force magnitude of the first input on the touch sensor surface 112 at approximately the first time.

2.1 Applications

Generally, in this variation, the system includes elements and implements methods and techniques described above to define an human-computer interface device that detects inputs by a (human) user, transforms these inputs into machine-readable commands, communicates these commands to a computing device, and supplies feedback to the user indicating that an input was detected. In particular, the system includes a touch sensor 110 through which inputs are detected, a haptic feedback module (e.g., a speaker and a vibrator 120) through which feedback is supplied to a user, and a controller 150 that outputs commands to a connected computing device based on inputs detected at the touch sensor 110 and that triggers haptic feedback through the haptic feedback module.

The system can be integrated into a computing device to define a touch sensor surface 112, such as spanning an integrated trackpad and/or an integrated keyboard, as shown in FIGS. 12, 15A, 15B, 15C, 15D, 15E, and 15F. The system detects inputs on the touch sensor surface 112, such as application of a finger or stylus that exceeds a threshold minimum applied force or pressure, and issues audible and vibratory (hereinafter "haptic") feedback to a user in response to such an input in order to mimic the auditory and tactile response of a mechanical snap button that is depressed and released. The system can thus provide a user with an impression that a mechanical button was depressed and released though the system defines a touch sensor surface 112 that is vertically constrained. When integrated into a computing device, such as a laptop computer, the system can output keystrokes, cursor vectors, and/or scroll commands, etc. based on inputs detected on the touch sensor surface 112, and the computing device can execute processes or update a graphic user interface rendered on an integrated display based on such commands received from the system. Alternatively, the system can be integrated into a peripheral device, such as a peripheral keyboard or a peripheral keyboard with integrated trackpad.

The system is described herein as an integrated human-computer interface component that detects user inputs, provides haptic feedback to the user in response to user inputs, and outputs commands to another processing unit or controller 150 within the integrated computing device based on these user inputs. However, the system can alternatively define standalone or peripheral devices that can be connected to and disconnected from a computing device and can, when connected, output commands to the computing device based on inputs detected on the touch sensor surface 112. For example, the system can define a remote controller 150, a game controller 150, a landline phone, a smartphone, or a wearable, etc.

2.2 Integration

In this variation, the system is integrated into a computing device (e.g., rather than defining a peripheral interface device configured to transiently connect to a computing device). In one implementation, the system can function as an integrated trackpad adjacent a keyboard in a laptop computer. In this implementation, the touch sensor surface 112 and the vibrator 120 can be mechanically isolated from a structure of a computing device in order to substantially preserve communication of vibrations through the touch sensor surface 112 during a click cycle. For example, the housing 160—including the vibrator 120 and the sense and drive electrodes and the supporting touch sensor 110—can be isolated on its top, bottom, and/or sides by compressible foam pads that suspend the housing 160 from a casing of the computing device. In another example, the housing 160 can be coupled to the casing of the computing device by fluid-filled dampers. Therefore, in this implementation, the chassis 130 can include a housing 160 of a mobile computing device and define a receptacle 134; and the coupler 132 can locate the touch sensor 110 within the receptacle 134. In this implementation, the system can include an audio driver 140, as described above, arranged in the housing 160 and thus mechanically isolated from the structure of the computing device; the computing device can thus include a primary speaker (or a set of primary speakers) and can include the system that includes a secondary speaker that replays a click sound—independently of the primary speakers—during a click cycle to mimic the sound of an actuated mechanical snap button. Alternatively, in this implementation, the system can exclude a speaker, and the controller 150 can replay a click sound through one or more primary speakers integrated into the computing device.

2.3 Touch Sensor+Controller

In this variation, the touch sensor 110 and controller 150 can include elements and execute functions similar to those above to detect inputs and magnitudes of inputs over the touch sensor surface 112, such as based on changes in resistance between sense electrode and drive electrode pairs in the touch sensor 110.

Furthermore, the controller 150 can be arranged on the substrate of the touch sensor 110 to form a fully contained touch sensor 110 that: receives power from the connected computing device; detects inputs on the touch sensor surface 112; outputs haptic feedback, such as in the form of a mechanical vibration and sound, in response to detected inputs; and outputs commands corresponding to detected inputs on the touch sensor surface 112. Alternatively, all or portions of the controller 150 can be remote from the substrate, such as arranged within the connected computing device and/or physically coextensive with one or more processors with other controllers within the computing device.

2.4 Haptic Feedback Module

In this variation, the system includes a vibrator 120 and a speaker, as described above. For example, the vibrator 120 can include a mass coupled to an oscillating linear actuator that, when activated, oscillates the mass along a single actuation axis. In this example, the vibrator 120 can be coupled to the substrate with the actuation axis of the vibrator 120 parallel to the vibration plane of the system, and the coupler 132 can constrain the substrate in all but one degree of translation substantially parallel to the actuation axis of the vibrator 120. In another example, the vibrator 120 includes an eccentric mass coupled to a rotary actuator that rotates the eccentric mass about an axis of rotation when actuated. In this example, the vibrator 120 can be coupled to the substrate with the axis of rotation of the vibrator 120 perpendicular to the vibration plane of the system, and the coupler 132 can constrain the substrate in all but two degrees of translation normal to the axis of rotation of the vibrator 120. Alternatively, the vibrator 120 can include a mass on an oscillating diaphragm or any other suitable type of vibratory actuator. The vibrator 120 can also include a piezoelectric actuator, a solenoid, an electrostatic motor, a voice coil, or an actuator of any other form or type configured to oscillate a mass.

As described above, the system also includes a speaker (or buzzer or other audio driver 140) configured to output a "click" sound during a click cycle. In this variation, the speaker can be arranged on the substrate and move with the substrate during a click cycle. In this implementation, the resistive layer can include one or more perforations that define a speaker grill over the speaker, and the speaker can output sound through the perforation(s) to a user. Alternatively, the perimeter of the resistive layer can be offset inside a receptacle 134 in the computing device in which the substrate and resistive layer are housed in order to form a gap between the computing device and the resistive layer, and the speaker can output sound that is communicated through this gap to a user. For example, the speaker can be arranged on the substrate opposite the touch sensor surface 112; and the touch sensor surface 112 can define a trackpad surface inset from one or more edges of the receptacle 134 to form a gap configured to pass sounds output by the speaker.

Alternatively, the speaker can be arranged remotely from the substrate. For example, the speaker can define a discrete (e.g., a primary) speaker arranged within the computing device's chassis 130. In these examples, the computing device can thus include a primary speaker (or a set of primary speakers), and the system—integrated into the computing device—can include a secondary speaker that replays a click sound—independently of the primary speakers—during a click cycle to mimic the sound of an actuated mechanical snap button. Alternatively, the speaker can be physically coextensive with the primary speaker of the computing device, and the primary speaker can output both a "click" sound and recorded and live audio (e.g., music, an audio track of a video replayed on the computing device, live audio during a video or voice call) substantially simultaneously.

Furthermore, when an audio system within the computing device is muted by a user, the computing device can mute all audio output from the computing device except "click" sounds in response to inputs on the touch sensor surface 112. Similarly, the computing device can trigger the speaker to output "click" sounds at a constant decibel level (or "loudness") regardless of an audio level set at the computing device in order to maintain a substantially uniform "feel" of an input on the touch sensor surface 112 despite various other functions executed by and settings on the computing device. Therefore, in this implementation in which the speaker is integrated into the computing device (e.g., mounted to the chassis 130 remotely from the touch sensor 110) and defines a primary speaker in the mobile computing device, the controller 150 is configured to trigger the audio driver 140 to output the click sound at a static, preset volume independent of a global volume setting of the mobile computing device.

2.5 Coupler

The coupler 132 is configured to mount the substrate to a chassis 130 of a computing device and to permit movement of the substrate within a vibration plane parallel to a broad planar face of the substrate. Generally, the coupler 132 constrains the substrate against the chassis 130 of a computing device (e.g., a laptop computer) but permits the substrate, the vibrator 120, and the resistive layer to oscillate within a plane substantially parallel to the touch sensor surface 112 during a click cycle.

In one example in which the vibrator 120 oscillates a mass linearly along an X-axis of the system perpendicular to the Z-axis and parallel to the vibration plane, the coupler 132 can (approximately) constrain the substrate in five degrees of freedom, including rotation about any axis and translation along both the Y- and Z-axes of the system, and the coupler 132 can permit the substrate to translate (substantially) only along the X-axis of the system when the vibrator 120 is actuated during a click cycle. In another example in which the vibrator 120 includes an eccentric mass coupled to the output shaft of a rotary actuator and in which the output shaft of the rotatory actuator is normal to the touch sensor surface 112 (i.e., parallel to a Z axis of the system), the coupler 132 can (approximately) constrain the substrate in four degrees of freedom, including rotation about any axis and translation along the Z axis, and the coupler 132 can permit the substrate to translate along X and Y axes of the system (i.e., in a plane parallel to the touch sensor surface 112) when the vibrator 120 is actuated during a click cycle.

In one implementation, the chassis 130 of the computing device defines a receptacle 134 (e.g., a cavity) configured to receive the system, and the coupler 132 functions to locate the substrate and the resistive layer within the receptacle 134. The chassis 130 of the computing device can also define an overhang that extends over and into a receptacle 134 to form an undercut around the cavity, and the coupler 132 can mount the substrate to the underside of the overhang, such as via one or more mechanical fasteners, grommets, or an adhesive.

In one variation, the touch sensor 110 includes a touch sensor surface 114 that extends across the back side of the substrate and that functions to support the substrate against deflection out of the vibration plane, such as due to a downward force applied to the touch sensor surface 112. In this variation, the touch sensor surface 114 can include a fiberglass plate, a metal (e.g., aluminum) plate, a fiber-filled polymer plate, or a plate of any other material and can be bonded to the substrate or fastened to the substrate, such as with a mechanical fastener or grommet, and the touch sensor surface 114 can be coupled or fastened to the computing device chassis 130 to mount the substrate and resistive layer within the receptacle 134.

Alternatively, the substrate can be of a rigid material and/or of a thickness such that the substrate is sufficiently rigid to resist substantial deformation out of the vibration plane when a typical load is applied to the touch sensor surface 112. For example, the substrate can include a 3 mm-thick fiberglass or carbon fiber PCB. The substrate can additionally or alternatively include one or more steel, copper, or aluminum ribs soldered or riveted to the back side of the substrate and spanning the length and/or width of the substrate to improve rigidity of the substrate. The substrate can thus be of a material and geometry and/or can include additional strengthening elements to increase the rigidity of the substrate in the vibration plane but without adding substantial mass to the substrate and resistive layer assembly: in order to improve the responsiveness of the system due to reduced absorption of vibration by the rigid substrate;

and in order to increase the displacement of the substrate and resistive layer assembly per stroke of the vibrator 120 during a click cycle.

2.5.1 Grommets

In one implementation, the coupler 132 mounts the substrate (or the touch sensor surface 114) to the computing device receptacle 134 via elastic grommets (e.g., "vibration-damping snap-in unthreaded spacers"). In one example shown in FIGS. 13D, 13E, 17A, and 17B, the coupler 132 includes one cylindrical grommet—including two necks—inserted into a bore at each corner of the substrate with the upper necks of the grommets engaging their corresponding bores in the substrate. In this example, for each grommet, the coupler 132 also includes a rigid tab, such as a metal or fiberglass tab, including a first bore that engages the lower neck of the grommet and a second bore laterally offset from the first bore and configured to mount to the computing device chassis 130 via a fastener, such as a screw, a nut, or a rivet. In this example, the rigid tabs can also be connected, such as to form a rigid frame that encircles the perimeter of the substrate or in the form of a rigid plate that spans the back side of the substrate. In this example, each grommet includes an enlarged section between the upper and lower necks that vertically offsets the substrate above the tabs (or above the rigid frame, above the rigid plate) and that permits the substrate to move laterally relative to the tabs (or relative to the rigid frame, relative to the rigid plate) while vertically supporting the substrate. In this example, each grommet can be of silicone, rubber, or any other flexible or elastic material and can be characterized by a durometer sufficient to permit lateral deflection of the grommets due to oscillation of the vibrator 120 during a click cycle but to limit compression of the grommets under typical loads, such as when one or two human hands are rested on the touch sensor surface 112 and/or when two hands enter keystrokes (e.g., "type") across the touch sensor surface 112.

Figure 13A:
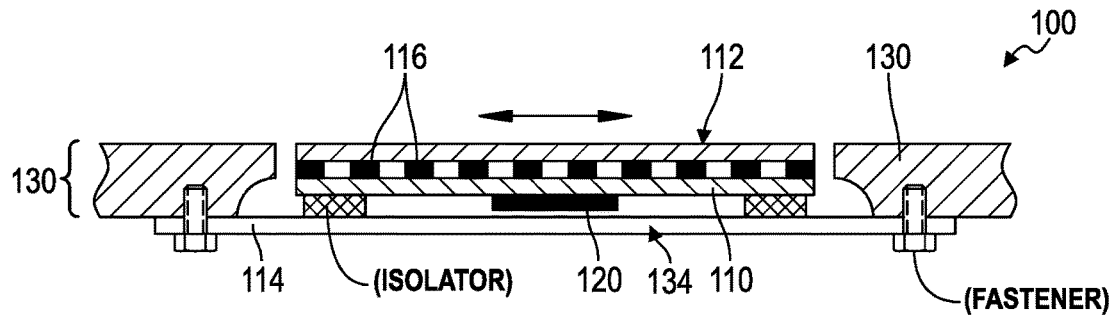
FIGS. 13A-13H are schematic representations of variations of the system.
Figure 13B:
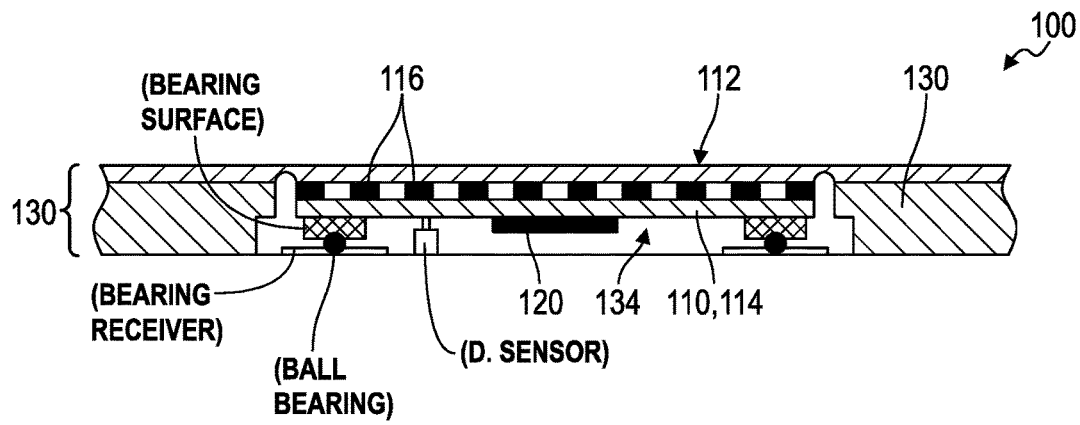
Figure 13C:
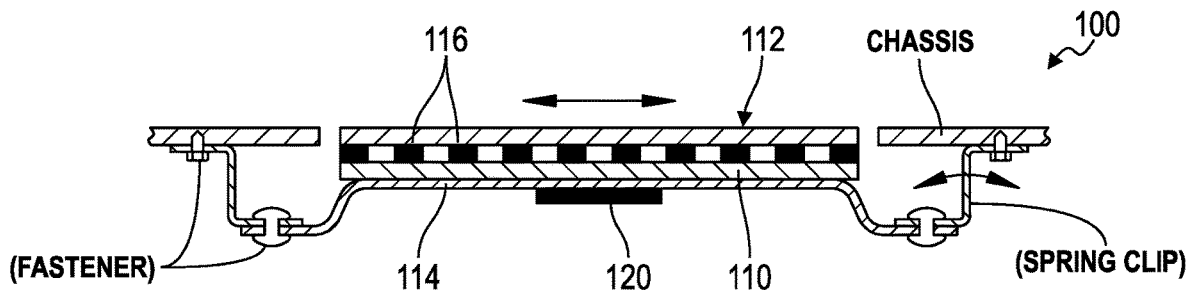
Figure 13D:
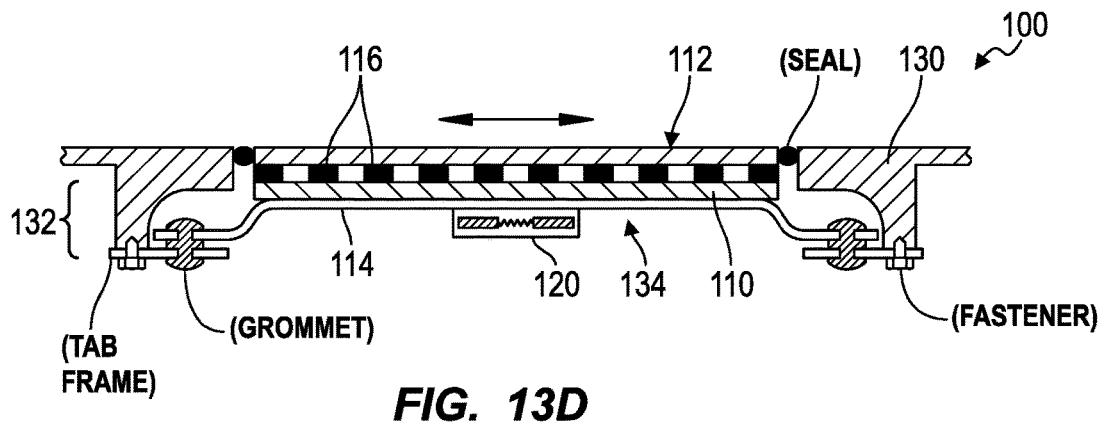
Figure 13E:
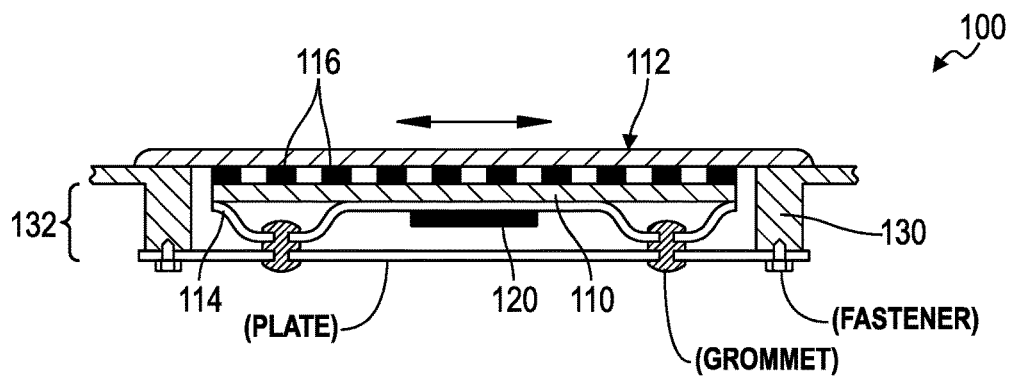
Figure 13F:
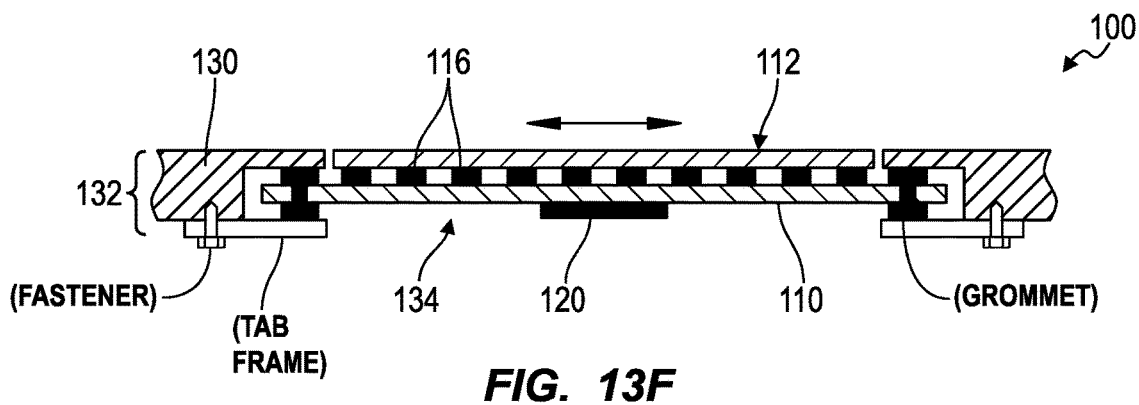

In another example shown in FIG. 13F, the coupler 132 includes one cylindrical grommet—including a single neck—inserted into a bore at each corner of the substrate. In this example, the coupler 132 also includes one rigid tab per grommet or a rigid frame or rigid plate that spans the substrate. The tabs, frame, or plate are installed behind the substrate to constrain the grommets vertically against the computing device chassis 130. During a click cycle, the grommets can thus bend or flex to enable the substrate to move within the vibration plane as the vibrator 120 is actuated. The computing device chassis 130 and/or the tabs, frame, or plate can also include grommet recesses configured to receive ends of the grommets and to locate the grommets laterally and longitudinally within the computing device receptacle 134. Each grommet recess can define a cylindrical recess oversized for the cylindrical grommets to enable the grommets to move both laterally and longitudinally, thereby enabling the substrate to move both laterally and longitudinally within the vibration plane during a click cycle. Similarly, each grommet recess can define an elongated (or "lozenge") recess that enables the grommets to move only laterally (or only longitudinally) within the grommet recesses, thereby enabling the substrate to move laterally (or longitudinally) within the vibration plane during a click cycle.

In this implementation, a grommet can thus define a solid flexible body. Alternatively, a grommet can include a rigid or elastic body and a flexure arranged inside (or outside) of the body. In this implementation, the grommet can couple the substrate (or touch sensor surface 114) to the computing device chassis 130, and the flexure can be configured to move relative to the body to enable the substrate to shift laterally and/or longitudinally relative to the chassis 130. Alternatively, the system can include one or more fluid-filled and/or ribbed grommets that permit greater compression and compliance. For example, the grommet can include a set of internal radial ribs the permit greater deflection in the vibration plane than out of the vibration plane.

Therefore, in this implementation: the vibrator 120 can be coupled to the touch sensor surface 114 of the touch sensor 110 (e.g., proximal a center of the touch sensor 110) and can include a linear actuator configured to oscillate the mass along a vector parallel to the touch sensor surface 112 and parallel to an edge of the touch sensor 110; and the coupler 132 can include a grommet extending from the chassis 130 of the mobile computing device and passing through a mounting bore in the touch sensor surface 114, configured to vertically constrain the touch sensor surface 114 relative to the chassis 130, and exhibiting elasticity in a direction parallel to the touch sensor surface 112. However, in this implementation, the coupler 132 can include any other number of grommets in any other configuration. For example, the coupler 132 can include: three grommets in a triangular configuration; four grommets in a square configuration with one grommet in each corner of the substrate or touch sensor surface 114; or six grommets with one grommet in each corner of the substrate (or in the touch sensor surface 114) and one grommet centered along each long side of the substrate (or along each long side of the touch sensor surface 114). The system can thus define a complete human-computer interface subsystem that can be installed in a computing device receptacle 134 with a limited number of fasteners or with an adhesive.

2.5.2 Isolators

In another implementation shown in FIG. 13A, the coupler 132 includes elastic isolators bonded to the back side of the substrate (or to the back side of the touch sensor surface 114) and to a surface within the computing device receptacle 134. In one example, the coupler 132 includes a set of (e.g., four) silicone buttons bonded to the back side of the touch sensor surface 114 on one side and bonded to the bottom of the computing device receptacle 134. In this example, the silicone buttons can be in compression when a force is applied to the touch sensor surface 112; the silicone buttons can therefore define a geometry and a modulus of elasticity sufficient to substantially resist compression when a force is applied to the touch sensor surface 112 but to also enable the substrate to translate in the vibration plan during a click cycle. Alternatively, in this implementation, the coupler 132 can include elastic isolators bonded to the top of the substrate (or to the top of the touch sensor surface 114) and bonded to the underside of the top of the C-side of the computing device extending into the computing device receptacle 134, and the elastic isolators can suspend the substrate within the receptacle 134.

2.5.3 Spring Clips

In another implementation shown in FIG. 13C, the coupler 132 includes a set of spring clips that couple the substrate (or the touch sensor surface 114) to the computing device chassis 130. In one example, the coupler 132 includes a set of (e.g., four) spring clips in spring steel and that each define a substantially vertical section interposed between two substantially horizontal tabs to form a Z-section or a C-section. In this example, the upper tab of each spring tab is fixed (e.g., riveted) to the chassis 130 of the computing device, and the lower tab of each spring tab is similarly fixed to one corner of the substrate with the broad faces of all center sections in the set of spring clips in parallel. In this example, the spring clips can be in tension and can suspend the substrate from the chassis 130 but can lozenge to permit the substrate to move along a single axis in the vibration plane.

2.5.4 Foam Wrap

Figure 13G:
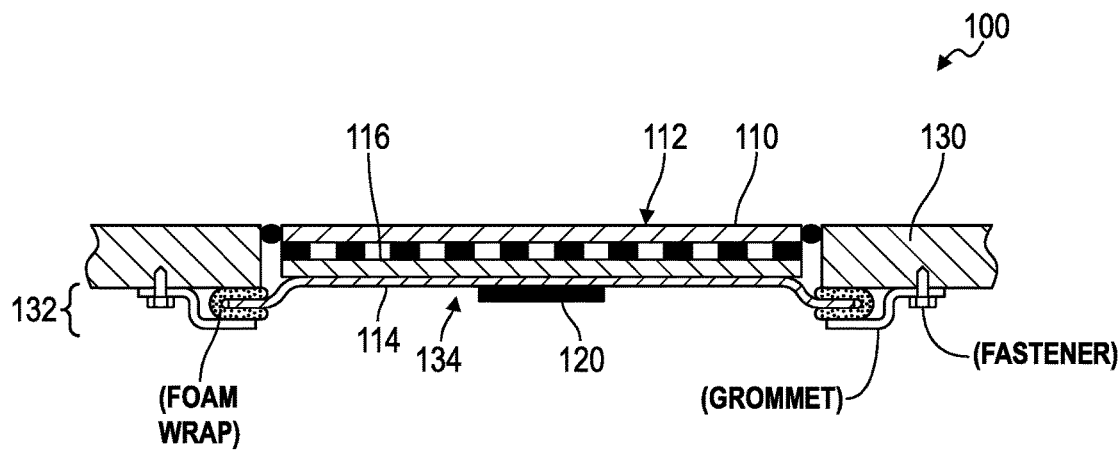

In another implementation shown in FIG. 13G, the coupler 132 includes: a first foam section wrapped from the top of the substrate to the bottom of the substrate along one edge of the substrate; a second foam section wrapped from the top of the substrate to the bottom of the substrate along the opposing edge of the substrate; and a set of clamps that fasten to the computing device chassis 130 and constrain the foam sections against the chassis 130. For example, each foam section can include a closed-cell silicone foam and can be adhered to the substrate (or the silicone backing) on both the top and bottom sides of the substrate. Alternatively, the substrate can be detached from (e.g., not adhered) to the foam sections and can thus translate relative to the foam sections during a click cycle. Each clamp can include a clip configured to fasten to the computing device chassis 130, such as with a rivet, screw, or other mechanical fastener, and to compress an adjacent foam section—wrapped around an edge of the substrate—against the computing device chassis 130. Furthermore, in this implementation, the computing device receptacle 134 can be oversized in length and/or width such that the substrate is not over-constrained by the receptacle 134 and such that the substrate can move within the vibration plane during a click cycle.

2.5.5 Bearings

In yet another implementation shown in FIG. 13B, the coupler 132 mounts the substrate (or the touch sensor surface 114) to the computing device chassis 130 via a set of bearings. In one example, the computing device receptacle 134 can include multiple bearing receivers, the substrate can include one bearing surface vertically aligned with each bearing receiver and arranged across the back side of the substrate opposite the touch sensor surface 112, and the coupler 132 can include one ball bearing arranged in each bearing receiver and configured to vertically support the substrate at corresponding bearing surfaces on the back side of the substrate.

In another example, the computing device receptacle 134 defines 24 bearing receivers arranged in a 3×8 grid array spaced along the back side of the substrate, and the coupler 132 includes one ball bearing arranged in each bearing receiver. In this example, the bearings can support the substrate (or the touch sensor surface 114) with a limited maximum span between adjacent bearings in order to limit local deflection of the substrate when a load (of a typical magnitude) is applied to the touch sensor surface 112. The coupler 132 can thus include multiple bearings that function as a thrust bearing to vertically support the substrate. However, in this implementation, the computing device can include any other number of bearings arranged in any other way.

Figure 13H:
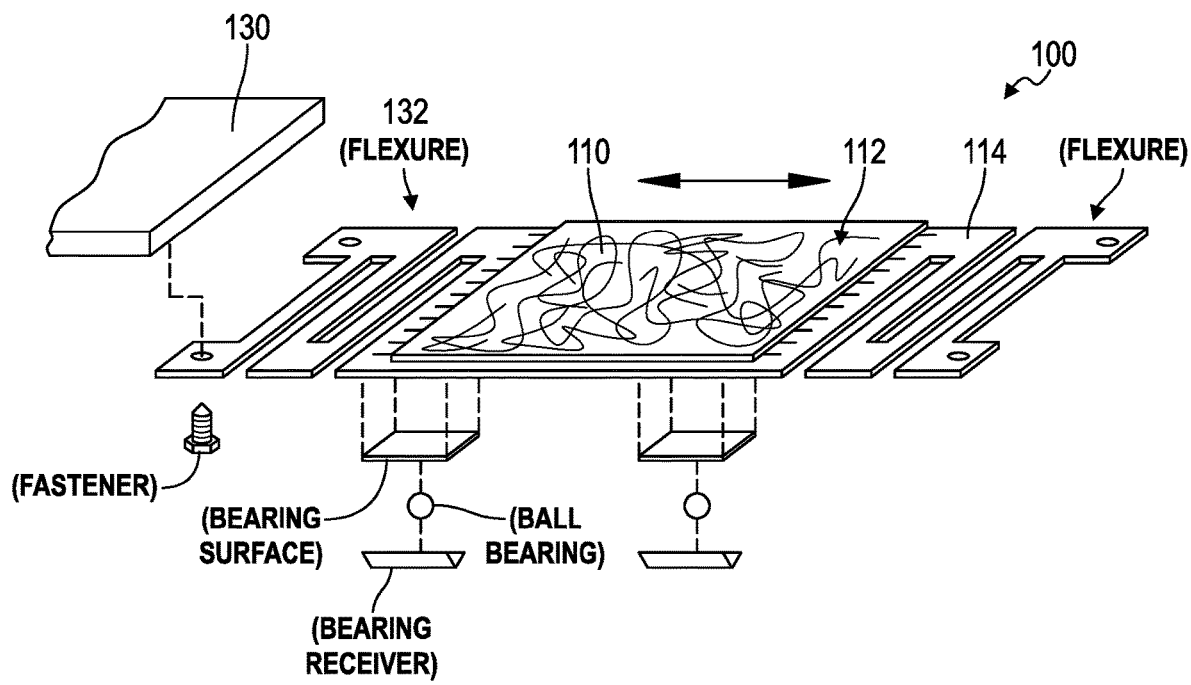

In this implementation, each bearing receiver can define a hemispherical cup that constrains a ball bearing in translation, and the substrate can include steel or polymer planar bearing surfaces soldered, adhered, or otherwise mounted to the back side of the substrate (or the back side of the touch sensor surface 114) and configured to mate with an adjacent ball bearing at a point of contact, as shown in FIG. 13H. Alternatively, each bearing surface mounted to the substrate (or on the touch sensor surface 114) can define a linear track (e.g., a V-groove), wherein all linear tracks in the set of bearing surfaces are parallel such that the substrate can translate in a single direction parallel to the linear tracks and in the vibration plane during a click cycle (or vice versa), as shown in FIG. 13B. The bearing receivers and bearing surfaces can also define similar and parallel linear tracks that constrain the substrate to translate along a single axis, or the bearing receivers and bearing surfaces can define similar but perpendicular linear tracks that enable the substrate to translate along two axes in the vibration plate. Furthermore, each bearing receiver can be packed with a wet or dry lubricant (e.g., graphite).

In this implementation, the coupler 132 can alternatively include one or more linear bearing or linear slides that similarly constrain the substrate to linear translation along only one or two axes.

Furthermore, the coupler 132 can incorporate one or more bearings with any of the foregoing implementations to provide additional support to the substrate (or to the touch sensor surface 114). For example, if the substrate is arranged in a receptacle 134 spanning a large width and/or large length relative to the thickness and rigidity (e.g., modulus of elasticity) of the substrate (or of the touch sensor surface 114): the computing device receptacle 134 can include one or more bearing receivers; the substrate can include one bearing surface aligned with each bearing receiver in the computing device receptacle 134 on the back side of the substrate opposite the resistive layer; and the coupler 132 can include four spring clips suspending each of the four corners of the substrate from the chassis 130 and one ball bearing arranged in each bearing receiver and configured to vertically support the substrate at corresponding bearing surfaces on the back side of the substrate.

2.5.6 Flexure

In another implementation shown in FIG. 13H, the coupler 132 defines a flexure coupled to or integrated into the substrate (or the touch sensor surface 114). For example, sections along the perimeter of the substrate can be removed, such as by routing, to form a set of serpentine or boustrophedic beams extending from a center section of the substrate. In this example, the distal end of each beam can be fastened to the computing device chassis 130, such as with a rivet or with a threaded fastener, to couple the substrate to the chassis 130 but to enable the substrate to translate laterally and/or longitudinally in the vibration plane relative to the computing device. In this example, the coupler 132 can also include one or more bearings, as described above, to vertically support the center section of the substrate against inward deflection upon application of a force to the touch sensor surface 112.

2.6 Vibrator Variation

Figure 16:
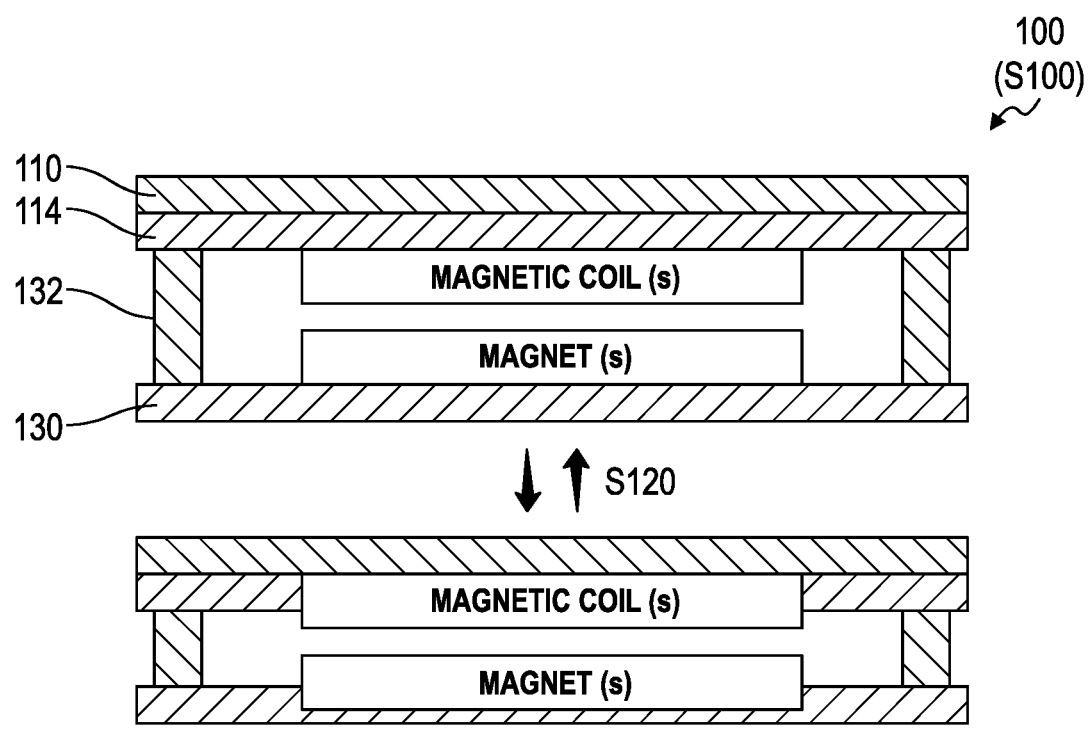
FIG. 16 is a schematic representation of one variation of the system.

In one variation shown in FIG. 16 the vibrator 120 includes a magnetic coil mounted to the substrate (or to the touch sensor surface 114) and a magnetic (or otherwise ferrous) element coupled to the chassis 130 of the computing device (or vice versa). For example, the magnetic element can be potted into a recess in the computing device chassis 130 in order to reduce the total height of the system and computer system. Alternatively, the vibrator 120 can include: a magnetic coil arranged within a recess in the computing device chassis 130; and a magnetic element fastened (e.g., riveted, bonded, soldered) to the substrate. During a click cycle, the controller 150 drives the magnetic coil with an alternating current, which causes the magnetic coil to output an oscillating magnetic field that magnetically couples to the magnetic element, such as similar to a voice-coil, thereby oscillating the substrate in the vibration plane and relative to the chassis 130 in Block S120. In this variation, the substrate (or touch sensor surface 114) and be suspended from the chassis 130 as described above.

Figure 17A:
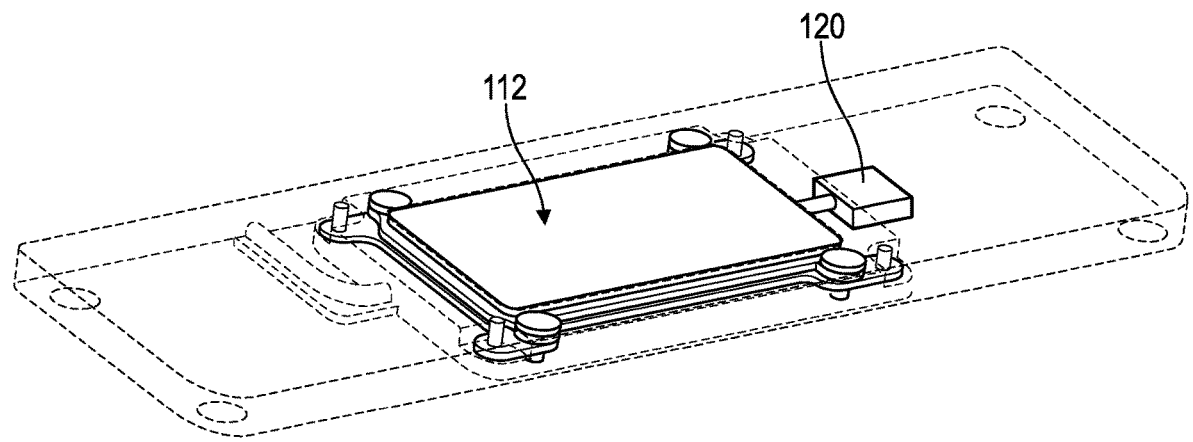
FIGS. 17A and 17B are schematic representations of variations of the system.
Figure 17B:
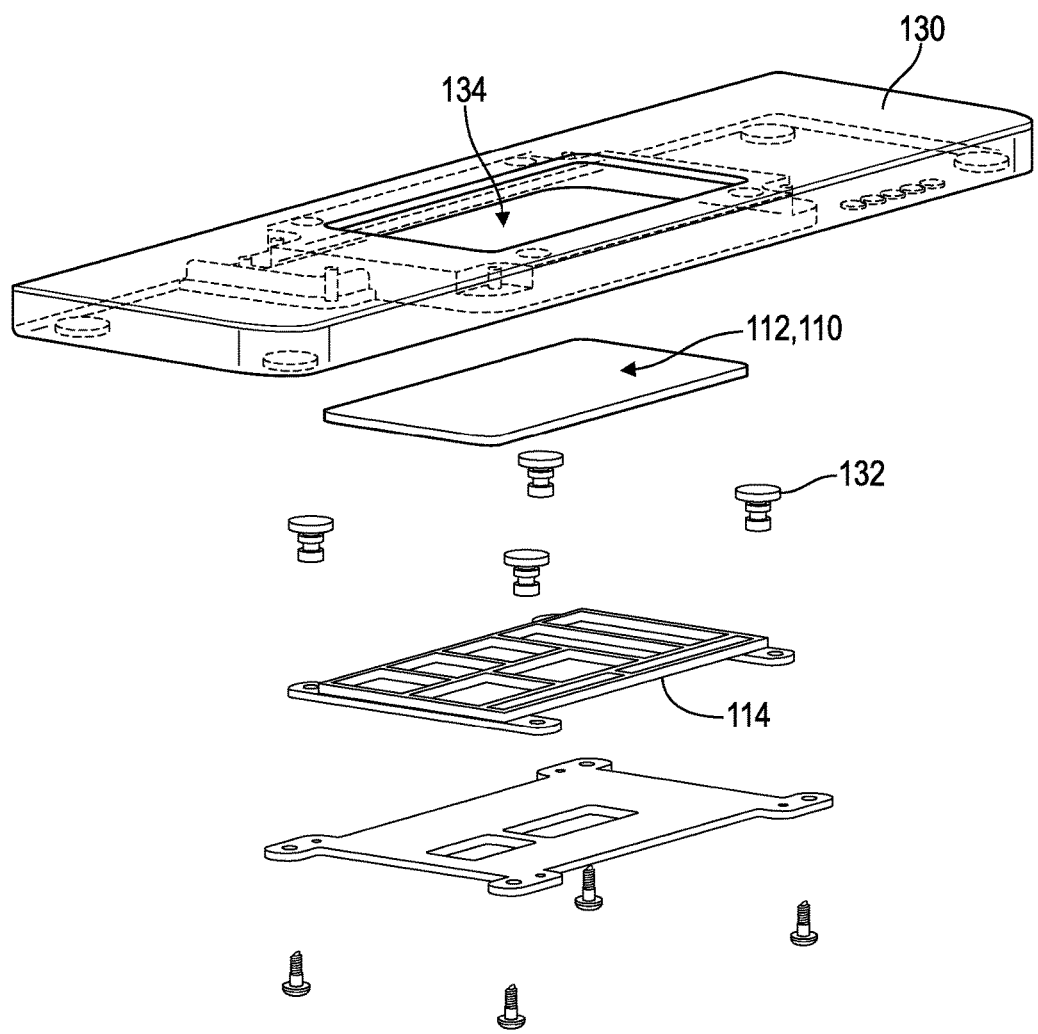

Alternatively, the system can include a piezoelectric actuator, a solenoid, an electrostatic motor, a voice coil, a speaker, or an actuator of any other type arranged between the substrate (or touch sensor surface 114) and the computing device chassis 130 and configured to oscillate the substrate laterally (or longitudinally) in the vibration plane, as shown in FIG. 17A.

2.7 Touch Sensor Surface Junction

In one implementation, the resistive layer extends past the perimeter of the substrate to meet an outer surface of the computing device chassis 130. For example, the resistive layer can extend from a perimeter of the substrate, past a junction between the substrate and the computing device receptacle 134, to a perimeter of the top surface of the computing device chassis 130 in order to form a continuous surface across the C-side of the computing device. In this implementation, the resistive layer can also define a thin region or "neck" where the resistive layer spans a junction between the substrate and the computing device receptacle 134 in order to dampen oscillation of the substrate during a click cycle and/or to limit mechanical resistance to translation of the substrate within the vibration plane during a click cycle.

In another implementation, the resistive layer extends up to but not (substantially) beyond the perimeter of the substrate. In this implementation, the system can further include a soft seal (e.g., a molded silicone ring) arranged between the outer edge of substrate and the interior wall of the computing device receptacle 134 to prevent ingress of dirt, moisture and/or other debris between the system and the computing device receptacle 134. Alternatively, a seal can be integrated into the resistive layer, such as in the form of a ridge or bellows section molded into the perimeter of the resistive layer; the resistive layer can thus extend beyond a perimeter of the substrate but a short distance sufficient to bridge and to seal the junction between the substrate and the computing device receptacle 134.

However, the system can include any other elements or features to close or seal the junction between the substrate and the computing device receptacle 134.

2.8 Trackpad+Keyboard

In one variation in which the computing device defines a laptop computer, the computing device includes a receptacle 134 spanning substantially the full width and length of its C-side, the system can define both a trackpad region and a keyboard region, as shown in FIGS. 12, 15A, 15B, 15C, 15D, and 15F. In this variation, the controller 150 can implement the foregoing methods and techniques to respond to inputs on the trackpad region by triggering a click cycle and outputting a click command, a cursor vector, or a scroll command, etc. In this variation, the controller 150 can also designate discrete key regions of a keyboard (e.g., 26 alphabetical key regions, 10 numeric key regions, and various punctuation and control keys) and can trigger a click cycle and output a keystroke command in response to a detected input on a corresponding discrete key region of the keyboard.

In one implementation, the touch sensor surface 112 defines a continuous surface across the keyboard and trackpad regions, and the system includes key designators (e.g., alphanumeric characters, punctuation characters) printed onto or otherwise applied to discrete key regions across the keyboard region of the touch sensor surface 112, such as a white ink screen-printed across the touch sensor surface 112. In this implementation, the system can also include borders for the discrete key regions and/or for the trackpad region designated in such ink. The system can additionally or alternatively include key designators and/or region designators embossed or debossed across the touch sensor surface 112 to enable a user to tactilely discriminate between various regions across the touch sensor surface 112. Yet alternatively, the system can include a keyboard overlay 164—including visually- or mechanically-distinguished discrete key regions—installed over the keyboard region of the touch sensor surface 112 to define commands or inputs linked to various discrete input regions within the keyboard region. In this implementation, the keyboard overlay 164 can be transiently installed on (i.e., removable from) the keyboard region of the touch sensor surface 112, such as to enable a user to exchange a first keyboard overlay 164 defining a QWERTY keyboard layout with a second keyboard overlay 164 defining an AZERTY keyboard layout. In this implementation, depression of a discrete key region of an overlay 164 placed over the keyboard region of the touch sensor surface 112 can locally compress the resistive layer, which can modify the bulk resistance and/or the contact resistance of the resistive layer on the drive and sense electrodes; and the controller 150 can register such change in bulk resistance and/or contact resistance of the resistive layer as an input, associate a particular keystroke with this input based on the location of the input, output the keystroke to a processing unit within the computing device, and trigger a click cycle.

In this variation, the trackpad region can be interposed between the keyboard region and a near edge of the C-side of the computing device and may run along a substantial portion of the width of the keyboard region such that a user may rest her palms on the trackpad when typing on the keyboard. During operation, the controller 150 can characterize an input on the trackpad as a palm and reject such an input in favor of inputs on the keyboard region in order to record keystrokes rather than cursor movements when a user is typing on the keyboard region. For example, the controller 150 can implement pattern matching or template matching techniques to match one or more input areas detected on the trackpad region of the touch sensor surface 112 with one or two palms, and the controller 150 can reject these inputs. In this example, the controller 150 can confirm identification of an input area as corresponding to a resting palm (e.g., confirm a match between an input area and a labeled palm template) in response to detection of one or a sequence of inputs (e.g., "keystrokes") on the keyboard region of the touch sensor surface 112; and vice versa. The system can also capture input areas on the trackpad region, store these input areas as new template images, label these new template images as indicative of a resting palm or not indicative of a resting palm based on detection of a keystroke on the keyboard area following within a threshold time (e.g., three seconds) of detection of an input area on the trackpad region. However, the controller 150 can implement any other palm rejection methods or techniques and can implement any other method or technique to automatically train a palm rejection model.

Furthermore, the system can transform an input detected within the trackpad region of the touch surface as one of various commands, such as based on the initial location, final location, speed, force (or pressure) magnitude, etc. of the input on the touch surface. For example, the controller 150 can interpret an input on the touch surface as one of a click, deep click scroll, zoom, and cursor motion commands based on methods and techniques described above. In this example, the controller 150 can interpret a first force applied to the trackpad region—up to a first depression threshold magnitude defining a click input within the trackpad region—followed by release of the first force from the trackpad region (i.e., to less than a first release threshold magnitude less than the first depression threshold magnitude) as a selection (or "left click") input. The controller 150 can then output a selection (or "left click") command and execute a "down" click cycle and then an "up" click cycle accordingly, such as through a first vibrator 120 under the trackpad region of the touch sensor surface 112.

Similarly, the controller 150 can interpret a second force applied to the trackpad region—up to a second depression threshold magnitude defining a "deep" click (or "right click") input within the trackpad region—followed by release of the second force from the trackpad region (i.e., to less than the first release threshold magnitude) as a "deep click" input. The controller 150 can then output a "deep click" (or "right click") command and execute a "deep down" click cycle and then an "up" click cycle accordingly through the first vibrator 120.

Furthermore, the controller 150 can interpret a third force applied to the keyboard region—up to a third depression threshold magnitude defining a click input within the keyboard region (e.g., less than the first depression threshold magnitude)—as a keystroke for a character assigned to the location of the third force on the touch sensor surface 112; the controller 150 can then output this keystroke and execute a single "down" click cycle through a second vibrator 122 under the keyboard region of the touch sensor surface 112. The controller 150 can repeatedly output the keystroke until release of the third force from the keyboard region (i.e., to less than a second release threshold magnitude less than the second depression threshold magnitude) is detected and then execute an "up" click cycle accordingly.

The controller 150 can also interpret two distinct touch inputs moving toward one another or moving away from one another on the touch sensor surface 112 as a zoom-out input or as a zoom-in input, respectively. Furthermore, the controller 150 can generate a cursor vector based on a speed and direction of an input moving across the touch sensor surface 112 and output these cursor vectors to a processing unit or other controller 150 within the computing device substantially in real-time.

However, the controller 150 can detect any other inputs of any other form or type on the touch sensor surface 112 and respond to these inputs in any other way.

2.9 Multiple Vibrators

In the foregoing implementation, the system can include multiple speakers and multiple vibrators and can selectively trigger click cycles at the speakers and vibrators in response to inputs on both the trackpad region and the keyboard region. In one example in which the controller 150 triggers a motor driver to drive a vibrator 120 for a target click duration of 250 milliseconds during a click cycle, the system can include three vibrators—coupled to the substrate opposite the touch sensor surface 112—in order to support a human keystroke speed up to 480 keystrokes per minute (i.e., 8 Hz keystroke input rate). In this example, the vibrator 120 can be arranged in a tight cluster on the back side of the substrate, such as proximal the center of the substrate, and the controller 150 can default to triggering a primary vibrator 120 to execute a click cycle in response to a next input on the keyboard region. However, if the primary controller 150 is still completing a click cycle when a next input on the touch sensor surface 112 is detected or if the primary vibrator 120 has completed a click cycle in less than a threshold pause time (e.g., milliseconds) upon receipt of the next input, the controller 150 can trigger a secondary vibrator 120 to execute a click cycle in response to this next input. In this example, the controller 150 can implement similar methods to trigger a tertiary vibrator 120 to execute a click cycle in response to a next input if the primary and secondary vibrators are still completing click cycles upon receipt of the next input. Alternatively, the controller 150 can sequentially actuate a first vibrator 120, a second vibrator 122, and a third vibrator 120 as inputs are detected on the touch sensor surface 112. Yet alternatively, in this implementation, the vibrators can be distributed across the back surface of the substrate, such as one vibrator 120 in each of three equi-width column regions on the back side of the substrate, and the controller 150 can selectively trigger a vibrator 120—nearest a detected input on the touch sensor surface 112 and currently static and outside of pause time—to execute a click cycle in response to detection of the input.

The controller 150 can implement similar methods and techniques to trigger one or more speakers within the system or within the computing device to execute a click cycle in response to an input detected on the touch sensor surface 112. For example, the system can include one or more discrete speakers coupled to (e.g., mounted on) the substrate. Alternatively, the controller 150 can trigger one or more speakers (e.g., one or more audio monitors) integrated into the computing device or another speaker or audio drive remote from the substrate to execute a click cycle in response to a detected input on the touch sensor surface 112.

In another implementation, the system includes: a first vibrator 120 arranged under a first region of the touch sensor surface 112; and a second vibrator 122 arranged under a second region of the touch sensor surface 112 adjacent and distinct from the first region of the touch sensor surface 112. In this implementation, the controller 150 can: selectively actuate the first vibrator 120 in response to detection of a first force on the touch sensor surface 112 exceeding a first threshold magnitude assigned to the first region; and selectively actuate the second vibrator 122 in response to detection of a second force on the touch sensor surface 112 exceeding a second threshold magnitude assigned to the second region; wherein the first and second thresholds are identical or unique, such as set manually by a user or set automatically by the controller 150 based on unique commands assigned to the first and second regions. In this implementation, the controller 150 can also trigger a single speaker to output a click sound response to such input on both the first and second regions. Alternatively, the system can include a first speaker adjacent the first region of the touch sensor surface 112 and a second speaker adjacent the second region of the touch sensor surface 112; and the controller 150 can selectively trigger the first and second speakers to replay the click sound when such inputs are detected on the left and right regions of the touch sensor surface 112, respectively. In this implementation, the controller 150 can also implement hysteresis methods described above to selectively actuate the left and right vibrators during "up" click cycles when detected forces applied to the left and right regions of the touch sensor surface 112 drop below common or unique retraction thresholds assigned to these regions.

However, the controller 150 can implement any other method or technique to detect and to respond to inputs on the trackpad and keyboard regions. Furthermore, the system can implement methods and techniques described above to vibrate the substrate in a direction substantially normal to the touch sensor surface 112 (i.e., out of the vibration plane described above.)

2.10 Additional Sensing

In one variation, the system includes a capacitive sensor, optical sensor, magnetic displacement sensor, strain gauge, FSR, or any other sensor coupled to the chassis 130 and/or to the substrate and configured to detect displacement of the substrate in the vibration (e.g., X-Y) plane responsive to a force applied to the touch sensor surface 112. The controller 150 can then output a command based on such in-plane displacement or force applied to the touch sensor surface 112.

Similarly, the system can include a capacitive sensor, optical sensor, magnetic displacement sensor, strain gauge, FSR, or any other sensor coupled to the chassis 130 and/or to the substrate and configured to detect absolute displacement of the substrate out of the vibration plane (i.e., along a Z-axis), as shown in FIG. 13B. In this variation, the controller 150 can transform a determined absolutely displacement of the substrate into an absolute magnitude of a force applied to the touch sensor surface 112 based on a known spring constant of the coupler 132. The controller 150 can then compare this absolute force magnitude to relative force magnitudes of objects in contact with the touch sensor surface 112 in order to calculate the absolute force magnitude of each object in contact with the touch sensor surface 112 at any one time. The controller 150 can then output a command for one or more touch inputs on the touch sensor surface 112 accordingly.

However, the system can be incorporated into any other type of computing device in any other way.

3. Direct Vibration

Figure 18A:
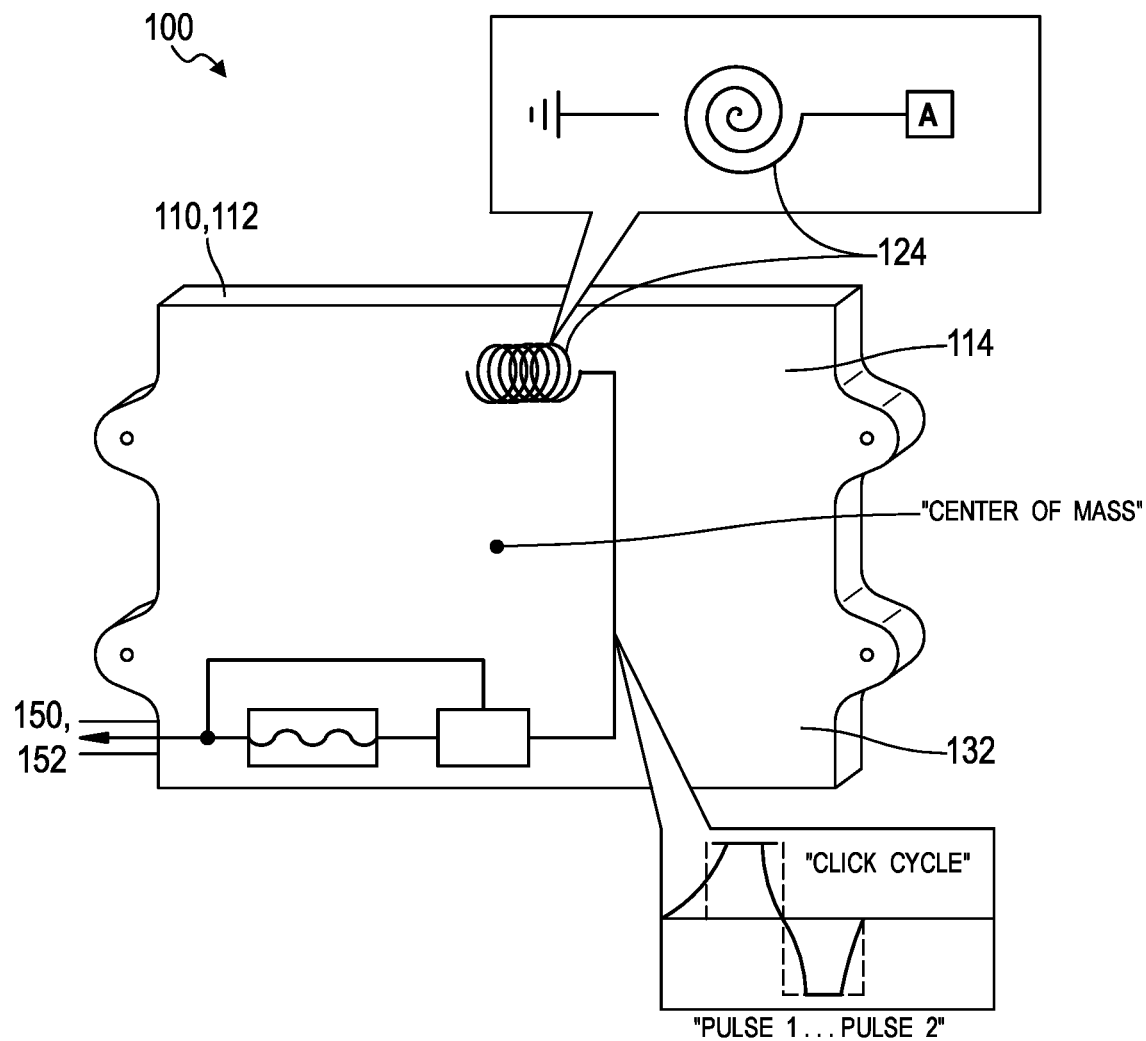
FIGS. 18A and 18B are schematic representations of one variation of the system.
Figure 18B:
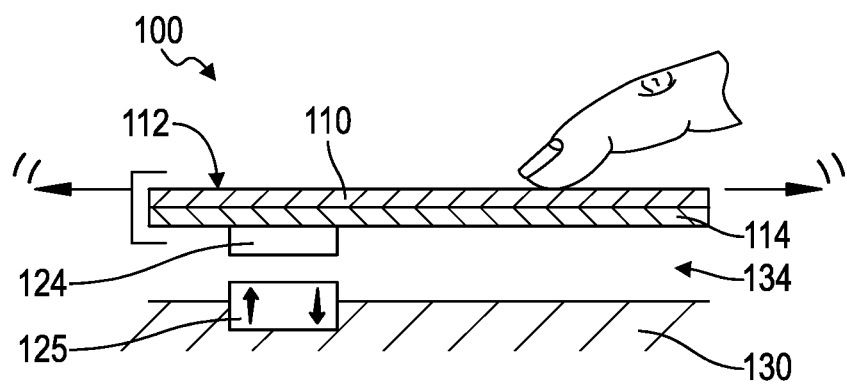

As shown in FIGS. 18A and 18B, one variation of the system 100 includes: a chassis 130, a touch sensor 110, a vibrator, a coupler 132, and a controller 150. The touch sensor 110 includes a rigid backing and an array of sense electrode and drive electrode pairs 116 arranged over the rigid backing. Furthermore, the touch sensor 110 defines a touch sensor surface 112 extending over the array of sense electrode and drive electrode pairs 116. The vibrator includes: a first magnet mounted to the chassis 130 and defining a first polarity; a second magnet mounted to the chassis 130 adjacent and laterally offset from the first magnet and defining a second polarity distinct from the first polarity; a coil coupled to the touch sensor 110 opposite the touch sensor surface 112, facing the first magnet and the second magnet, and configured to output an oscillating magnetic field that selectively magnetically couples to the first magnet and the second magnet in order to oscillate the touch sensor 110 within a plane parallel to the touch sensor surface 112. As described above, the system 100 can also include a controller 150 configured to: detect application of a first input onto the touch sensor surface 112 and a first force magnitude of the first input at a first time based on a first change in resistance between a first sense electrode and drive electrode pair 116 in the touch sensor 110; execute a first click cycle in response to the first force magnitude exceeding a first threshold magnitude by driving an alternating current through the coil to induce an oscillating magnetic field that intermittently attracts and repels the first magnet and repels and attracts the second magnet; and output a first touch image representing a first location and the first force magnitude of the first input on the touch sensor surface 112 at approximately the first time.

In this variation, the system 100 can similarly include: a magnetic element 126 rigidly coupled to a chassis 130; a substrate 114; a touch sensor 110 interposed between the substrate 114 and a touch sensor surface 112; an inductor 124 coupled to the substrate 114 below the touch sensor surface 112 and configured to magnetically couple to the magnetic element 126; a coupler 132 coupling the substrate 114 to the chassis 130, compliant (e.g., flexible, elastic, deformable) within a vibration plane approximately parallel to the touch sensor surface 112, and locating the inductor 124 approximately over the magnetic element 126; and a controller 150 configured to intermittently polarize the inductor 124 responsive to detection of a touch input on the touch sensor surface 112 to oscillate the substrate 114 in the vibration plane relative to the chassis 130.

Figure 26:
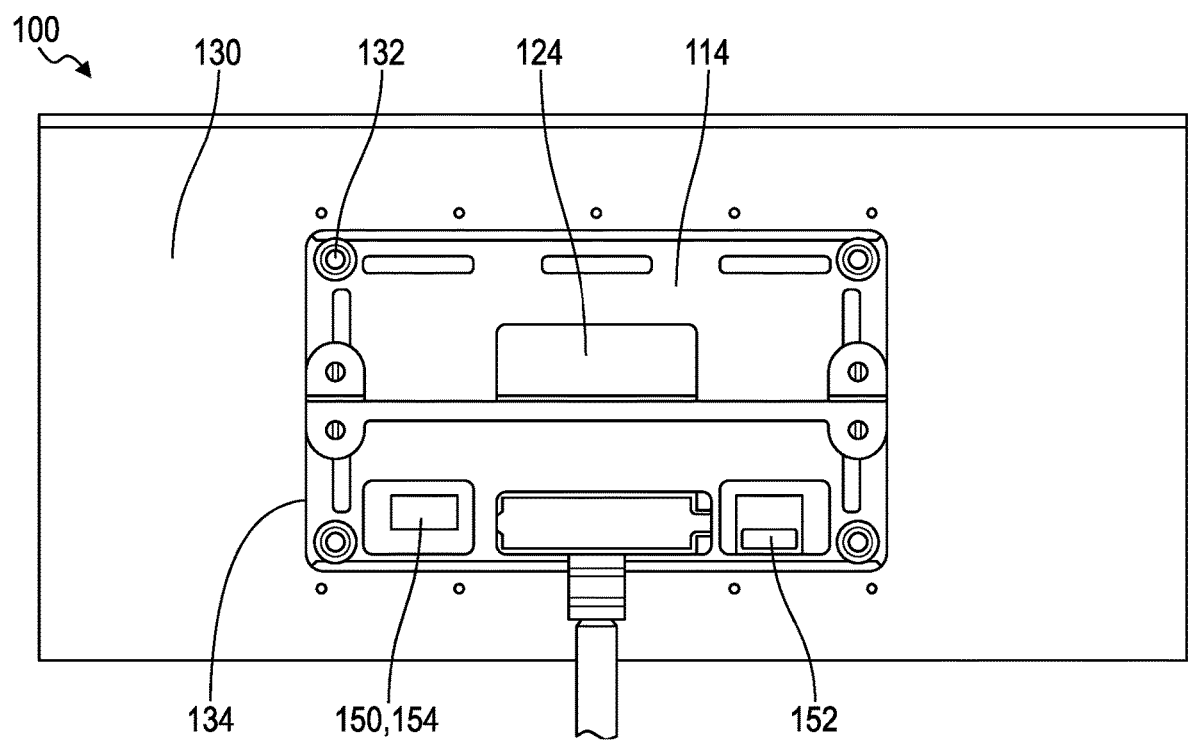
FIG. 26 is a schematic representation of one variation of the system.

Similarly and as shown in FIG. 26, the system 100 can include: a magnetic element 126 rigidly coupled to a chassis 130; a substrate 114; a touch sensor 110 interposed between the substrate 114 and a touch sensor surface 112; an inductor 124 coupled to the substrate 114 below the touch sensor surface 112 and configured to magnetically couple to the magnetic element 126; a coupler 132 coupling the substrate 114 to the chassis 130, compliant within a vibration plane approximately parallel to the touch sensor surface 112, and locating the inductor 124 approximately over the magnetic element 126; a driver 152 coupled to inductor 124; and a control program 154 configured to trigger the driver 152 to intermittently polarize the inductor 124 responsive to detection of a touch input on the touch sensor surface 112 to oscillate the substrate 114 in the vibration plane relative to the chassis 130.

Alternatively, in this variation, the system 100 can include: an inductor 124 rigidly coupled to a chassis 130; a substrate 114; a touch sensor 110 interposed between the substrate 114 and a touch sensor surface 112; a magnetic element 126 coupled to the substrate 114 below the touch sensor surface 112 and configured to magnetically couple to the inductor 124; a coupler 132 coupling the substrate 114 to the chassis 130, compliant within a vibration plane approximately parallel to the touch sensor surface 112, and locating the inductor 124 approximately over the magnetic element 126; and a controller 150 configured to intermittently polarize the inductor 124 responsive to detection of a touch input on the touch sensor surface 112 to oscillate the substrate 114 in the vibration plane relative to the chassis 130.

3.1 Applications

In this variation, the system 100: includes a magnetic element 126 arranged in a chassis 130 and an inductor 124 (e.g., multi-loop coil of copper wire that forms an air inductor 124) coupled to the touch sensor 110 adjacent the magnetic element 126; and directly vibrates the touch sensor 110 within the chassis 130—such as responsive to an input on the touch sensor surface 112—in a vibration plane parallel to the touch sensor surface 112 by driving a current through the inductive, which induces a magnetic field through the inductor 124, yields a change in force between the magnetic element 126 and the inductor 124 parallel to the vibration plane, and moves the touch sensor 110 within the chassis 130. In particular, the magnetic element 126 (arranged in the chassis 130) and the inductor 124 (coupled to the touch sensor 110) can cooperate to define (or function as) a "vibrator" that moves the touch sensor 110 relative to the chassis 130 when current is supplied to the inductor 124, such as responsive to a finger, stylus, or other touch input on the touch sensor surface 112 in order to provide real-time haptic feedback to a user.

Because the inductor 124 is coupled directly to the touch sensor 110 (e.g., via the substrate 114 that supports the touch sensor 110 and touch sensor surface 112) and because the magnetic element 126 is coupled directly to the chassis 130 near the inductor 124, the inductor 124 and the magnetic element 126 can cooperate to move the touch sensor 110 within the chassis 130 directly rather than oscillate a separate mass that then oscillates the touch sensor 110 due to conservation of momentum. Therefore, the inductor 124 and the magnetic element 126 can cooperate to reduce mass of the system 100, enable a shorter overall height of the system 100 by reducing complexity and additional packaging for a rotating mass, oscillate the touch sensor 110 more directly, achieve peak displacement and/or velocity motion of the touch sensor 110 in less time, and thus achieve a more authentic "click" feel for a user.

Figure 19:
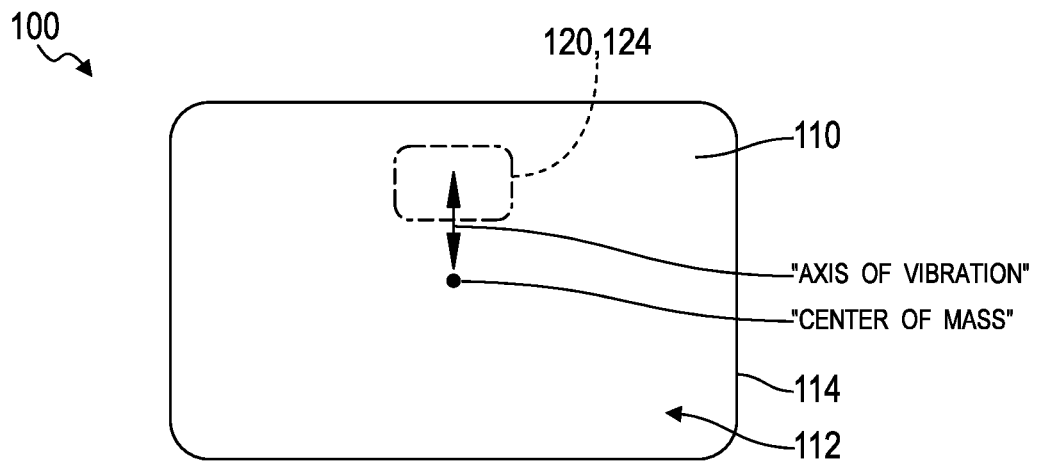
FIG. 19 is a schematic representation of one variation of the system.
Figure 24:
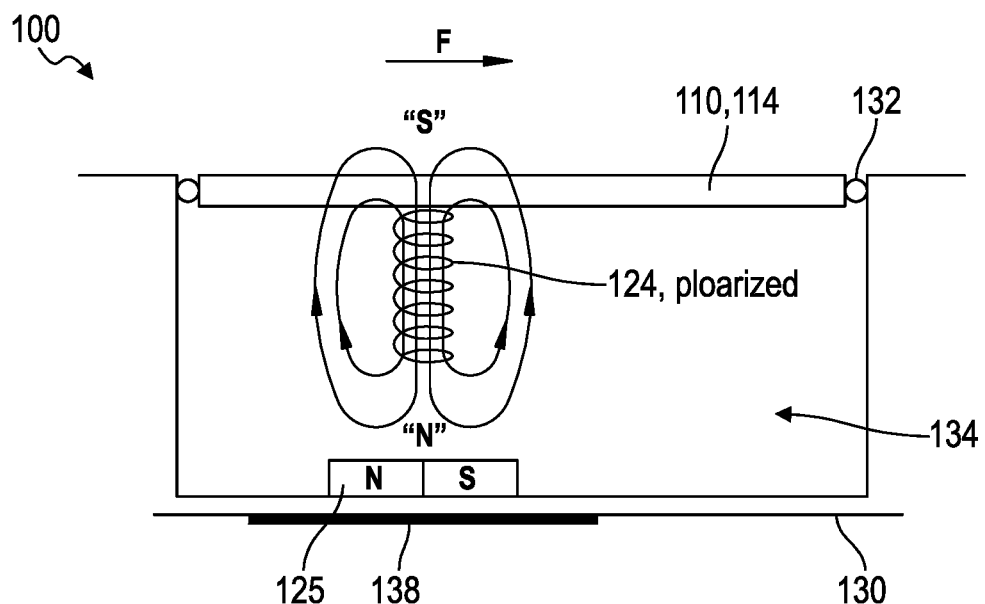
FIG. 24 is a schematic representation of one variation of the system.

For example, the controller 150 can trigger the vibrator 120 to output a vibratory signal that mimics the feel of actuation of a mechanical snap button in Block S120. As shown in FIG. 24, the system 100 can oscillate the touch sensor 110 within the chassis 130 by driving an alternating current through the inductor 124, which then magnetically couples to the magnetic element 126 to move the touch sensor 110 within the vibration plane. More specifically, when polarized by the controller 150 (or the driver 152), the inductor 124 can output a magnetic field that intermittently changes direction (or polarity) and thus intermittently attracts and repels poles of a magnetic element 126 coupled to the chassis 130 in a vibration plane parallel to the touch sensor surface 112 and along an axis of vibration parallel the touch sensor surface 112 as shown in FIG. 19.

The magnetic element 126 can be rigidly located within the chassis 130. For example, the magnetic element 126 can include an array of magnets, each arranged with its polarity different from adjacent magnets. In this example, the magnetic element 126 can include: a first magnet that outputs a first magnetic field in a first direction and that attracts the inductor 124 when the inductor 124 is polarized in a first direction and vice versa; and a second magnet that outputs a second magnetic field in a second direct and that repels the inductor 124 when the inductor 124 is polarized in a second direction and vice versa. Therefore, when the controller 150 polarizes the inductor 124 in a first direction at the start of a click cycle responsive to an input detected by the touch sensor 110, the magnetic field generated by the inductor 124 can attract the first magnet and repel the second magnet, thereby shifting the touch sensor 110 toward to the first magnet. When the controller 150 then polarizes the inductor 124 in a second, opposing direction during this same click cycle, the opposing magnetic field generated by the inductor 124 can attract the second magnet and repel the first magnet, thereby shifting the touch sensor 110 back toward to the second magnet and thus oscillating the touch sensor 110 within the chassis 130.

The controller 150 (or the driver 152 and the control program 154) can also oscillate polarity of the inductor 124—during a click cycle—a target vibration frequency (e.g., between Hz and 200 Hz) tuned such that a human finger perceives oscillation of the touch sensor 110 as a mechanical "click." Furthermore, the inductor 124, the touch sensor 110, the substrate 114, and the touch sensor surface 112, etc. (hereinafter the "touch sensor assembly") may exhibit a resonant frequency; therefore, to produce rapid onset of motion of the touch sensor assembly and then rapid dissipation of energy from the touch sensor assembly—which may yield a distinct "click" sensation for a user touching the touch sensor surface 112—that controller 150 can polarize the inductor 124 at a frequency distinct from the resonant frequency of the touch sensor assembly.

3.2 Chassis

As described above, the system 100 can be installed in or integrated into a chassis 130 of a computing device, such as a laptop computer, to form a trackpad or combined trackpad-keyboard surface. Similarly, the system 100 can be installed in or integrated into a chassis 130 of a peripheral device, such as a peripheral trackpad. Furthermore, the system 100 can be installed in or integrated into a chassis 130 of a mobile computing device. For example: a display can be arranged over the touch sensor assembly; the inductor 124 can be coupled to the touch sensor assembly opposite the display; the touch sensor assembly and the display can be arranged over and coupled to a rear housing (the "chassis 130") of a smartphone via the coupler 132; the magnetic element 126 can be rigidly coupled to the rear housing; and the inductor 124 and the magnetic element 126 can cooperate to oscillate the display and touch sensor 110 relative to the rear housing in order to provide haptic feedback for a user interfacing with the smartphone.

Therefore, the chassis 130 can define a substantially rigid mass, and the touch sensor assembly can be arranged over the chassis 130, arranged in a cavity 134 (e.g., a trackpad cavity 134) defined by the chassis 130, or coupled to the chassis 130 in any other way.

3.3 Touch Sensor

As described above, the touch sensor 110 can include: an array of sense electrode and drive electrode pairs 116 arranged over the substrate 114; and a pressure-sensitive layer arranged over the array of sense electrode and drive electrode pairs 116 and defining the touch sensor surface 112. In this implementation, the controller 150 can thus: detect application of an input at a first location on the touch sensor surface 112 based on a change in resistance between a first sense electrode and drive electrode pair 116—in the array of sense electrode and drive electrode pairs 116—below the first location on the touch sensor surface 112; and interpret a force magnitude of the first input based on a magnitude of the first change in resistance between a first sense electrode and drive electrode pair 116.

Alternatively, the touch sensor 110 can include an array of sense electrode and drive electrode pairs 116 arranged over the substrate 114 and a tactile layer arranged over the array of sense electrode and drive electrode pairs 116 and defining the touch sensor surface 112; and the controller 150 can implement mutual capacitance techniques to read capacitance values between these sense electrode and drive electrode pairs 116 and to interpret inputs on the touch sensor surface 112 based on these capacitance values.

However, the touch sensor 110 can include a resistive, capacitive, optical, or other type of touch sensor 110 defining a two-dimensional sensible area under a touch sensor surface 112.

3.4 Substrate

The touch sensor 110 is arranged over (or is physically coextensive with) the substrate 114. The substrate 114 can thus function to support the touch sensor 110 and/or to form an interface between the touch sensor 110 and the chassis 130.

In one implementation described below in which the touch sensor assembly is suspended on the chassis 130, the substrate 114 includes a rigid backing, such as an aluminum, steel, or fiber-composite plate. In this implementation, the touch sensor 110 is bonded over an outer face of the substrate 114 and the inductor 124 is bonded or otherwise assembled on an interior face of the substrate 114 such that the inductor 124 is located immediately over the magnetic element 126 arranged in the chassis 130.

In a similar implementation, the substrate 114 includes a rigid (e.g., fiberglass) circuit board, and sense electrode and drive electrode pairs 116 of the touch sensor 110 are fabricated directly on the outermost layer (or on the outermost layers) of the substrate 114. In this implementation, the inductor 124 can be contained in a surface-mount package and can soldered to directly surface-mount pads on the inner (i.e., chassis 130-side) face of the substrate 114. Alternately, the inductor 124 can include: a single-layer planar spiral coil fabricated directly on the innermost layer of the substrate 114; or a multi-layer planar spiral coil fabricated directly on a set of innermost layers of the substrate 114.

In the foregoing implementations, the substrate 114 can further include a set of ribs or flanges configured to resist deflection (e.g., bending) of the substrate 114 when the touch sensor surface 112 is depressed toward the substrate 114, such as by a finger or stylus. For example, the substrate 114 that includes an aluminum or steel plate can be formed to include a flange along one or multiple edges of the touch sensor 110 and formed to include a bead inset from the perimeter of the touch sensor 110. In another implementation in which the substrate 114 includes a rigid circuit board, the substrate 114 can further include a metal (e.g., steel) rib soldered directly onto surface-mount pads defined on the inner face of the substrate 114.

Alternatively, the substrate 114 can include a flexible circuit board, and sense electrode and drive electrode pairs 116 of the touch sensor 110 can be fabricated on one or more layers of the flexible circuit board. In this implementation and as described below, the chassis 130 can define a planar support surface (such as including a low-friction coating); the substrate 114 can thus rest over and slide on the planar support surface, and the planar support surface can vertically support the substrate 114 and the touch sensor 110 against inward deformation when a force is applied to the touch sensor surface 112 (e.g., by a finger or stylus).

However, the substrate 114 can define any other form and include any other material or feature to support the touch sensor 110 and the inductor 124.

3.5 Inductor

Therefore, the inductor 124 is coupled to the substrate 114 below the touch sensor surface 112, such as opposite the touch sensor 110. In one implementation shown in FIG. 19, a center of the inductor 124 can also be offset from a center of mass of the touch sensor 110 such that the touch sensor assembly forms an eccentric mass that vibrates around the magnetic element 126 below when the inductor 124 is polarized.

In one implementation, the inductor 124 includes a multi-loop conductive (e.g., copper) wire coil that defines an air inductor 124 and defines a symmetric axis perpendicular to the touch sensor surface 112. For example, the coil can form a circular torus and can be bonded to the inner face of the substrate 114 (e.g., with an adhesive, with a potting material) opposite the touch sensor 110 with the symmetric axis of the coil approximately centered over the magnetic element 126 below when the coil is undriven. In another example, the magnetic element 126 includes an elongated array of permanent magnets, such as arranged in the form of an elongated, linear Halbach array. In this example, the inductor 124 can include a coil in the form of a torus elongated along a long axis of the magnetic element 126 and in a plane parallel to the vibration plane; and the inductor 124 can be bonded, solder, or otherwise coupled to the substrate 114 over the magnetic element 126 with the long and short axes of the inductor 124 approximately aligned with the long and short axes of the magnetic element 126 when the inductor 124 is not undriven.

In another example, the substrate 114 includes a circuit board and defines a set of surface mounted pads across its inner face. In this example, the inductor 124 is contained in a surface mount package soldered to these surface mounted pads on the substrate 114. Alternatively, ends of the coil—that form the inductor 124—can be soldered to these surface mounted pads on the substrate 114. The coil can also be embedded or encapsulated in epoxy or potting material.

In another implementation, the inductor 124 includes a voice coil, including a former, a collar, and a winding of conductive wire (e.g., coiled aluminum or copper wire). In this implementation, the inductor 124 can be soldered to the substrate 114 and can extend below the inner face of the substrate 114 (e.g., by one millimeter).

Figure 22A:
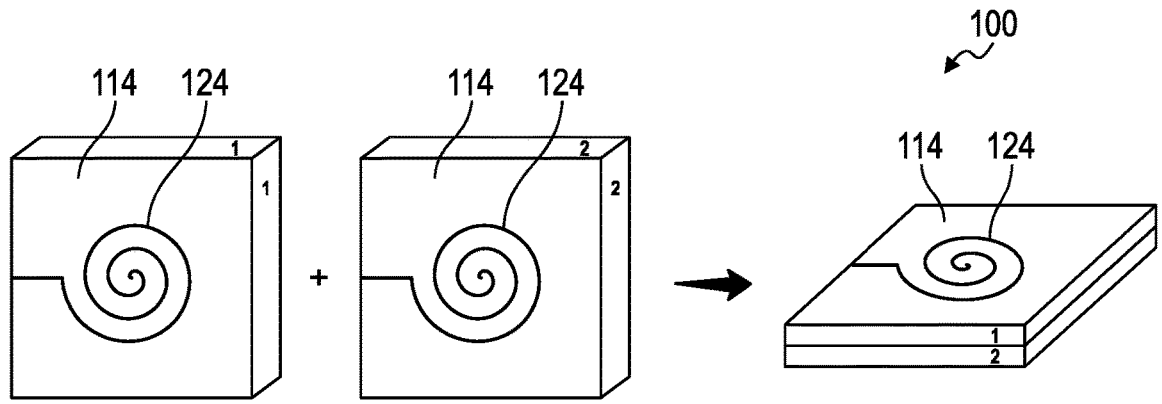
FIGS. 22A and 22B are schematic representations of one variation of the system.
Figure 22B:
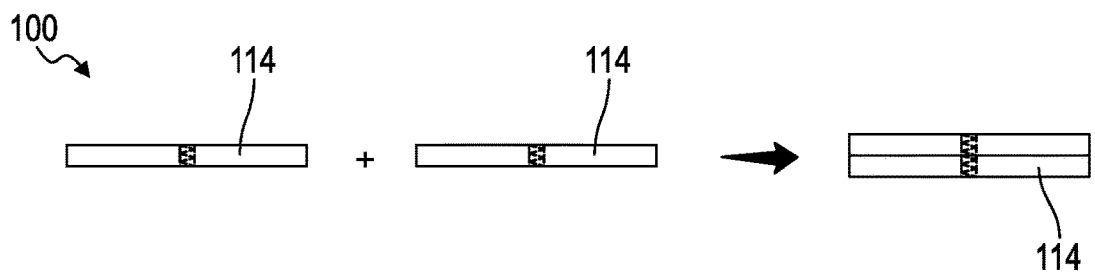

Alternatively, the inductor 124 can be fabricated (e.g., according to PCB processing technologies) directly onto the substrate 114 opposite the touch sensor surface 112. For example and as shown in FIGS. 22A and 22B, a first segment of the inductor 124 (e.g., a first spiral coil) is fabricated on or otherwise coupled to a first layer (e.g., a thin fiberglass) of the substrate 114; a second segment of the inductor 124 is fabricated on or otherwise coupled to a second layer of the substrate 114 arranged over the first layer; a third segment of the inductor 124 is fabricated on or otherwise coupled to a third layer of the substrate 114 arranged over the second layer; etc. and these segments of the inductor 124 are coupled with via passing through these layers of the substrate 114, as shown in FIG. 22B.

However, the inductor 124 can be of any other form and can be coupled to or fabricated on the substrate 114 in any other way.

3.6 Magnetic Element

Generally, the magnetic element 126 is rigidly coupled to a chassis 130 and functions to magnetically couple to (attract and/or repel) the inductor 124 when the inductor 124 is polarized by the controller 150 (e.g., via the driver 152) responsive to an input on the touch sensor surface 112.

Figure 21:
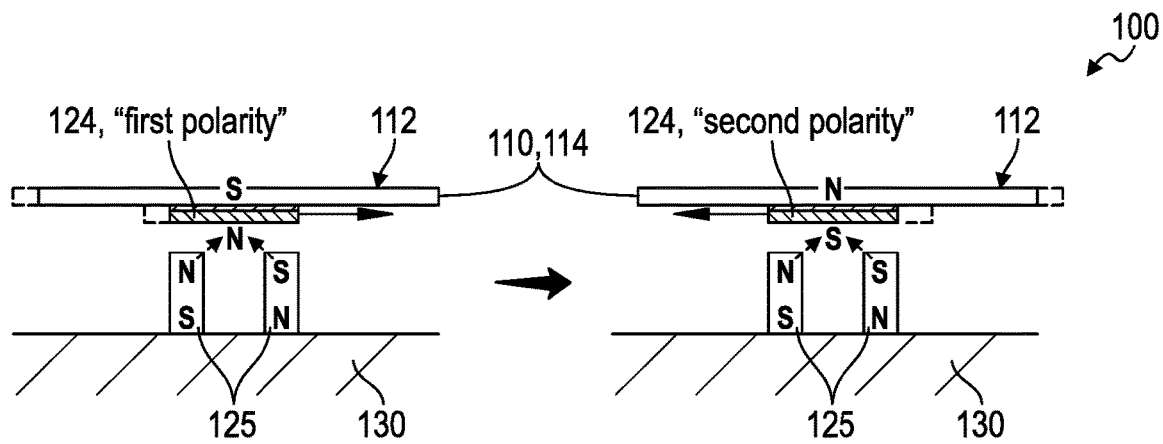
FIG. 21 is a schematic representation of one variation of the system.

In one implementation shown in FIG. 21, the magnetic element 126 includes: a first magnet (e.g., a magnetic dipole permanent magnet) mounted to the chassis 130 and arranged with a first polarity (e.g., a north pole) facing the inductor 124; a second magnet mounted to the chassis 130 adjacent and laterally offset from the first magnet and arranged with a second polarity (e.g., a south pole) facing the inductor 124. In this implementation, the first magnet and the second magnet can be bonded, fastened, adhered, or otherwise rigidly coupled to the chassis 130 adjacent each other such that the inductor 124 attracts one of these magnets and repels the other magnet—thereby moving the touch sensor assembly in the vibration plane—when the inductor 124 is polarized within current flowing in a first direction; and vive versa. In this implementation, the first magnet and the second magnet can be arranged in the chassis 130 along a primary axis that intersects a center of mass of the touch sensor 110; the inductor 124 can be similarly arranged on the substrate 114 parallel to the primary axis and with a long axis of the inductor 124 arranged over the first and second magnets.

Figure 23:
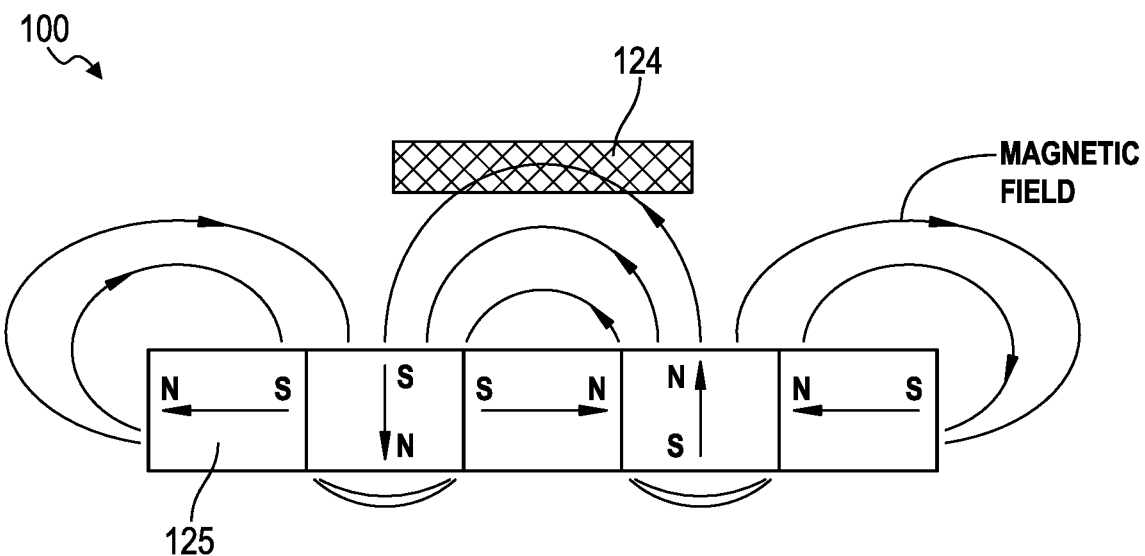
FIG. 23 is a schematic representation of one variation of the system.

In another implementation shown in FIG. 23, the magnetic element 126 includes a Halbach array: coupled to the chassis 130 adjacent (e.g., extending along) the inductor 124; and containing a set of magnets in an arrangement configured to augment magnetic fields output by these magnets thus increase magnetic coupling between the magnetic element 126 and the inductor 124 when the inductor 124 is polarized.

In this implementation, the magnetic element 126 can include five magnets arranged in a row extending parallel to the vibration plane. Each magnet in this set can exhibit a polarity distinct from its adjacent magnets. For example: the first magnet in the magnetic element 126 can be arranged with its north pole facing the left side of the chassis 130; a second magnet in the magnetic element 126 can be arranged with its north pole facing the top edge of the chassis 130; a third magnet in the magnetic element 126 can be arranged with its north pole facing the right side of the chassis 130; a fourth magnet in the magnetic element 126 can be arranged with its north pole facing a bottom edge of the chassis 130; and a fifth magnet in the magnetic element 126 can be arranged with its north pole again facing the left side of the chassis 130. In this example, magnetic fields output by the second and fourth magnets and focus the magnetic fields output by the first, third, and fifth magnetic element 126s and thus improve magnetic coupling between the magnetic element 126 and the inductor 124 when the inductor 124 is polarized. However, the magnetic element 126 can include any other type of magnet arranged in any other way.

3.6.1 Magnetic Shield

In one variation shown in FIG. 24, the system 100 further includes a magnetic shield 138 interposed between the magnetic element 126 and the chassis 130 and configured to damp magnetic fields output by the magnetic element 126 and the inductor 124. For example, the system 100 can include a thin conductive plate (e.g., a stainless steel shim) arranged directly under the magnetic element 126 or arranged under a floor of a cavity 134—defined by the chassis 130—housing the magnetic element 126 and the touch sensor assembly. The magnetic shield 138 can thus function to damp a magnetic field extending into the chassis 130 and thus shield electronic arranged in the chassis 130 below from changing magnetic fields around the touch sensor 110 thus resulting from polarization of the inductor 124.

3.7 Driver

In one variation shown in FIG. 26, the system 100 further includes a driver 152 configured to intermittently source current to the inductor 124 responsive to a trigger from the controller 150. In one implementation, the driver 152 includes a dual-H bridge electrically coupled to each end of the inductor 124 and configured to selectively couple the inductor 124 to a power supply: to apply a positive voltage potential across the inductor 124 to cause current to flow in a first direction through the inductor 124 and thus polarize the inductor 124 in a first orientation; and to apply a negative voltage potential across the inductor 124 to cause current to flow in a second direction through the inductor 124 and thus polarize the inductor 124 in a second orientation based on a control signal or command from the controller 150. Therefore, in this implementation, the controller 150 can trigger the driver 152 to polarize the inductor 124 in a first direction for a first duration of time and to polarize the inductor 124 in a second direction opposite the first direction for a second duration of time—in order to oscillate the touch sensor assembly within the vibration plane during a click cycle—responsive to detection of an touch input on the touch sensor surface 112.

In another implementation, the driver 152 is configured to selectively couple the inductor 124 to the power supply in a single direction to polarize the inductor 124 in a single direction only. For example, the driver 152 can include a power transistor, and the controller 150 can selectively activate and deactivate the driver 152 to intermittently polarize the inductor 124, thereby intermittently causing the inductor 124 to magnetically couple to the magnetic element 126 and thus oscillating the touch sensor assembly relative to the chassis 130.

However, the system 100 can include a driver 152 or other component of any other type to selectively source electrical current to the inductor 124.

3.8 Controller

As described above, the controller 150 can scan the touch sensor 110, interpret (changes in) electrical values read from the touch sensor 110 as locations of inputs on the touch sensor surface 112, and then selectively polarize the inductor 124 during a click cycle responsive to detecting a touch input on the touch sensor surface 112, such as described above.

3.8.1 Touch Detection and Click Cycle Trigger

In the implementation described above in which the touch sensor 110 includes a pressure-sensitive touch sensor 110 that outputs values representative of locations and forces (or pressures) of touch inputs across a touch sensor surface 112, the controller 150 can: read electrical values (e.g., electrical resistance) between sense electrode and drive electrode pairs 116 in the touch sensor 110; detect application of a first input at a first location on the touch sensor surface 112 based on a first change in resistance between a first sense electrode and drive electrode pair 116, in the array of sense electrode and drive electrode pairs 116, below the first location on the touch sensor surface 112; and interpret a first force magnitude of the first input based on a magnitude of the first change in resistance. In response to the first force magnitude of the first input exceeding a minimum force threshold, the controller 150 can: immediately trigger the driver 152 to transiently (i.e., temporarily) polarize the inductor 124 at (e.g., approximately the first time of the first time); and output a first touch image representing the first location and the first force magnitude of the first input on the touch sensor surface 112 at approximately the first time (e.g., within 50 milliseconds of detecting the first touch on the touch sensor surface 112).

In this implementation, the controller 150 can also respond differently to inputs of different magnitudes on the touch sensor surface 112. For example, in response to the force magnitude of a touch input on the touch sensor surface 112 exceeding both a minimum force threshold and a deep-force threshold magnitude (greater than the minimum force threshold), the controller 150 can trigger the driver 152 to transiently polarize the inductor 124 for a first duration of time (e.g., 150 milliseconds) and at a first frequency (e.g., 20 Hz). However, in response to the force magnitude of a touch input on the touch sensor surface 112 exceeding the minimum force threshold but not exceeding the deep-force threshold magnitude, the controller 150 can trigger the driver 152 to transiently polarize the inductor 124 at for a second duration less than the first direction (e.g., 50 milliseconds) and/or at a second frequency greater than the first frequency (e.g., 50 Hz).

The system 100 can implement similar methods and techniques to detect and respond to touch inputs on the touch sensor surface 112 based on changes in capacitance between sense and drive electrode pairs in the touch sensor 110 that defines a capacitive touch sensor 110 or based on outputs of the touch sensor 110 of any other type.

3.8.2 Click Cycle Characteristics

During a click cycle, the controller 150 can trigger the driver 152 to polarize the inductor 124 in a single direction, as shown in FIG. 24. For example, controller 150 can trigger the driver 152 to output power to the inductor 124 in a single pulse in the form of a square or sinusoidal waveform (e.g., over a first peak over a duration of 50 milliseconds for a 10 Hz drive signal), thereby inducing a magnetic field in the inductor 124, which magnetically couples the inductor 124 to the magnetic element 126 and causes the touch sensor assembly to shift—against the coupler 132—in a single direction parallel to the vibration plane. At the conclusion of this pulse, the magnetic field in the inductor 124 can decay, thereby decoupling the inductor 124 from the magnetic element 126; the coupler 132 can then return the touch sensor assembly to its nominal position to complete the click cycle.

In another implementation shown in FIGS. 18A and 21, the controller 150 triggers the driver 152 to polarize the inductor 124 in two opposing directions. For example, during a click cycle, the controller 150 can trigger the driver 152 (e.g., a dual-H bridge) to output power to the inductor 124 in a two pulses in the form of a square or sinusoidal waveform (e.g., over a first peak and a second peak over a duration of 50 milliseconds for a 50 Hz drive signal), thereby: inducing a first magnetic field in a first direction in the inductor 124, which magnetically couples the inductor 124 to the magnetic element 126 and causes the touch sensor assembly to shift—against the coupler 132—in a first direction parallel to the vibration plane over approximately the first half of this click cycle; and then inducing a second magnetic field in an opposite direction in the inductor 124, which magnetically couples the inductor 124 to the magnetic element 126 and causes the touch sensor assembly to shift—against the coupler 132—in the opposite direction over approximately the second half of this click cycle. Upon conclusion of this second pulse, the magnetic field in the inductor 124 can decay, thereby decoupling the inductor 124 from the magnetic element 126; the coupler 132 can then return the touch sensor assembly to its nominal position to complete the click cycle.

3.8.3 Drive Frequency

As described below, the touch sensor assembly can exhibit a resonant (e.g., natural) frequency. The controller 150 can trigger the driver 152 to output an alternating signal to the inductor 124 at this resonant frequency during a click cycle. For example, when the system 100 is first powered on, the controller 150 can execute a test routine, including oscillating a voltage applied to the inductor 124 from a low-frequency alternating voltage to a high-frequency alternating voltage, detecting a resonant frequency between the low frequency and the high frequency, and storing this resonant frequency as an operating frequency of the system 100 during a subsequent session at the device.

In one implementation, the mass of the touch sensor assembly and the elasticity of the coupler 132 are tuned to exhibit a particular resonant frequency proximal a frequency of a mechanical "click" or keyboard keystroke. In this implementation, the controller 150 can trigger the driver 152 to drive the inductor 124 with an alternating signal at this particular resonant frequency during a click cycle.

Alternatively, as described above, the controller 150 can trigger the driver 152 to drive the inductor 124 with an alternating signal at a target frequency distinct from the resonant frequency during the click cycle. In this implementation, the driver 152 can output an alternating current oscillating at a target frequency; when thus polarized, the inductor 124 can output a magnetic field that oscillates at the target frequency. As described above, the inductor 124 can magnetically couple to the magnetic element 126, including selectively attracting and repelling the magnetic element 126 to oscillate the touch sensor 110 in the vibration plane and relative to the chassis 130. The controller 150 and the driver 152 can continue to alternate polarity of the inductor 124 in order to vibrate the touch sensor assembly over the duration of the click cycle. Upon expiration of the click cycle, the controller 150 can trigger the driver 152 to decouple the inductor 124 from the power supply and thus halt vibration of the touch sensor assembly.

However, the controller 150 and the driver 152 can cooperate to "pulse" the polarity of the inductor 124 over one, two, or any other number of instances to shift or oscillate the touch sensor assembly relative to the chassis 130 during a click cycle.

3.8.4 Paused Touch Sensor Scan

Furthermore, the magnetic field generated by the inductor 124 when polarized by the controller 150 or driver 152 during a click cycle may create noise in the touch sensor 110. Therefore, the controller 150 can systematically discard data read from the touch sensor 110 during a click cycle (and during some time after a click cycle, such as 10 milliseconds after a click cycle, at which time the magnetic field in the inductor 124 may have decayed sufficiently to yield less than a maximum noise in the touch sensor 110).

Alternatively, the controller 150 can disable scanning of the touch sensor no during (and slightly after) a click cycle. For example, the controller 150 can: read electrical values between sense electrode and drive electrode pairs 116 in the touch sensor no during a sequence of scan cycles; generate a sequence of touch images for the sequence of scan cycles based on electrical values between sense electrode and drive electrode pairs 116 in the touch sensor no; and detect a touch input on the touch sensor surface 112 based on a value stored in a last touch image in the sequence of scan cycles. Then, in response to detecting a touch input on the touch sensor surface 112, the controller 150 can: trigger the driver 152 to transiently polarize the inductor 124 during a click cycle following the last scan cycle; delay a next scan cycle during the click cycle; and then initiate the next scan cycle in response to conclusion of the click cycle.

Furthermore, in this implementation, in response to detecting a new touch input on the touch sensor surface 112 and prior to executing a click cycle accordingly, the controller 150 can: generate a touch image depicting this touch input; store this touch image; initiate the click cycle as described above; output this touch image to a processor or other connected device; and continue to output this same stored touch image at a consistent, specified sampling rate (e.g., 30 Hz, 50 Hz) until the click cycle is complete and the magnetic field in the inductor 124 sufficiently decayed. The process can then resume sampling the touch sensor 110, generating new touch images based on data read from the touch sensor 110, and outputting these touch images to the processor or other device at the specified sampling rate.

3.8.5 Inductor for Force Magnitude

In one variation, the controller 150 monitors current moving through the inductor 124 and/or voltage change across the inductor 124—outside of a click cycle—and estimates a force applied to the touch sensor surface 112 based on this current or voltage change and a known elasticity (or stiffness, etc.) of the coupler 132. The controller 150 can then selectively execute a click cycle if this force exceeds a minimum force threshold, as described above. Additionally or alternatively, the controller 150 can label or integrate this force estimate into the concurrent touch image and serve this force-enhanced touch image to a processor or other connected device.

In one example, the controller 150: reads electrical values between sense electrode and drive electrode pairs 116 in the touch sensor 110 during a scan cycle; samples a voltage across the inductor 124 during the scan cycle; and repeats these processes on a regular interval (e.g., at a rage of 30 Hz, 50 Hz). In this example, the controller 150 can then detect a touch input at a first location on the touch sensor surface 112 based on a change in electrical value between a first sense electrode and drive electrode pair 116—in the touch sensor 110 and arranged below the first location on the touch sensor surface 112—during a current scan cycle; and then transform a change in voltage across the inductor 124 during this scan cycle into a force magnitude of the touch input applied to the touch sensor surface 112. In particular, the controller 150 can transform the change in voltage across the inductor 124 into a vertical displacement of the touch sensor assembly and then transform this vertical displacement into a force applied to the touch sensor surface 112 during this scan cycle based on a stored spring model—linking force and displacement—for the coupler 132. The controller 150 can then: generate a touch image—representing the first location and the force magnitude of the touch input—for the scan cycle; and trigger the driver 152 to polarize the inductor 124 to oscillate the substrate 114 in the vibration plane relative to the chassis 130 in response to the force magnitude of the touch input—derived from the change in voltage across the inductor 124—exceeding a threshold magnitude.

In this example, the controller 150 can also: integrate the voltage across the inductor 124—outside of click cycles—over time; detect application of an input of sufficient force on the touch sensor surface 112 to trigger a click cycle if the integral of voltage across the inductor 124 exceeds a threshold voltage-time value; and detect retraction of an input from the touch sensor surface 112 when the integral of voltage across the inductor 124 drops below this threshold voltage-time value (or below a lower, threshold input-retraction voltage-time value in order to implement hysteresis techniques). Furthermore, the system 100 can: implement methods and techniques similar to those described above to transform a current voltage-time value of the inductor 124 into a force magnitude of an input on the touch sensor surface 112 during a current scan cycle; label a touch image for this scan cycle with this force magnitude; and repeat this process for each subsequent scan cycle (outside of click cycles executed by the system 100).

Furthermore, in the implementation described below in which the system 100 includes multiple inductor 124-magnetic element 126 pairs, the controller 150 can: implement similar methods and techniques to estimate vertical displacement of the touch sensor assembly over between each inductor 124-magnetic element 126 pair; transform these vertical displacements into force applied over each inductor 124-magnetic element 126 pair; and interpolate forces applied across the touch sensor surface 112 based on these derived forces over the inductor 124-magnetic element 126 pairs. The controller 150 can then merge these interpolated forces with a concurrent touch image generated based on data read from the touch sensor 110, such as by labeling individual inputs represented in the touch image with estimated forces on the touch sensor surface 112.

3.9 Configurations

Generally, the touch sensor 110, the substrate 114, the magnetic element 126, the controller 150, the driver 152, the coupled, etc. can be arranged in various configurations.

3.9.1 Suspended Substrate in Trackpad Cavity

In one configuration shown in FIGS. 17A, 17B, 18A, 18B, and 20A the system 100 is integrated into a chassis 130 that defines a component of a mobile computer (e.g., a "B-side" of a laptop computer) and includes a trackpad cavity 134, such as adjacent a keyboard including mechanical keys. In this configuration: the magnetic element 126 is arranged in a base of the trackpad cavity 134; and the coupler 132 locates the substrate 114 with the trackpad cavity 134 such that the inductor 124 is approximately centered over the magnetic element 126. The touch sensor surface 112 can thus span the trackpad cavity 134.

In this configuration, the substrate 114 can form a rigid backing arranged across the touch sensor 110 opposite the touch sensor surface 112 and can support the touch sensor 110 against deflection responsive to depression of an object (e.g., a finger, a stylus) on the touch sensor surface 112. In one example, the coupler 132 includes a set of elastomeric grommets configured to suspend the substrate 114 across the trackpad cavity 134 thus defined by the chassis 130. Each grommet can thus be compliant in the vibration plane and can return the substrate 114 to a center position within the trackpad cavity 134 responsive to depolarization of the inductor 124. For example, the coupler 132 can include a set of four elastomeric (e.g., rubber, foam) grommets arranged near the four corners of the substrate 114 and that cooperate to suspend the substrate 114 and the touch sensor 110 across the trackpad cavity 134. Therefore, in this configuration, the coupler 132 can be: interposed between the chassis 130 and the substrate 114; bonded or fastened to the chassis 130 and the substrate 114; configured to deform in the vibration plane responsive to polarization of the inductor 124 that produces a transient magnetic field at the inductor 124 that interacts with a magnetic field of the magnetic element 126 to yield a force between the inductor 124 and the magnetic element 126 in the vibration plane; configured return the substrate 114 to a center position relative to the chassis 130 responsive to depolarization of the inductor 124; and configured to transfer a vertical force applied to the touch sensor surface 112 into the chassis 130.

Therefore, in this configuration, the coupler 132 can function to set and (approximately) maintain a gap between the inductor 124 and the magnetic element 126.

3.9.2 Sliding Surface

Figure 20A:
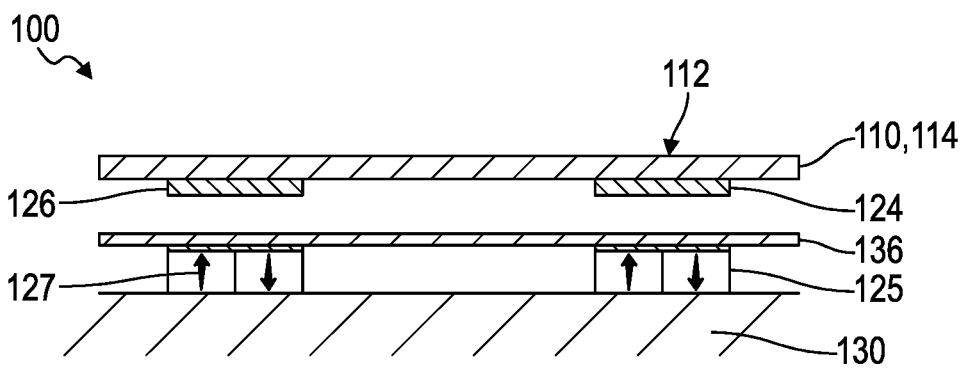
FIGS. 20A and 20B are schematic representations of one variation of the system.
Figure 20B:
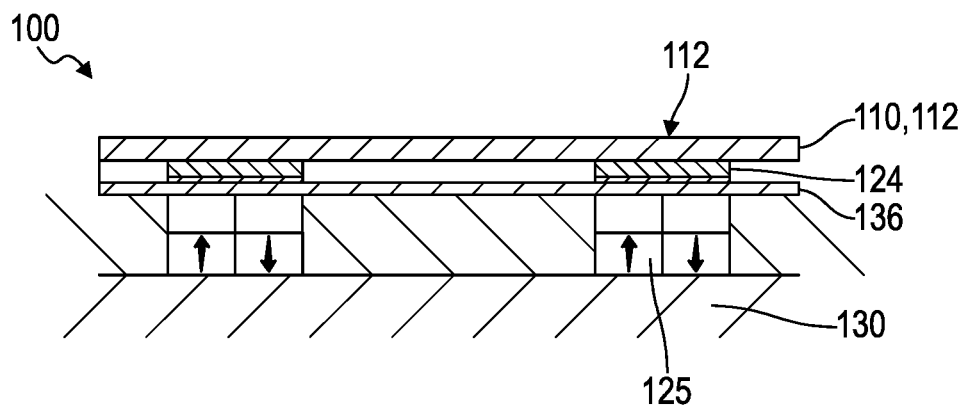

In another configuration shown in FIG. 20B, the substrate 114 rests on and slides over a bearing surface in the base of the trackpad cavity 134, such as: a continuous, planar bearing surface; a discontinuous, planar bearing surface (e.g., a planar surface with relief channels to reduce stiction between the substrate 114 and the bearing surface); or a set of bushings (e.g., polymer pads) or bearings (e.g., steel ball-bearings) offset above and distributed across the base of the trackpad cavity 134.

In one example: the trackpad cavity 134 defines a planar base surface parallel to the vibration plane; the magnetic element 126 is retained in the base of the trackpad cavity 134 below the planar base surface; and the substrate 114 includes a flexible circuit board arranged over and in contact with the planar base surface, configured to slide over the planar base surface parallel to the vibration plane, and configured to transfer a vertical force applied to the touch sensor surface 112 into the chassis 130. In this example, the chassis 130 can thus rigidly support the touch sensor 110 through the substrate 114.

In this configuration: the magnetic element 126 can be embedded in the base of the trackpad cavity 134; the system 100 can further include a low-friction layer 136 arranged over the base of the cavity 134 and therefore interposed between the magnet element and the inductor 124; and the inductor 124 can be recessed in the inner face of the substrate 114 (or the inner face of the substrate 114 can otherwise define a planar surface) such that the inner face can run smoothly over the low-friction layer 136, as shown in FIGS. 20A and 20B. In particular, the low-friction layer 136 can be configured to: prevent direct contact between the magnet element and the inductor 124; and facilitate smooth motion of the substrate 114—and the touch sensor assembly more generally—over the base of the cavity 134 and parallel to the vibration plane. For example, the low-friction layer 136 can include a polytetrafluoroethylene (or "PTFE") film arranged between the magnetic element 126 and the inductor 124. Alternatively, the low-friction layer 136 can be arranged across the inner face of the substrate 114 and over the inductor 124, as shown in FIG. 20B.

Furthermore, in this configuration, the coupler 132 can include a spring element configured to center the flexible circuit board within the cavity 134 responsive to depolarization of the inductor 124 during a click cycle. In another example, the coupler 132 can include a flexure formed on or physically coextensive with the flexible circuit board of the substrate 114, extending onto and retained at chassis 130, and thus functioning to re-center the touch sensor assembly relative to the magnetic element 126 upon conclusion of a click cycle. In yet another example, in this configuration (and in the foregoing configurations), the coupler 132 can include a flexible membrane (e.g., a seal) arranged about a perimeter of the touch sensor surface 112, interposed between the touch sensor 110 and an interior wall of the trackpad cavity 134, and configured to seal an interstice between the touch sensor 110 and the trackpad cavity 134, such as from moisture and/or dust ingress.

3.9.3 Controller Mounted to Substrate

In the foregoing configurations: the controller 150 and the driver 152 are mounted to the substrate 114, such as opposite the touch sensor 110 (on the inner face of the substrate 114); and the system 100 further includes a flexible circuit extending between the substrate 114 and the chassis 130 and electrically coupled to a power supply arranged in the chassis 130. Thus, in this configuration, the controller 150 can: read electrical values between sense electrode and drive electrode pairs 116 in the touch sensor 110 or otherwise sample the adjacent touch sensor 110 directly; generate a sequence of touch images based on these electrical values between sense electrode and drive electrode pairs 116 in the touch sensor 110; and then output this sequence of touch images to a processor arranged in the chassis 130 via the flexible circuit. Furthermore, the driver 152 can intermittently source current from the power supply to the inductor 124 via the flexible circuit responsive to triggers from the adjacent controller 150. Thus, in this configuration, the touch sensor assembly can include the substrate 114, the touch sensor 110, (the touch sensor surface 112,) the controller 150, the driver 152, the inductor 124, and the flexible circuit in a self-contained unit. This self-contained unit can then be installed over a cavity 134 in a chassis 130 and the flexible circuit can be connected to a power and data port in the cavity 134 to complete assembly of the system 100 into this device.

In this implementation, the flexible circuit can also function as the coupler 132 to apply an opposing force to motion of the touch sensor assembly in the vibration plane within the cavity 134 to recenter the touch sensor assembly within the cavity 134 upon conclusion of a click cycle.

3.9.4 Controller Mounted to Chassis

Alternatively, in the foregoing configurations: the controller 150 and the driver 152 can be arranged in the chassis 130; and the system 100 can further include a flexible circuit extending between the substrate 114 and the chassis 130 and electrically coupled to the controller 150, the driver 152 and/or a power supply arranged in the chassis 130. In this configuration, the controller 150 can: read electrical values between sense electrode and drive electrode pairs 116 in the touch sensor 110 via the flexible circuit; generate a sequence of touch images based on electrical values between sense electrode and drive electrode pairs 116 in the touch sensor 110; and output this sequence of touch images to a processor arranged in the chassis 130, such as directly to the processor arranged adjacent the controller 150 on a motherboard mounted in the chassis 130. In this configuration, the driver 152 can intermittently source current from the power supply to the inductor 124 via the flexible circuit responsive to a trigger from the controller 150.

3.9.5 Inverted Inductor and Magnetic Element

In yet another configuration, the inductor 124 is rigidly coupled to the cavity 134, and the magnetic element 126 is coupled to (e.g., bonded to, embedded in, fastened to) the substrate 114. For example, in this configuration, the inductor 124 can be soldered to a motherboard or other circuit board arranged in the chassis 130, and the touch sensor assembly—including the magnetic element 126—can be arranged over the motherboard or other circuit board with the magnetic element 126 approximately centered over the inductor 124.

3.10 Multiple Vibrators

In this variation, the system 100 can also include multiple inductor and magnetic element pairs. In one example shown in FIG. 25, the system 100 includes: a first inductor 124 arranged proximal a first edge of the substrate 114; and a first magnetic element 126 arranged in the chassis 130 under the first inductor 124 and thus near the first edge of the substrate 114. In this example, the system 100 can also include: a second magnetic element 127 rigidly coupled to the chassis 130 and offset from the first magnetic element 126; and a second inductor 125 coupled to the substrate 114 below the touch sensor surface 112, arranged proximal a second edge of the substrate 114 opposite the first edge, and configured to magnetically couple to the second magnetic element 127. Furthermore, in this example, the controller 150 can: selectively polarize the first inductor 124 responsive to detection of the touch input on the touch sensor surface 112 proximal the first edge of the substrate 114 to oscillate the substrate 114 in the vibration plane relative to the chassis 130 with peak energy perceived proximal this first edge of the substrate 114; and selectively polarize the second inductor 125 responsive to detection of a second touch input on the touch sensor surface 112 proximal the second edge of the substrate 114 to oscillate the substrate 114 in the vibration plane relative to the chassis 130 with peak energy perceived proximal this second edge of the substrate 114.

Figure 25:
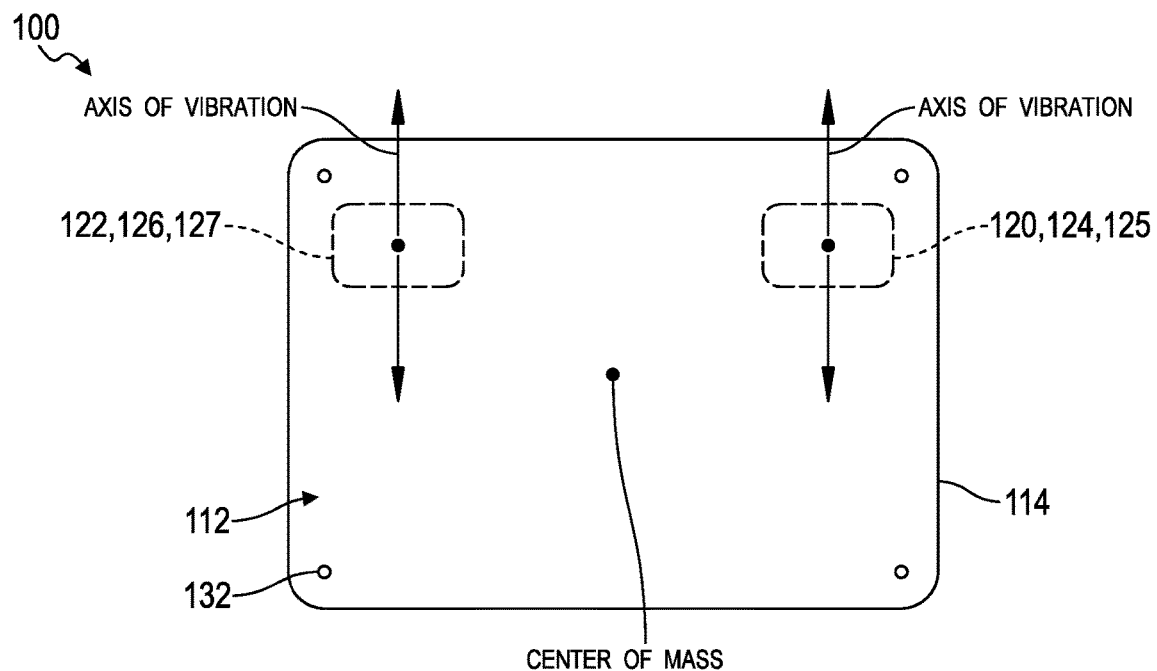
FIG. 25 is a schematic representation of one variation of the system.

In a similar implementation, the system 100 can include a first vibrator—as described above—and a second inductor-second magnetic element pair that cooperates with the first inductor-magnetic element pair to oscillate the touch sensor 110. In this variation, the first inductor-magnetic element pair can include a coil mounted to the substrate 114 offset to the right of the center of mass of the touch sensor 110 by a first distance as shown in FIG. 25. The first inductor-magnetic element pair can also include an array of magnets aligned in a row under the inductor 124. The array of magnets can cooperate with the inductor 124 of the first inductor-magnetic element pair to define an axis of vibration of the first inductor-magnetic element pair. The second inductor-second magnetic element pair can include a coil mounted to the substrate 114 offset to the left of the center of mass of the touch sensor 110 by a second distance as shown in FIG. 25. The second inductor-second magnetic element pair can also include an array of magnets aligned in a row. The array of magnets can cooperate with the inductor 124 of the second inductor-second magnetic element pair to define an axis of vibration of the second inductor-second magnetic element pair.

In one implementation, the array of magnets of the first inductor-magnetic element pair can be arranged in a row parallel the array of magnets of the second inductor-second magnetic element pair such that the axis of vibration of the first inductor-magnetic element pair is parallel to the axis of vibration of the second inductor-second magnetic element pair. In this implementation, the inductor 124 of the first inductor-magnetic element pair can be mounted to the substrate 114 offset from the center of mass of the touch sensor 110 by the first distance equal to the second distance between the inductor 124 of the second inductor-second magnetic element pair and the center of mass. Therefore, a midpoint between the inductor 124 of the first inductor-magnetic element pair and the inductor 124 of the second inductor-second magnetic element pair can be coaxial with the center of mass. Therefore, the first inductor-magnetic element pair and second inductor-second magnetic element pair can cooperate to vibrate the touch sensor 110 along an overall axis of vibration that extends parallel the axis of vibration of the first magnet and the axis of vibration of the second magnet and through the center of mass of the touch sensor 110.

The controller 150 can drive the first inductor-magnetic element pair (hereinafter the "first vibrator") to oscillate the touch sensor 110 at a first frequency and the second inductor-second magnetic element pair (hereinafter the "second vibrator") to oscillate at a similar frequency in phase with vibration of the first vibrator. Therefore, the first and second vibrators can cooperate to oscillate the touch sensor 110 linearly along the overall axis of vibration. However, the controller 150 can additionally or alternatively drive the first vibrator to oscillate the touch sensor 110 at the first frequency and the second vibrator to oscillate at a second frequency distinct from the first frequency and/or out of phase with vibration of the first vibrator. Therefore, the first and second vibrators can cooperate to rotate the touch sensor 110—within a plane parallel the touch sensor surface 112—about the center of mass.

Additionally or alternatively, the controller 150 can selectively drive either the first vibrator or the second vibrator to oscillate at a particular time. The controller 150 can selectively (and exclusively) drive the first vibrator to mimic a sensation of a click over a section of the touch sensor 110 adjacent the first vibrator. The controller 150 can alternatively drive the second vibrator to mimic a sensation of a click over a section of the touch sensor 110 adjacent the second vibrator while minimizing vibration over a section of the touch sensor 110 adjacent the first vibrator. For example, the controller 150 can selectively drive the first vibrator to execute the click cycle in order to mimic the sensation of a click on the right side of the touch sensor 110 (or a "right" click) while the second vibrator remains inactive.

However, the controller 150 can also drive the first vibrator to oscillate according to a particular vibration waveform. Simultaneously, the controller 150 can drive the second vibrator to oscillate according to a vibration waveform out of phase (e.g., 180 degrees out of phase) with the particular vibration waveform of the first vibrator. For example, the second vibrator can output the vibration waveform of an amplitude smaller than the amplitude of the particular vibration waveform. In this example, the vibration waveform of the second vibrator can also be 180 degrees out of phase with the particular vibration waveform of the first vibrator. Therefore, the second vibrator can be configured to counteract (or decrease the amplitude of) the particular vibration waveform output by the first vibrator.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for detecting and responding to touch inputs with haptic feedback comprising:
   a printed circuit board;
   an array of drive electrodes and sense electrodes arranged across an outer layer of the printed circuit board;
   an inductor comprising a multi-layer planar spiral coil fabricated in a set of inner layers of the printed circuit board;
   a tactile surface arranged over the printed circuit board;
   a magnetic element coupled to a chassis;
   a coupler coupling the printed circuit board to the chassis, compliant within a vibration plane, and locating the inductor approximately over the magnetic element; and
   a controller configured to:
      read a set of force values from the array of drive electrodes and sense electrodes;
      interpret a touch input at a first location on the tactile surface;
      interpret a first force magnitude of the input based on the set of force values; and
      polarize the inductor responsive to the first force magnitude of the first input exceeding a force threshold to oscillate the printed circuit board in the vibration plane relative to the chassis.

2. The system of claim 1, further comprising a pressure-sensitive layer interposed between the printed circuit board and the tactile surface and exhibiting changes in local bulk electrical characteristics responsive to variations in magnitude of force applied to the tactile surface.

3. The system of claim 2:
   further comprising a driver configured to intermittently source current to the inductor responsive to a trigger from the controller; and
   wherein the controller is configured to:
      detect application of the touch input at the first location on the tactile surface based on a first change in resistance between a first sense electrode and drive electrode pair, in the array of drive electrodes and sense electrodes, below the first location on the tactile surface;

interpret the first force magnitude of the first input based on a magnitude of the first change in resistance for the set of force values;

trigger the driver to transiently polarize the inductor in response to the first force magnitude of the first input exceeding a minimum force threshold; and output a first touch image representing the first location and the first force magnitude of the first input on the tactile surface at approximately a first time.

4. The system of claim 3, wherein the controller is configured to:

trigger the driver to transiently polarize the inductor at approximately the first time for a first duration in response to the first force magnitude of the first input exceeding the minimum force threshold and a deep-input threshold magnitude; and trigger the driver to transiently polarize the inductor at approximately the first time for a second duration less than the first direction in response to the first force magnitude of the first input exceeding the minimum force threshold and falling below the deep-input threshold magnitude.

5. The system of claim 3, wherein the controller is configured to:

trigger the driver to transiently polarize the inductor at approximately the first time at a first frequency in response to the first force magnitude of the first input exceeding the minimum force threshold and a deep-input threshold magnitude; and trigger the driver to transiently polarize the inductor at approximately the first time at a second frequency greater than the first frequency in response to the first force magnitude of the first input exceeding the minimum force threshold and falling below the deep-input threshold magnitude.

6. The system of claim 1:

wherein the magnetic element comprises:
a first magnet defining a first polarity; and
a second magnet adjacent and laterally offset from the first magnet and defining a second polarity opposite the first polarity;

wherein the coupler is compliant within the vibration plane parallel to the tactile surface; and wherein the inductor is configured to magnetically couple to the magnetic element when polarized by the controller to oscillate the printed circuit board in the vibration plane parallel to the tactile surface during application of the touch input on the tactile surface.

7. The system of claim 1:

wherein the chassis comprises a component of a mobile computer and defining a touch sensor cavity;

wherein the magnetic element is arranged in a base of the touch sensor cavity; and wherein the coupler locates the printed circuit board within the touch sensor cavity with the inductor approximately centered over the magnetic element and the tactile surface spanning the touch sensor cavity.

8. The system of claim 7, wherein the coupler comprises a flexible membrane arranged about a perimeter of the tactile surface, interposed between the printed circuit board and an interior wall of the touch sensor cavity, and configured to seal an interstice between the printed circuit board and the touch sensor cavity from dust ingress.

9. The system of claim 1:

wherein the magnetic element is retained within a recess in a touch sensor cavity in the chassis;

wherein the printed circuit board:
is arranged in the touch sensor cavity;
is configured to slide over a planar surface, defined by a base of the touch sensor cavity, parallel to the vibration plane; and
transfers a vertical force applied to the tactile surface into the chassis; and wherein the coupler comprises a spring element configured to center the flexible circuit board within the touch sensor cavity responsive to depolarization of the inductor.

10. The system of claim 1:

further comprising a flexible circuit extending between the printed circuit board and the chassis and electrically coupled to a power supply arranged in the chassis;

wherein the controller:
is mounted to the printed circuit board;
reads electrical values between drive electrode and sense electrode pairs in the array of drive electrodes and sense electrodes;
generates a sequence of touch images based on electrical values between drive electrode and sense electrode pairs in the array of drive electrodes and sense electrodes; and
outputs the sequence of touch images, via the flexible circuit, to a processor arranged in the chassis; and further comprising a driver mounted to the printed circuit board and configured to intermittently source current from the power supply to the inductor via the flexible circuit responsive to a trigger from the controller.

11. The system of claim 1:

further comprising a flexible circuit extending between the printed circuit board and the chassis and electrically coupled to a power supply arranged in the chassis;

wherein the controller:
is arranged in the chassis;
reads electrical values between drive electrode and sense electrode pairs, in the array of drive electrodes and sense electrodes, via the flexible circuit;
generates a sequence of touch images based on electrical values between drive electrode and sense electrode pairs in the array of drive electrodes and sense electrodes; and
outputs the sequence of touch images to a processor arranged in the chassis; and further comprising a driver arranged in the chassis and configured to intermittently source current from the power supply to the inductor via the flexible circuit responsive to a trigger from the controller.

12. The system of claim 1:

wherein the magnetic element comprises a Halbach array; and wherein the inductor comprises a set of planar spiral coil sections fabricated across the set of inner layers, each planar spiral coil section in the set of planar spiral sections defining a toroidal geometry elongated parallel to a long axis of the magnetic element.

13. The system of claim 1:

further comprising a driver configured to intermittently source current to the inductor responsive to a trigger from the controller; and wherein the controller is configured to:
read electrical values between drive electrode and sense electrode pairs in the array of drive electrodes and sense electrodes during a first scan cycle;
generate a first touch image for the first scan cycle based on electrical values between drive electrode and sense electrode pairs in the array of drive electrodes and sense electrodes during the first scan cycle;

detect the touch input on the tactile surface during the first scan cycle based on a value stored in the first touch image; and in response to detecting the touch input on the tactile surface:

trigger the driver to transiently polarize the inductor during the click cycle following the first scan cycle; and delay a second scan cycle, succeeding the first scan cycle, during the click cycle; and initiate the second scan cycle in response to conclusion of the click cycle.

14. The system of claim 1:
wherein the multi-layer planar spiral coil of the inductor is fabricated in a first region of the printed circuit board;
wherein the printed circuit board further comprises a second inductor comprising a second multi-layer planar spiral coil fabricated across the set of inner layers and in a second region of the printed circuit board;
further comprising a second magnetic element rigidly coupled to the chassis and offset from the magnetic element; and
wherein the controller is configured to:
selectively polarize the inductor responsive to detection of the touch input on the tactile surface over the first region of the printed circuit board to oscillate the printed circuit board in the vibration plane relative to the chassis; and
selectively polarize the second inductor responsive to detection of a second touch input on the tactile surface over the second region of the printed circuit board to oscillate the printed circuit board in the vibration plane relative to the chassis.

15. A system for detecting and responding to touch inputs with haptic feedback comprising:
a printed circuit board;
an array of sense electrodes arranged across an outer layer of the printed circuit board;
a tactile surface arranged over the printed circuit board;
a magnetic element arranged within a cavity of a chassis;
an inductor arranged above the magnetic element and comprising a set of planar spiral coil sections fabricated across the set of inner layers, each planar coil section, in the set of planar spiral coil sections, defining a toroidal geometry elongated parallel to a long axis of the magnetic element;
a membrane arranged about a perimeter of the tactile surface, interposed between the printed circuit board and an interior wall of the cavity, and configured to seal an interstice between the printed circuit board and the cavity; and
a controller configured to:
read a set of force values from the array of drive electrodes and sense electrodes;
interpret a touch input at a first location on the tactile surface;
interpret a first force magnitude of the input based on the set of force values; and
polarize the inductor responsive to the first force magnitude of the first input exceeding a force threshold to oscillate the tactile surface.

16. The system of claim 15:
wherein the printed circuit board further comprises an array of drive electrodes cooperating with the array of sense electrodes to form an array of drive and sense electrode pairs;
further comprising a pressure-sensitive layer interposed between the printed circuit board and the tactile surface and exhibiting changes in local bulk resistance responsive to variations in magnitude of force applied to the tactile surface; and
wherein the controller is configured to:
detect application of the first input at the first location on the tactile surface based on a first change in resistance between a first sense electrode and drive electrode pair, in the array of drive and sense electrode pairs, below the first location on the tactile surface;
interpret the first force magnitude of the first input based on a magnitude of the first change in resistance for the set of force values;
trigger a driver to transiently polarize the inductor in response to the first force magnitude of the first input exceeding a minimum force threshold; and
output a first touch image representing the first location and the first force magnitude of the first input on the tactile surface at approximately a first time.

17. The system of claim 15, wherein the controller is configured to:
read electrical values from the array of sense electrodes during a scan cycle;
detect the touch input at the first location on the tactile surface based on a change in electrical value read from a sense electrode, in the array of sense electrodes, proximal the first location on the tactile surface;
detect a change in voltage across the inductor during the scan cycle;
transform the change in voltage across the inductor during the scan cycle into the first force magnitude of the touch input applied to the tactile surface; and
trigger polarization of the inductor to oscillate the tactile surface in response to the force magnitude of the touch input exceeding a minimum threshold magnitude.

18. The system of claim 15:
wherein the magnetic element comprises:
a first magnet defining a first polarity; and
a second magnet adjacent and laterally offset from the first magnet and defining a second polarity opposite the first polarity;
wherein the membrane is compliant within a vibration plane parallel to the tactile surface; and
wherein the inductor is configured to magnetically couple to the magnetic element when polarized by the controller to oscillate the printed circuit board in the vibration plane parallel to the tactile surface during application of the touch input on the tactile surface.

19. The system of claim 15:
wherein the controller is configured to:
trigger the driver to drive the inductor over a range of frequencies between a low frequency and a high frequency during a test routine preceding the click cycle; and
detecting a resonant frequency of the system between the low frequency and the high frequency during the test routine; and
wherein the controller is configured to trigger the driver to transiently polarize the inductor at the resonant frequency during the click cycle responsive to detection of the touch input on the tactile surface.

20. A system for detecting and responding to touch inputs with haptic feedback comprising:
- a printed circuit board;
- an array of sense electrodes arranged across an outer layer of the printed circuit board;
- an inductor fabricated across a set of inner layers of the printed circuit board;
- a tactile surface arranged over the printed circuit board;
- a magnetic element arranged below the inductor within a cavity of a chassis;
- a membrane arranged about a perimeter of the tactile surface, interposed between the printed circuit board and an interior wall of the cavity, and configured to seal an interstice between the printed circuit board and the cavity; and
- a controller configured to:
  - read a set of electrical values from the array of sense electrodes;
  - interpret a touch input at a first location on the tactile surface based on a change in electrical value read from a sense electrode, in the array of sense electrodes, proximal the first location on the tactile surface;
  - detect a change in voltage across the inductor;
  - interpret a first force magnitude of the touch input based on the change in voltage across the inductor; and
  - polarize the inductor in response to the first force magnitude of the first input exceeding a force threshold to oscillate the tactile surface.

21. A system for detecting and responding to touch inputs with haptic feedback comprising:
- a printed circuit board;
- an array of sense electrodes arranged across an outer layer of the printed circuit board;
- an inductor fabricated across a set of inner layers of the printed circuit board;
- a tactile surface arranged over the printed circuit board;
- a magnetic element:
  - arranged below the inductor within a cavity of a chassis; and
  - comprising:
    - a first magnet defining a first polarity; and
    - a second magnet adjacent and laterally offset from the first magnet and defining a second polarity opposite the first polarity;
- a membrane:
  - arranged about a perimeter of the tactile surface;
  - interposed between the printed circuit board and an interior wall of the cavity;
  - compliant within a vibration plane parallel to the tactile surface; and
  - configured to seal an interstice between the printed circuit board and the cavity; and
- a controller configured to:
  - read a set of force values from the array of drive electrodes and sense electrodes;
  - interpret a touch input at a first location on the tactile surface;
  - interpret a first force magnitude of the input based on the set of force values; and
  - polarize the inductor responsive to the first force magnitude of the first input exceeding a force threshold to oscillate the printed circuit board in the vibration plane parallel to the tactile surface.

22. A system for detecting and responding to touch inputs with haptic feedback comprising:
- a printed circuit board;
- an array of sense electrodes arranged across an outer layer of the printed circuit board;
- an inductor fabricated across a set of inner layers of the printed circuit board;
- a tactile surface arranged over the printed circuit board;
- a magnetic element arranged below the inductor within a cavity of a chassis;
- a membrane arranged about a perimeter of the tactile surface, interposed between the printed circuit board and an interior wall of the cavity, and configured to seal an interstice between the printed circuit board and the cavity; and
- a controller configured to:
  - during a first time period:
    - trigger a driver to drive the inductor over a range of frequencies between a first target frequency and a second target frequency, different from the first target frequency; and
    - detecting a resonant frequency of the inductor between first target frequency and the second target frequency;
  - during a second time period following the first time period:
    - read a set of force values from the array of drive electrodes and sense electrodes;
    - interpret a touch input at a first location on the tactile surface;
    - interpret a first force magnitude of the input based on the set of force values; and
    - polarize the inductor at the resonant frequency responsive to the first force magnitude of the first input exceeding a force threshold to oscillate the tactile surface.

* * * * *